United States Patent
Kikkoji

(10) Patent No.: US 7,146,619 B2
(45) Date of Patent: Dec. 5, 2006

(54) DISC LOADING APPARATUS

(75) Inventor: Hiroyuki Kikkoji, Tokyo (JP)

(73) Assignee: Sony Corporation, Tokyo (JP)

( * ) Notice: Subject to any disclaimer, the term of this patent is extended or adjusted under 35 U.S.C. 154(b) by 481 days.

(21) Appl. No.: 10/464,664

(22) Filed: Jun. 19, 2003

(65) Prior Publication Data

US 2004/0042353 A1 Mar. 4, 2004

(30) Foreign Application Priority Data

Jun. 21, 2002 (JP) ............................ 2002-181074

(51) Int. Cl.
  *G11B 17/04* (2006.01)
(52) U.S. Cl. ..................... 720/619; 720/621
(58) Field of Classification Search ..................... None
  See application file for complete search history.

(56) References Cited

U.S. PATENT DOCUMENTS

| | | | |
|---|---|---|---|
| 4,682,320 A * | 7/1987 | d'Alayer de Costemore d'Arc | 720/621 |
| 5,321,687 A * | 6/1994 | Kinoshita et al. | 720/621 |
| 6,137,761 A * | 10/2000 | Oh et al. | 720/620 |
| 6,633,517 B1 * | 10/2003 | Nakamichi | 369/30.78 |
| 6,873,481 B1 * | 3/2005 | Ohyama et al. | 369/30.85 |
| 2006/0130081 A1 * | 6/2006 | Mizuno et al. | 720/621 |

* cited by examiner

*Primary Examiner*—Thang V. Tran
(74) *Attorney, Agent, or Firm*—Oblon, Spivak, McClelland, Maier & Neustadt, P.C.

(57) ABSTRACT

A disc conveying apparatus includes a first conveyor unit having a plurality of rollers which are arranged along a conveying path of a disc-shaped recording medium with gaps therebetween, which move in a direction away from the conveying path and rotate individually, and which convey the disc-shaped recording medium by successively rolling on a peripheral surface of the disc-shaped recording medium to pass the disc-shaped recording medium from one to another, a second conveyor unit which faces the first conveyor unit across the disc-shaped recording medium being conveyed, which is oriented along the conveying path, and which retains the disc-shaped recording medium between the first conveyor unit and the second conveyor unit, and a control unit which detects the position of the disc-shaped recording medium and controls the rotation of the rollers on the basis of the movement of the rollers in the direction away from the conveying path.

16 Claims, 48 Drawing Sheets

FIG. 43

| ADDRESS | DISC SENSOR | SW1 | SW2a | SW2b | SW3 | SW4 | SW5a | SW5b | STATE |
|---|---|---|---|---|---|---|---|---|---|
| AD1 | (L) | | | | | | | | NO DISC |
| AD2 | (H) | | | | | | | | DISC INSERTION/EJECTION |
| AD3 | | H | | | | | | | |
| AD4 | | H | H | | | | | | |
| AD5 | | H | H | H | | | | | |
| AD6 | | H | H | H | H | | | | |
| AD7 | | | H | (H) | H | (L) | | | ATTACHMENT POSITION (FRONT) |
| AD8 | | | H | H | H | H | | | |
| AD9 | | | H | (L) | H | (H) | | | REVERSE ROTATION OF DRIVE MOTOR |
| AD10 | | | H | H | H | H | | | PLAYBACK MODE |
| AD11 | | | H | (H) | H | (L) | H | H | ATTACHMENT POSITION (REAR) |
| AD12 | | | H | (H) | H | (H) | H | H | |
| AD13 | | | | | | H/L | H/L | H/L | |
| AD14 | | | | | | (L) | (H) | (L) | |
| AD15 | | | | | | | | (H) | STORED IN STORAGE UNIT |

FIG. 45

| ADDRESS | DISC SENSOR | SW1 | SW2a | SW2b | SW3 | SW4 | SW5a | SW5b | STATE |
|---|---|---|---|---|---|---|---|---|---|
| AD1 | | | | | | | | | NO DISC |
| AD2 | (H) | | | | | | | | DISC INSERTION/EJECTION |
| AD3 | | H | | | | | | | |
| AD4 | | H | H | | | | | | |
| AD5 | | H | H | H | | | | | |
| AD6 | | H | H | (H) | (H) | | | | DETECTION OF DISC SIZE |

FIG. 46

| ADDRESS | DISC SENSOR | SW1 | SW2a | SW2b | SW3 | SW4 | SW5a | SW5b | STATE |
|---|---|---|---|---|---|---|---|---|---|
| ad1 | (L) | | | | | | | | NO DISC |
| ad2 | (H) | | | | | | | | DISC INSERTION/EJECTION |
| ad3 | | H | | | | | | | |
| ad4 | | H | H | | | | | | |
| ad5 | | (L) | (H) | | | | | | |
| ad6 | | | (H) | | (H) | | | | ATTACHMENT POSITION |
| ad7 | | | H | | H | H | | | PLAYBACK MODE |

FIG. 47

| ADDRESS | | 1 | 2 | 3 | 4 | 5 | 6 | 7 |
|---|---|---|---|---|---|---|---|---|
| DISC SENSOR | ON / OFF | | | | | | | |
| SW1 | Low / High | | | | | | | |
| SW2a | Low / High | | | | | | | |
| SW2b | Low / High | | | | | | | |
| SW3 | Low / High | | | | | | | |
| SW4 | Low / High | | | | | | | |
| SW5a | Low / High | | | | | | | |
| SW5b | Low / High | | | | | | | |

FIG. 48

| ADDRESS | DISC SENSOR | SW1 | SW2a | SW2b | SW3 | SW4 | SW5a | SW5b | STATE |
|---|---|---|---|---|---|---|---|---|---|
| ad1 |  |  |  |  |  |  |  |  | NO DISC |
| ad2 | (H) |  |  |  |  |  |  |  | DISC INSERTION/EJECTION |
| ad3 |  | H |  |  |  |  |  |  |  |
| ad4 |  | H | H |  |  |  |  |  |  |
| ad5 |  | (L) | (H) |  |  |  |  |  | DETECTION OF DISC SIZE |

DISC LOADING APPARATUS

BACKGROUND OF THE INVENTION

1. Field of the Invention

The present invention relates to disc loading apparatuses. More specifically, the present invention relates to a disc loading apparatus which conveys and loads a disc-shaped recording medium which is inserted through a disc insertion slot.

2. Description of the Related Art

Disc loading apparatuses which convey and load a disc-shaped recording medium, such as an optical disc, inserted through a disc insertion slot are known in the art. In these disc loading apparatuses, information signals are recorded on or played back from the loaded disc-shaped recording medium.

There are mainly two kinds of loading methods used in the disc loading apparatuses: a so-called tray method in which the disc-shaped recording medium is placed on a disc tray and is loaded by moving the disc tray, and a so-called slot-in method in which the disc-shaped recording medium is loaded by directly inserting it through the disc insertion slot.

In disc loading apparatuses using the slot-in method, the disc-shaped recording medium is conveyed, for example, while the peripheral surface of the disc-shaped recording medium is being pushed from opposite directions by a pair of rollers which face each other across the disc-shaped recording medium.

In the above-described disc loading apparatuses using the slot-in method, the disc-shaped recording medium is not conveyed to a predetermined position by moving the disc tray as in the tray method, but is conveyed by using feed rollers. Accordingly, in order to accurately convey the disc-shaped recording medium to a predetermined position, the position of the disc-shaped recording medium in the conveying direction must be detected while it is being conveyed.

On the other hand, the disc loading apparatuses may also be used as a so-called disc changer which includes a storage unit for storing a plurality of disc-shaped recording media and which can record and/or play back information signals to/from a desired disc-shaped recording medium from among the stored disc-shaped recording media. In such a case, the disc-shaped recording media must be conveyed between the disc insertion slot, a recording/playback unit, and the storage unit, and a long conveying path must be provided for the disc-shaped recording media.

SUMMARY OF THE INVENTION

Accordingly, in order to overcome the above-described disadvantages, an object of the present invention is to provide a disc loading apparatus which can accurately and reliably convey a disc-shaped recording medium with feed rollers irrespective of the length of a conveying path of the disc-shaped recording medium.

According to the present invention, a disc conveying apparatus includes a first conveyor unit including a plurality of rollers which are arranged along a conveying path of a disc-shaped recording medium with gaps therebetween, which move in a direction away from the conveying path and rotate individually, and which convey the disc-shaped recording medium by successively rolling on a peripheral surface of the disc-shaped recording medium to pass the disc-shaped recording medium from one to another; a second conveyor unit which faces the first conveyor unit across the disc-shaped recording medium being conveyed, which is oriented along the conveying path, and which retains the disc-shaped recording medium between the first conveyor unit and the second conveyor unit; and a control unit which detects the position of the disc-shaped recording medium and controls the rotation of the rollers on the basis of the movement of the rollers in the direction away from the conveying path.

Thus, according to the present invention, the conveying operation of the disc-shaped recording medium is performed on the basis of the positional relationship between the rollers and the disc-shaped recording medium.

The second conveyor unit may include the same number of rotating members as the number of the rollers, the rotating members being arranged along the conveying path with gaps therebetween, and the rollers and the rotating members which face each other across the disc-shaped recording medium being conveyed may move away from each other synchronously and convey the disc-shaped recording medium while being in contact with the peripheral surface of the disc-shaped recording medium. In such a case, load placed on the disc-shaped recording medium by the rollers and the rotating members can be balanced and the conveying operation can be easily controlled.

In addition, the disc conveying apparatus may further include a detecting unit which detects the movement of the rollers in the direction away from the conveying path, and the control unit may control the rotation of the rollers on the basis of a detection result obtained by the detecting unit. In such a case, the position of the disc-shaped recording medium in the conveying direction can be accurately detected and the reliability of position detection of the disc-shaped recording medium can be improved.

In addition, in an operation for conveying the disc-shaped recording medium to a target position, the control unit may stop the movement of the disc-shaped recording medium when the position of the disc-shaped recording medium detected on the basis of the movement of the rollers and the target position are the same.

In addition, in the operation for conveying the disc-shaped recording medium to the target position, the control unit may rotate the rollers at a first rotational speed when the disc-shaped recording medium is between a start position and a position near the target position and rotate the rollers at a second rotational speed, which is lower than the first rotational speed, when the disc-shaped recording medium is between the position near the target position and the target position. In such a case, the disc-shaped recording medium can be accurately conveyed to the target position and the operational reliability can be improved.

A recording and/or playback operation of the disc-shaped recording medium may be performed at the target position. Alternatively, the disc-shaped recording medium may be stored at the target position.

In addition, according to the present invention, a disc conveying apparatus includes a first conveyor unit including a plurality of rollers which are arranged along a conveying path of a disc-shaped recording medium with gaps therebetween, which move in a direction away from the conveying path and rotate individually, and which convey the disc-shaped recording medium by successively rolling on a peripheral surface of the disc-shaped recording medium to pass the disc-shaped recording medium from one to another; a second conveyor unit which faces the first conveyor unit across the disc-shaped recording medium being conveyed, which is oriented along the conveying path, and which retains the disc-shaped recording medium between the first conveyor unit and the second conveyor unit; and a determination unit which determines the diameter of the disc-shaped recording medium on the basis of the movement of the rollers in the direction away from the conveying path.

Thus, according to the present invention, the diameter of the disc-shaped recording medium can be accurately detected and the reliability of size detection of the disc-shaped recording medium can be improved.

BRIEF DESCRIPTION OF THE DRAWINGS

FIG. 1 is a plan view of an apparatus which conveys a disc-shaped recording medium by using feed rollers as a first conveyor unit and a feed plate as a second conveyor unit;

FIG. 3 is a plan view of an apparatus which conveys the disc-shaped recording medium by using the feed rollers as both the first conveyor unit and the second conveyor unit;

FIGS. 4 to 48 illustrate a disc loading apparatus according to an embodiment of the present invention in detail, and FIG. 4 is a perspective view showing the overall construction of the apparatus;

FIG. 5 is an exploded perspective view of the overall apparatus in which a supporting chassis and a base chassis are removed from each other;

FIG. 6 is a plan view of the supporting chassis;

FIG. 7 is a perspective view of the supporting chassis in a state in which components are supported by the supporting chassis;

FIG. 8 is a plan view of the supporting chassis in a state in which the components are supported by the supporting chassis;

FIG. 9 is an enlarged perspective view of a feed member;

FIG. 10 is an enlarged exploded perspective view of a third slide unit and restraining rollers;

FIG. 11 is a block diagram of the disc loading apparatus;

FIGS. 12 to 21 show processes of a control operation performed in the disc loading apparatus, and FIG. 12 is a flowchart which schematically shows the overall control operation;

FIG. 13 is a flowchart showing an input acquisition process;

FIG. 14 is a flowchart showing a sequence process;

FIG. 15 is a flowchart showing an operation process;

FIG. 16 is a flowchart showing a fine adjustment process;

FIG. 17 is a flowchart showing a motor output process;

FIG. 18 is a flowchart showing the operation in which the disc-shaped recording medium is conveyed from a disc insertion slot to a playback unit;

FIG. 19 is a flowchart showing the operation in which the disc-shaped recording medium is conveyed from the playback unit to a storage unit;

FIG. 20 is a flowchart showing the operation in which the disc-shaped recording medium is conveyed from the storage unit to the playback unit;

FIG. 21 is a flowchart showing the operation in which the disc-shaped recording medium is conveyed from the playback unit to the disc insertion slot;

FIG. 22 is a plan view showing the states of the components in a front loading mode before the disc-shaped recording medium is inserted through the disc insertion slot;

FIGS. 23 to 36 show the operational states of the components when a large disc-shaped recording medium is conveyed, and FIG. 23 is a plan view showing the state immediately after the disc-shaped recording medium is inserted through the disc insertion slot;

FIG. 24 is a plan view showing the state in which the disc-shaped recording medium is conveyed and a driving slider and a driven slider of a first slide unit slide;

FIG. 25 is a plan view showing the state in which the disc-shaped recording medium is further conveyed from the state shown in FIG. 24 and a driving slider and a driven slider of a second slide unit slide in accordance with the sliding movement of the driving slider and the driven slider of the first slide unit;

FIG. 26 is a plan view showing the state in which the disc-shaped recording medium is further conveyed from the state shown in FIG. 25 and is in contact with a first feed roller, a first feed member, a second feed roller, and a second feed member;

FIG. 27 is a plan view showing the state in which the disc-shaped recording medium is further conveyed from the state shown in FIG. 26 and the driving slider and the driven slider of the first slide unit move toward each other;

FIG. 28 is a plan view showing the state in which the disc-shaped recording medium is further conveyed from the state shown in FIG. 27 and is positioned at an attachment position;

FIG. 29 is a plan view showing the state in which the disc-shaped recording medium is further conveyed from the state shown in FIG. 28 and is moved past the attachment position toward the storage unit;

FIG. 30 is a plan view showing the state in which the disc-shaped recording medium is further conveyed from the state shown in FIG. 29 and is at a position where the rotating direction of a drive motor is reversed;

FIG. 31 is a plan view showing the state in which the feed rollers and the feed members are removed from the disc-shaped recording medium and a playback mode is set;

FIG. 32 is a plan view showing the state in a rear loading mode before the disc-shaped recording medium is conveyed toward the storage unit;

FIG. 33 is a plan view showing the state in which the disc-shaped recording medium is conveyed from the state shown in FIG. 32 toward the storage unit;

FIG. 34 is a plan view showing the state in which the disc-shaped recording medium is further conveyed from the state shown in FIG. 33 and a driving slider and a driven slider of a fifth slide unit slide;

FIG. 35 is a plan view showing the state immediately before the disc-shaped recording medium is further conveyed from the state shown in FIG. 34 and is stored in the storage unit;

FIG. 36 is a plan view showing the state in which the disc-shaped recording medium is stored in the storage unit;

FIGS. 37 to 42 show the operational states of the components when a small disc-shaped recording medium is conveyed, and FIG. 37 is a plan view showing the state immediately after the disc-shaped recording medium is inserted through the disc insertion slot;

FIG. 38 is a plan view showing the state in which the disc-shaped recording medium is conveyed and the driving slider and the driven slider of the first slide unit slide;

FIG. 39 is a plan view showing the state in which the disc-shaped recording medium is further conveyed from the state shown in FIG. 38 and is in contact with the first feed roller, the first feed member, the second feed roller, and the second feed member;

FIG. 40 is a plan view showing the state immediately before the disc-shaped recording medium is further conveyed from the state shown in FIG. 39 and is positioned at the attachment position;

FIG. 41 is a plan view showing the state in which the disc-shaped recording medium is further conveyed from the state shown in FIG. 40 and is positioned at an attachment position;

FIG. 42 is a plan view showing the state in which the feed rollers and the feed members are removed from the disc-shaped recording medium and the playback mode is set;

FIG. 43 is a table showing the states of a disc sensor and detection switches when the address of the large disc-shaped recording medium is detected;

FIG. 44 is a timechart showing the states of the disc sensor and the detection switches when the large disc-shaped recording medium is at each address;

FIG. 45 is a table showing the states of the disc sensor and the detection switches when the size of the large disc-shaped recording medium is detected;

FIG. 46 is a table showing the states of the disc sensor and the detection switches when the address of the small disc-shaped recording medium is detected;

FIG. 47 is a timechart showing the states of the disc sensor and the detection switches when the small disc-shaped recording medium is at each address; and FIG. 48 is a table showing the states of the disc sensor and the detection switches when the size of the small disc-shaped recording medium is detected.

DESCRIPTION OF THE PREFERRED EMBODIMENT

Figure 1:
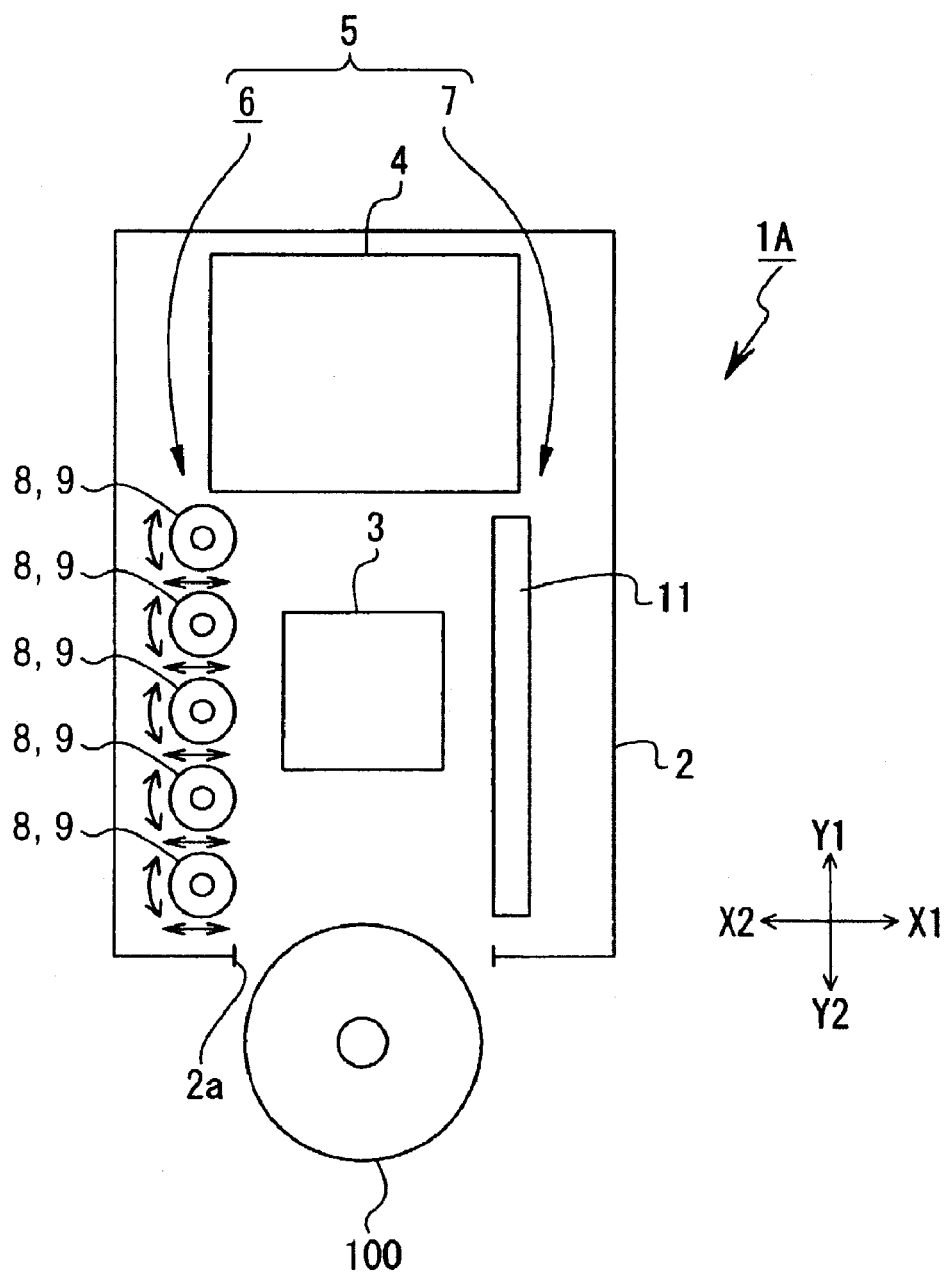
FIGS. 1, to 3 schematically show disc loading apparatuses according to the present invention.

An embodiment of the present invention will be described below with reference to the accompanying drawings. In the embodiment described below, the present invention is applied to a disc loading apparatus which conveys and loads a disc-shaped recording medium, such as an optical disc, inserted through a disc insertion slot and which can play back information signals recorded on the disc-shaped recording medium.

Although the present invention is applied to an apparatus which plays back information signals recorded on a disc-shaped recording medium in the embodiment described below, the present invention may also be applied to an apparatus which records information signals on a disc-shaped recording medium or an apparatus which can both record and play back information signals to/from a disc-shaped recording medium.

A disc loading apparatus described below includes a storage unit which can store a plurality of disc-shaped recording media and functions as a disc changer which extracts a desired disc-shaped recording medium from among the disc-shaped recording media stored in the storage unit and stores the disc-shaped recording medium in the storage unit.

The embodiment of the present invention will be described below in accordance with the following items:
(1) Schematic Description of Disc Loading Apparatus
(2) Detailed Construction of Disc Loading Apparatus
   (a) Overall Construction
   (b) Supporting Chassis
   (c) First Slide Unit
   (d) Second Slide Unit
   (e) Third Slide Unit
   (f) Fourth Slide Unit
   (g) Fifth Slide Unit
   (h) Chucking Pulley
   (i) Mode-Setting Drive Mechanism
   (j) Base Unit
   (k) Disc Sensor
   (l) Conveyor Drive Mechanism
   (m) Sub-Chassis
   (n) Swing Mechanism
   (o) Storage-Unit Elevator Mechanism
   (p) Construction of Housing
   (q) Detection Switches
   (r) Control Unit
(3) Control Operation of Disc Loading Apparatus
   (a) Five Operation Modes
   (b) Overall Control Operation
   (c) Input Acquisition Process
   (d) Sequence Process
   (e) Operation Process
   (f) Fine Adjustment Process
   (g) Motor Output Process
   (h) Control Operation in Front Loading Mode (Conveyance to Playback Unit)
   (i) Control Operation in Rear Loading Mode (Conveyance to Storage Unit)
   (j) Control Operation in Rear Loading Mode (Conveyance to Playback Unit)
   (k) Control Operation in Front Loading Mode (Conveyance to Disc Insertion Slot)
(4) Operation of Disc Loading Apparatus
   (a) Front Loading Mode
   (b) Conveyance Operation between Disc Insertion Slot and Playback Unit (Large Disc-Shaped Recording Medium)
   (c) Conveyance Operation between Playback Unit and Storage Unit (Large Disc-Shaped Recording Medium)
   (d) Conveyance Operation between Disc Insertion Slot and Storage Unit (Large Disc-Shaped Recording Medium)
   (e) Conveyance Operation between Disc Insertion Slot and Playback Unit (Small Disc-Shaped Recording Medium)
   (f) Others
(5) Summary The embodiment of the present invention will be described below in accordance with the above items.

(1) Schematic Description of Disc Loading Apparatus

The disc loading apparatus will be described below with reference to FIGS. 1 to 3.

Figure 2:
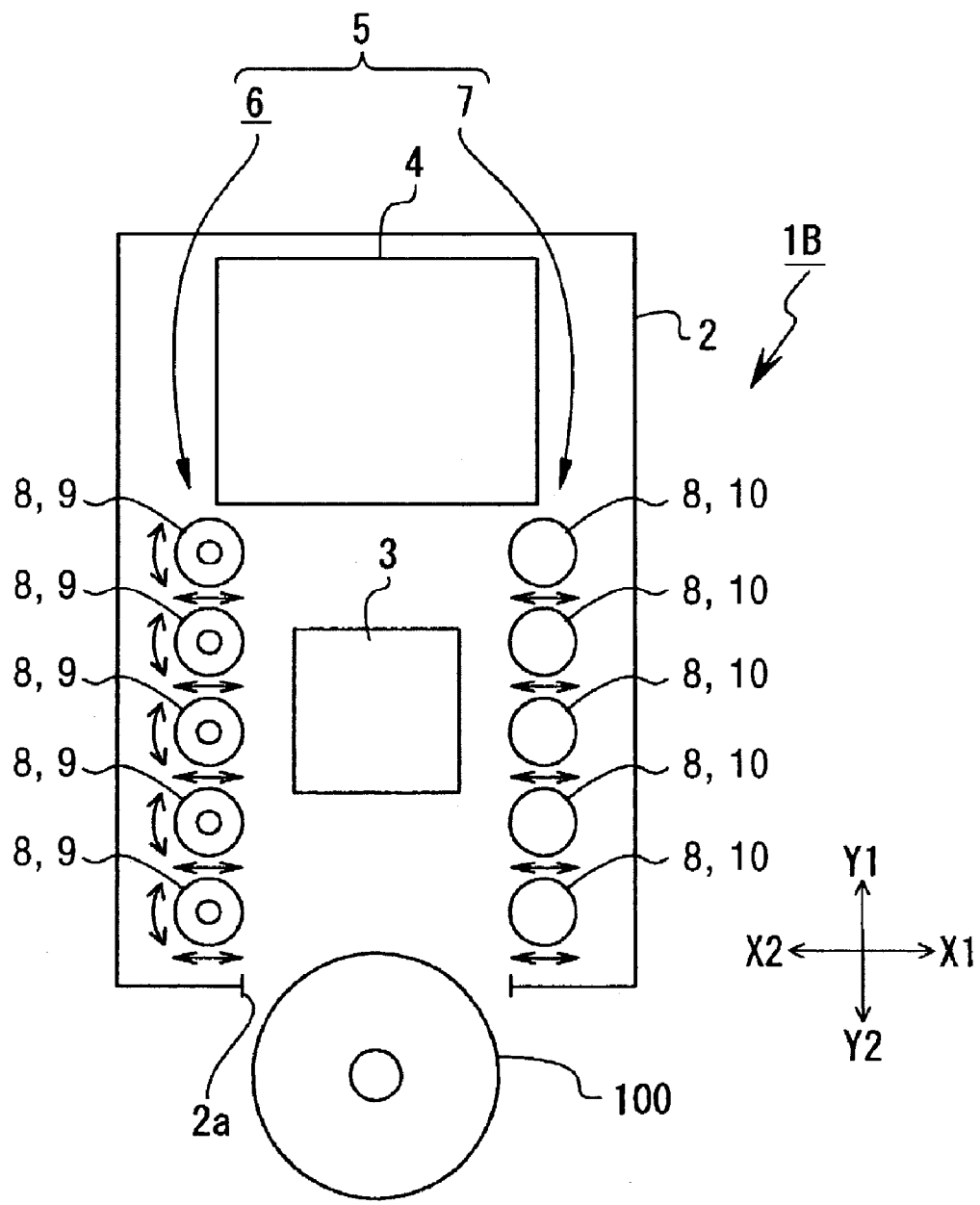
FIG. 2 is a plan view of an apparatus which conveys the disc-shaped recording medium by using the feed rollers as the first conveyor unit and feed members as the second conveyor unit.
Figure 3:
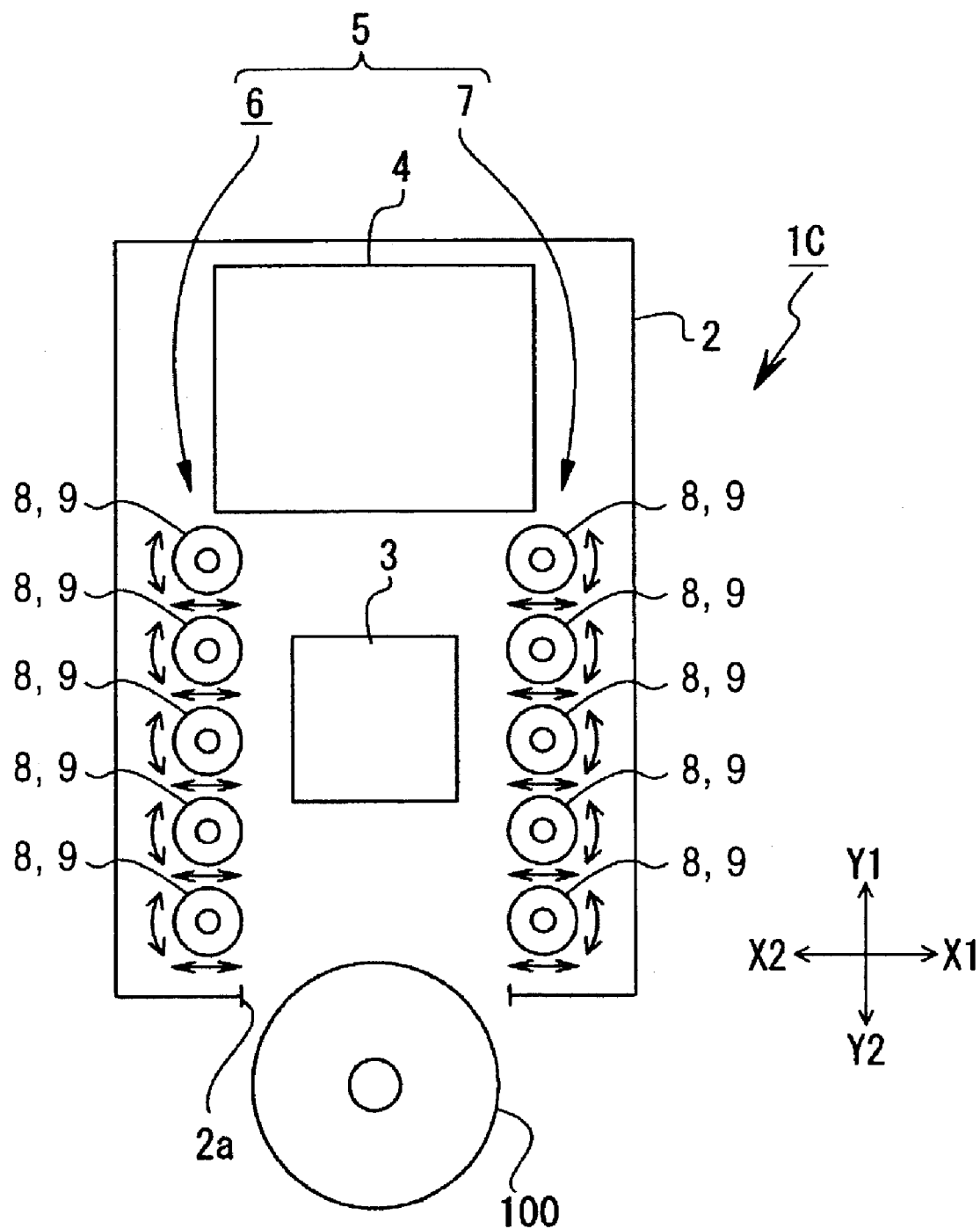

With reference to FIGS. 1 to 3, each of disc loading apparatuses 1 (1A, 1B, and 1C) is constructed by disposing components and mechanisms thereof in a housing 2 which has, for example, a rectangular shape in a plan view. A disc insertion slot 2a through which a disc-shaped recording medium 100 is inserted is formed in the front surface of the housing 2.

The disc loading apparatuses 1 can play back information signals from both a large disc-shaped recording medium 100a whose diameter is, for example, 12 cm, and a small disc-shaped recording medium 100b whose diameter is, for example, 8 cm. A storage unit, which will be described below, can only store the large disc-shaped recording medium 100a.

The housing 2 contains a playback unit 3 which plays back the information signals recorded on the disc-shaped recording medium 100, a storage unit 4 which can store a plurality of disc-shaped recording media 100 and a conveyor mechanism 5 which conveys the disc-shaped recording media 100. A recording unit is provided instead of the playback unit 3 in an apparatus which records information signals on the disc-shaped recording medium 100, and a recording/playback unit is provided instead of the playback unit 3 in an apparatus which both records and plays back information signals to/from the disc-shaped recording medium 100.

The conveyor mechanism 5 includes a first conveyor unit 6 and a second conveyor unit 7 which are disposed at the left and right sides, respectively, of the housing 2. At least one of the first conveyor unit 6 and the second conveyor unit 7 includes a plurality of feed units 8 which have a cylindrical or columnar shape. The feed units 8 are arranged in the conveying direction Y1-Y2 of the disc-shaped recording medium 100 with gaps therebetween.

Rotatable feed rollers 9 or unrotatable feed members 10 are used as the feed units 8, and at least one of the first conveyor unit 6 and the second conveyor unit 7 includes the feed rollers 9. The feed rollers 9 and the feed members 10 are pushed against the peripheral surface of the disc-shaped recording medium 100, as will be described below. At this time, a certain amount of frictional force is generated between the peripheral surface of the disc-shaped recording medium 100 and each of the feed rollers 9 and the feed members 10, so that the feed rollers 9 and the feed members 10 do not slip on the peripheral surface of the disc-shaped recording medium 100.

FIG. 1 is a diagram showing a disc loading apparatus 1A in which the feed rollers 9 are used as the first conveyor unit 6 and a feed plate 11 is used as the second conveyor unit 7.

Each of the feed rollers 9 can move in the moving direction X1-X2, which is perpendicular to the conveying direction Y1-Y2, with respect to the housing 2. The feed plate 11 extends in the Y1-Y2 direction, and is fixed to the housing 2. Similar to the feed rollers 9 and the feed members 10, a certain amount of frictional force is also generated between the peripheral surface of the disc-shaped recording medium 100 and the feed plate 11, so that the feed plate 11 does not slip on the peripheral surface of the disc-shaped recording medium 100.

In the disc loading apparatus 1A shown in FIG. 1, when the disc-shaped recording medium 100 is inserted through the disc insertion slot 2a, the feed rollers 9 move in the X1 direction while rotating and are successively pushed against the peripheral surface of the disc-shaped recording medium 100. Thus, the peripheral surface of the disc-shaped recording medium 100 is pushed against the feed plate 11 by the feed rollers 9.

Accordingly, the disc-shaped recording medium 100 is successively passed from one roller 9 to the next while being retained between the feed rollers 9 and the feed plate 11 due to the rotation of the feed rollers 9, and is thereby conveyed in the Y1 direction. The disc-shaped recording medium 100 is conveyed to the playback unit 3 or the storage unit 4, and playback of the information signals is performed or the disc-shaped recording medium 100 is stored in the storage unit 4.

While the disc-shaped recording medium 100 is being conveyed, the feed rollers 9 move in the X1-X2 direction in accordance with the position of the disc-shaped recording medium 100 so as to push the peripheral surface of the disc-shaped recording medium 100.

When the disc-shaped recording medium 100 is conveyed from the playback unit 3 or the storage unit 4 to the disc insertion slot 2a, that is, when the disc-shaped recording medium 100 is conveyed in the Y2 direction, the feed rollers 9 rotate in a direction opposite to the above-described case while the disc-shaped recording medium 100 is being retained between the feed rollers 9 and the feed plate 11.

FIG. 2 is a diagram showing a disc loading apparatus 1B in which the feed rollers 9 are used as the first conveyor unit 6 and the feed members 10 are used as the second conveyor unit 7.

The feed rollers 9 and the feed members 10 can move toward and away from each other synchronously in the X1-X2 direction with respect to the housing 2.

In the disc loading apparatus 1B shown in FIG. 2, when the disc-shaped recording medium 100 is inserted through the disc insertion slot 2a, the feed rollers 9 move in the X1 direction while rotating and the feed members 10 move in the X2 direction in synchronization with the feed rollers 9. Thus, the feed rollers 9 and the feed members 10 are successively pushed against the peripheral surface of the disc-shaped recording medium 100 from opposite directions.

Accordingly, the disc-shaped recording medium 100 is successively passed from one roller 9 to the next while being retained between the feed rollers 9 and the feed members 10 due to the rotation of the feed rollers 9, and is thereby conveyed in the Y1 direction.

While the disc-shaped recording medium 100 is being conveyed, both the feed rollers 9 and the feed members 10 move in the X1-X2 direction in accordance with the position of the disc-shaped recording medium 100 so as to push the peripheral surface of the disc-shaped recording medium 100.

When the disc-shaped recording medium 100 is conveyed in the Y2 direction, the feed rollers 9 rotate in a direction opposite to the above-described case while the disc-shaped recording medium 100 is being retained between the feed rollers 9 and the feed members 10.

Although both of the feed rollers 9 and the feed members 10 can move in the X1-X2 direction in the disc loading apparatus 1B, the construction may also be such that only one of the feed rollers 9 and the feed members 10 can move in the X1-X2 direction.

FIG. 3 is a diagram showing a disc loading apparatus 1C in which the feed rollers 9 are used as both the first conveyor unit 6 and the second conveyor unit 7.

The feed rollers 9 of the first conveyor unit 6 and the feed rollers 9 of the second conveyor unit 7 can move toward and away from each other synchronously in the X1-X2 direction with respect to the housing 2.

In the disc loading apparatus 1C shown in FIG. 3, when the disc-shaped recording medium 100 is inserted through the disc insertion slot 2a, the feed rollers 9 of the first conveyor unit 6 move in the X1 direction while rotating and the feed rollers 9 of the second conveyor unit 7 move in the X2 direction while rotating. Thus, the feed rollers 9 of the first conveyor unit 6 and the feed rollers 9 of the second conveyor unit 7 are successively pushed against the peripheral surface of the disc-shaped recording medium 100.

Accordingly, the disc-shaped recording medium 100 is successively passed from one feed roller 9 to the next while being retained between the feed rollers 9 of the first conveyor unit 6 and the feed rollers 9 of the second conveyor unit 7 due to the rotation of the feed rollers 9, and is thereby conveyed in the Y1 direction.

While the disc-shaped recording medium 100 is being conveyed, both the feed rollers 9 of the first conveyor unit 6 and the feed rollers 9 of the second conveyor unit 7 move in the X1-X2 direction in accordance with the position of the disc-shaped recording medium 100 so as to push the peripheral surface of the disc-shaped recording medium 100.

When the disc-shaped recording medium 100 is conveyed in the Y2 direction, the feed rollers 9 of the first conveyor unit 6 and the feed rollers 9 of the second conveyor unit 7 rotate in directions opposite to the above-described case while the disc-shaped recording medium 100 is being retained between the feed rollers 9 of the first conveyor unit 6 and the feed rollers 9 of the second conveyor unit 7.

Although both the feed rollers 9 of the first conveyor unit 6 and the feed rollers 9 of the second conveyor unit 7 can move in the X1-X2 direction in the disc loading apparatus 1C, the construction may also be such that only one of the feed rollers 9 of the first conveyor unit 6 and the feed rollers 9 of the second conveyor unit 7 can move in the X1-X2 direction.

As described above, in each of the disc loading apparatuses 1 (1A, 1B, and 1C), the disc-shaped recording medium 100 is conveyed by being successively passed from one roller 9 to the next. Accordingly, the disc-shaped recording medium 100 can be conveyed without using a disc tray or the like for receiving and conveying the disc-shaped recording medium 100, and the operability can be improved.

In addition, the length of the conveying path can be freely set by providing the necessary number of feed rollers 9, and the design freedom can be increased. In particular, when the disc loading apparatus includes a storage unit in addition to the playback unit and functions as a disc changer, the disc-shaped recording medium 100 must also be conveyed between the playback unit and the storage unit, and a long conveying path is necessary. Accordingly, it is extremely effective to use the feed rollers 9 to increase the design freedom.

In addition, since the disc-shaped recording medium 100 is conveyed while the peripheral surface thereof is pushed by the feed rollers 9, the feed members 10, or the feed plate 11, the recording surface of the disc-shaped recording medium 100 can be prevented from being damaged.

In the disc loading apparatus 1B, the feed rollers 9 and the feed members 10 can move toward and away from the peripheral surface of the disc-shaped recording medium 100 in synchronization with each other. In addition, in the disc loading apparatus 1C, the feed rollers 9 of the first conveyor unit 6 and the feed rollers 9 of the second conveyor unit 7 can move toward and away from the peripheral surface of the disc-shaped recording medium 100 in synchronization with each other. Accordingly, load placed on the disc-shaped recording medium 100 by the feed rollers 9 and the feed members 10 can be balanced and the feeding operation can be easily controlled.

In addition, in the disc loading apparatus 1C, since only the rotatable feed rollers 9 are used as the feed units 8, the disc-shaped recording medium 100 can be and conveyed smoothly and reliably.

(2) Detailed Construction of Disc Loading Apparatus

The detailed construction of the disc loading apparatus 1 will be described below with reference to FIGS. 4 to 11.

(a) Overall Construction

Figure 4:
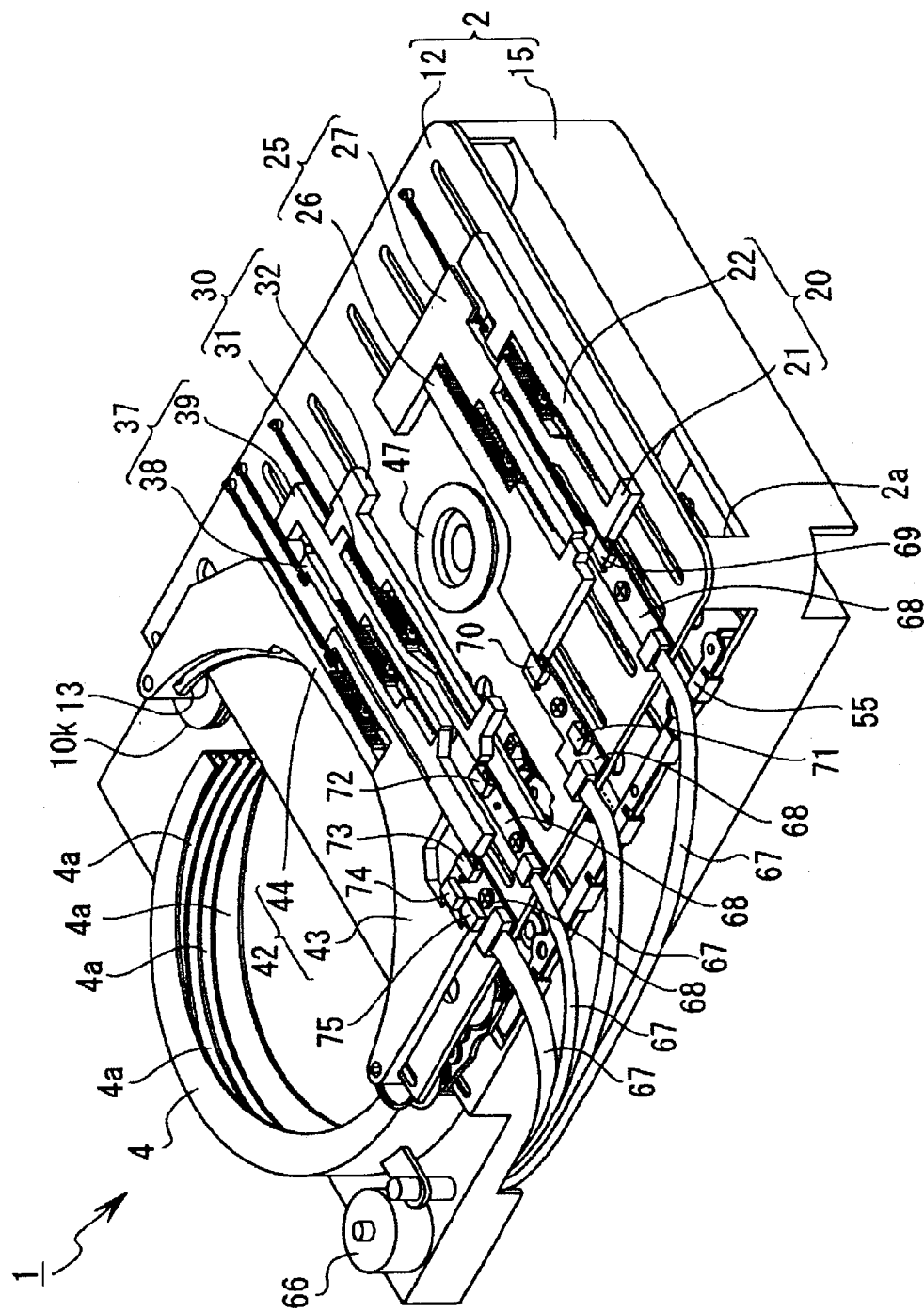
Figure 5:
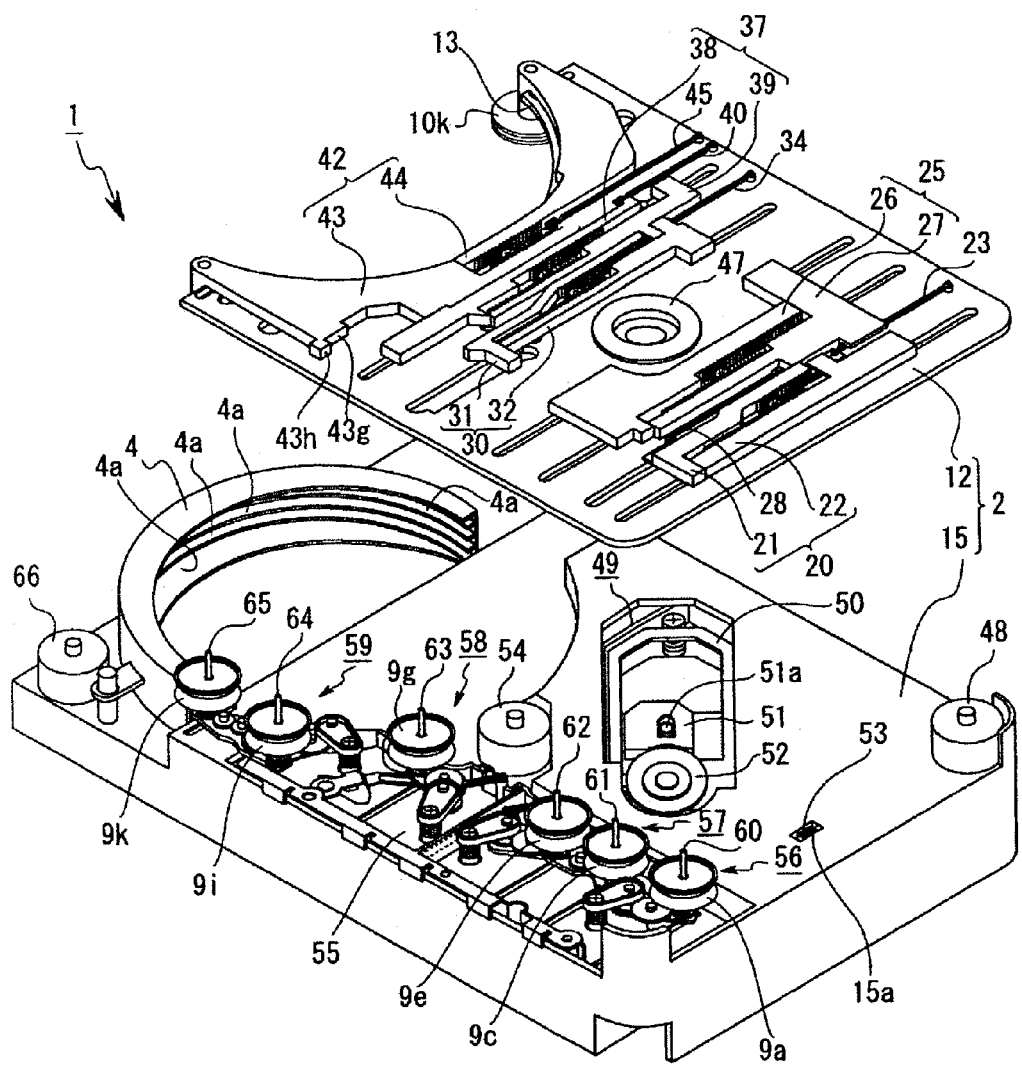

The disc loading apparatus 1 is constructed by disposing components and mechanisms thereof in the housing 2, which is constructed by combining a supporting chassis 12 and a base chassis 15 (see FIGS. 4 and 5).

Although not shown in the figures, the disc loading apparatus 1 is provided with various buttons such as a load button for loading the disc-shaped recording medium 100 into the playback unit 3, an eject button for ejecting the disc-shaped recording medium 100 from the playback unit 3, a playback button for playing back the information signals recorded on the disc-shaped recording medium 100, a stop button for stopping the playback operation, a store button for storing the disc-shaped recording medium 100 in the storage unit 4, an extract button for extracting the disc-shaped recording medium 100 from the storage unit 4, and an exchange button for exchanging the disc-shaped recording medium 100 between the playback unit 3 and the storage unit 4, which are operated by an operator.

(b) Supporting Chassis

The supporting chassis 12 is a flat plate having a large semicircular opening 13 which faces toward the rear at the rear end of the supporting chassis 12 (see FIGS. 4 to 8).

Figure 6:
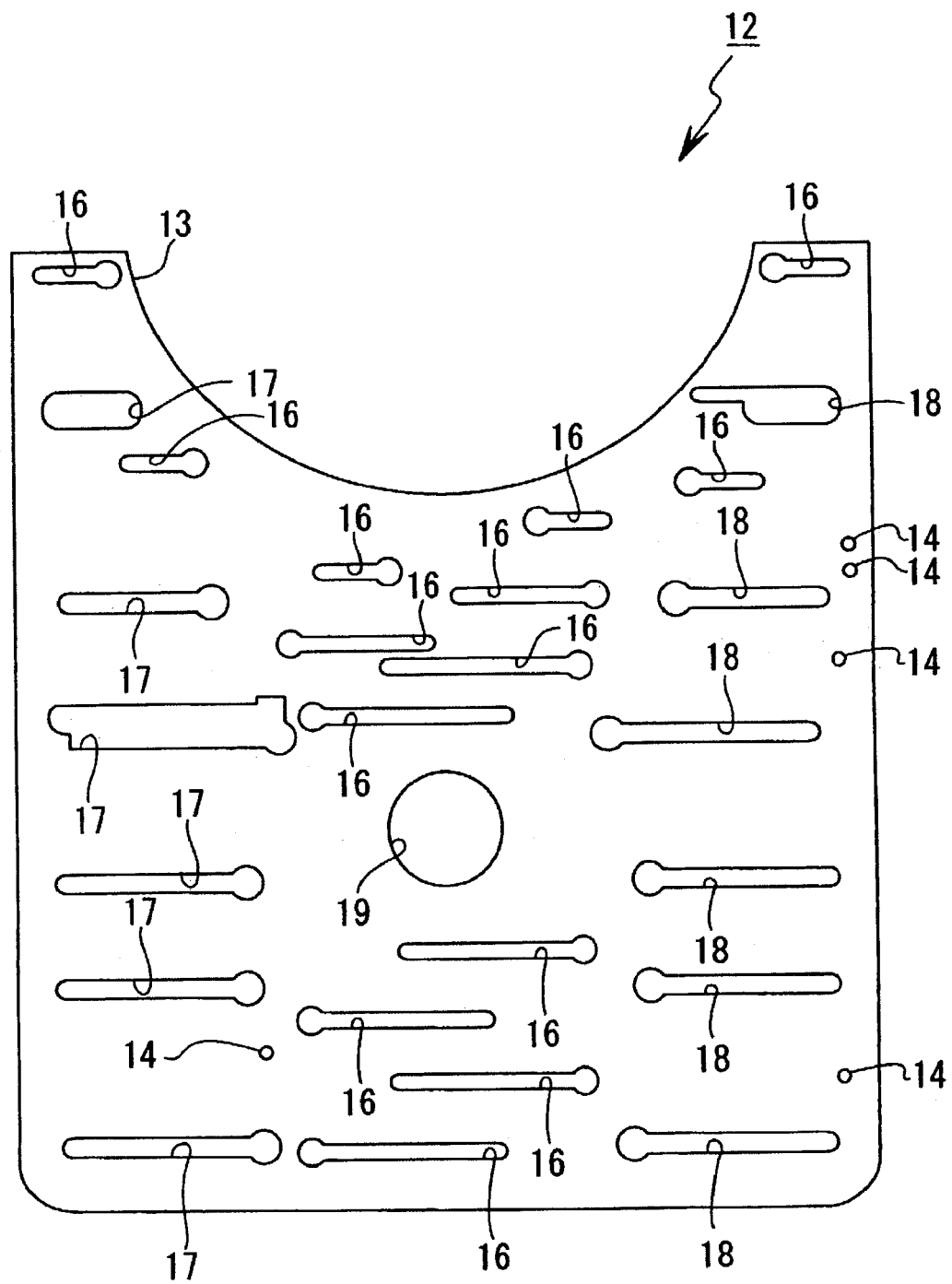

With reference to FIG. 6, a plurality of guide holes 16 which extend in the lateral direction (horizontal direction in FIG. 6) are formed in the supporting chassis 12 at the central area of the supporting chassis 12 in the lateral direction with gaps therebetween in the longitudinal direction (vertical direction in FIG. 6). The guide holes 16 are also formed at the right rear end and the left rear end of the supporting chassis 12.

Left through holes 17 which extend in the lateral direction are formed in the supporting chassis 12 at the left area of the supporting chassis 12 with gaps therebetween in the longitudinal direction. In addition, right through holes 18 which also extend in the lateral direction are formed in the supporting chassis 12 at the right area of the supporting chassis 12 with gaps therebetween in the longitudinal direction.

A pulley-supporting hole 19 having a circular shape is formed in the supporting chassis 12 at the central area thereof.

Spring-retaining projections 14 which project upward are provided on the top surface of the supporting chassis 12 at positions near the right end of the supporting chassis 12 with gaps therebetween in the longitudinal direction. In addition, another spring-retaining projection 14 is provided in a left front area of the supporting chassis 12.

(c) First Slide Unit

Figure 7:
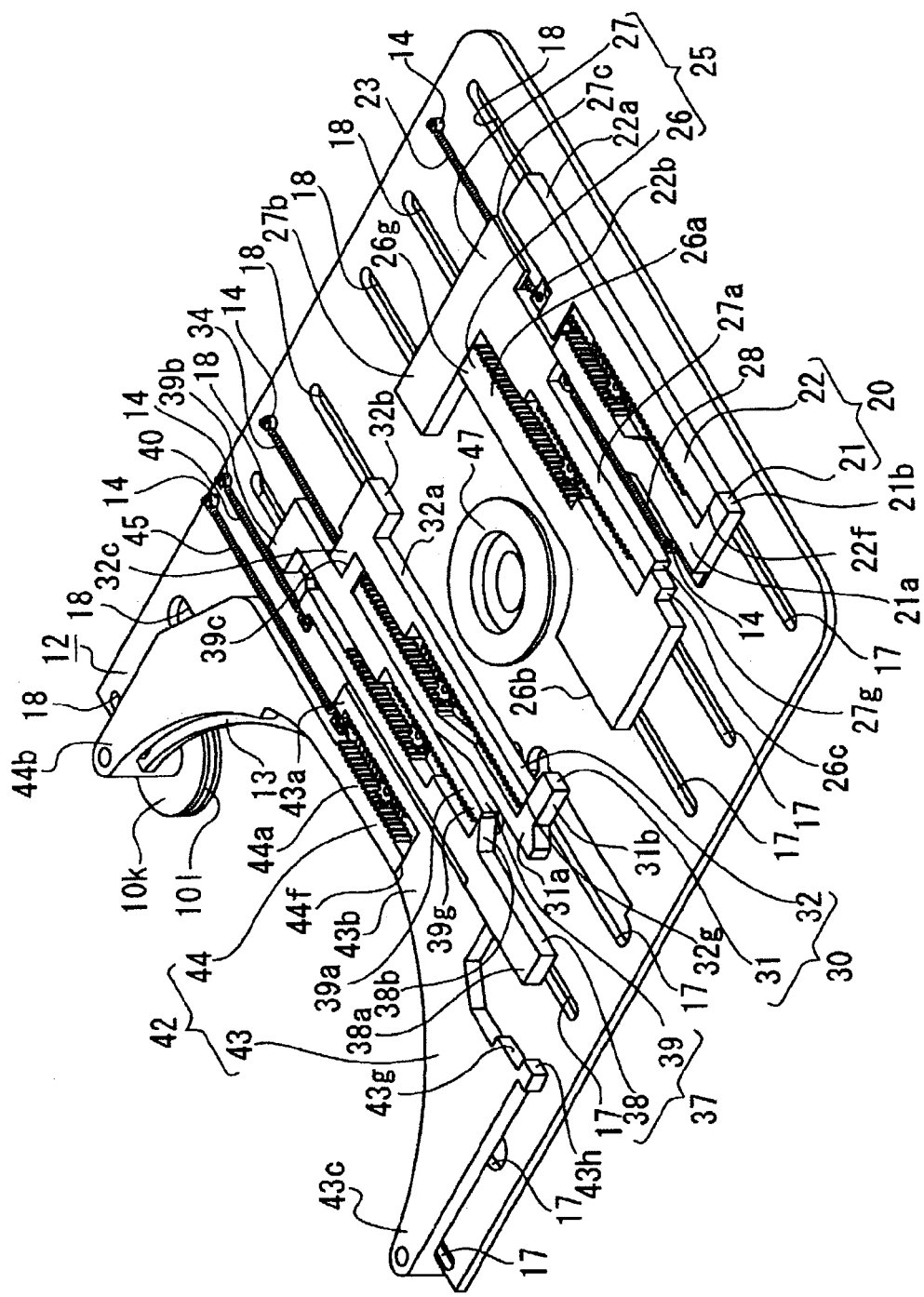
Figure 8:
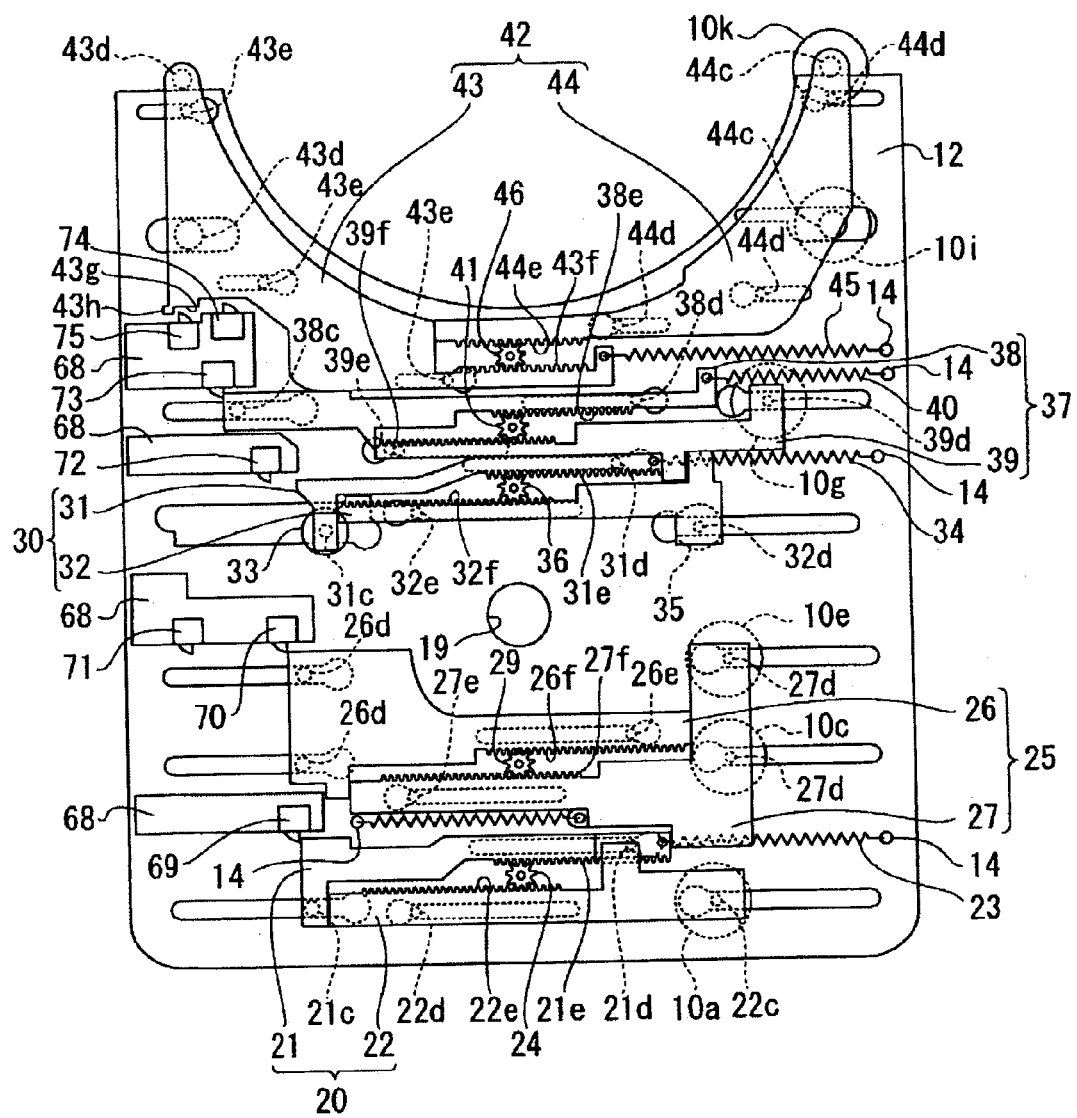

A first slide unit 20 is supported on the supporting chassis 12 at the front end of the supporting chassis 12, and the first slide unit 20 includes a driving slider 21 and a driven slider 22 which can slide in the lateral direction (see FIGS. 7 and 8).

The driving slider 21 has a main portion 21a which extends in the lateral direction and a restraining projection 21b which projects forward from the left end of the main portion 21a. The restraining projection 21b is provided with a retaining rod 21c which projects downward from the bottom surface of the restraining projection 21b, and the main portion 21a is provided with a guide pin 21d which projects downward from the bottom surface of the main portion 21a at a position near the right end thereof. In addition, the main portion 21a is also provided with a rack portion 21e on the front surface thereof.

The retaining rod 21c is inserted through the left through hole 17 at the front from above, and the guide pin 21d is inserted through the second guide hole 16 from the front from above. Accordingly, the driving slider 21 can slide in the lateral direction with respect to the supporting chassis 12 while the retaining rod 21c and the guide pin 21d are guided by the left through hole 17 and the guide hole 16, respectively.

In the state in which the driving slider 21 is supported by the supporting chassis 12, a spring member (extension spring) 23 is stretched between the right end portion of the main portion 21a and the spring-retaining projection 14 on the right of the main portion 21a. Accordingly, the driving slider 21 is urged to the right by the spring member 23.

The driven slider 22 has a main portion 22a which extends in the lateral direction and a pushing projection 22b which projects rearward from the main portion 22a at a position near the right end of the main portion 22a. The main portion 22a is provided with an attachment shaft 22c which projects downward from the bottom surface of the main portion 22a at the right end thereof and a guide pin 22d which projects downward from the bottom surface of the main portion 22a at a position near the left end thereof. In addition, the main portion 22a is also provided with a rack portion 22e on the rear surface thereof, and the left end portion of the main portion 22a serves as a restraining portion 22f.

The attachment shaft 22c is inserted through the right through hole 18 at the front from above, and the guide pin 22d is inserted through the guide hole 16 at the front from above. Accordingly, the driven slider 22 can slide in the lateral direction with respect to the supporting chassis 12 while the attachment shaft 22c and the guide pin 22d are guided by the right through hole 18 and the guide hole 16, respectively.

Figure 9:
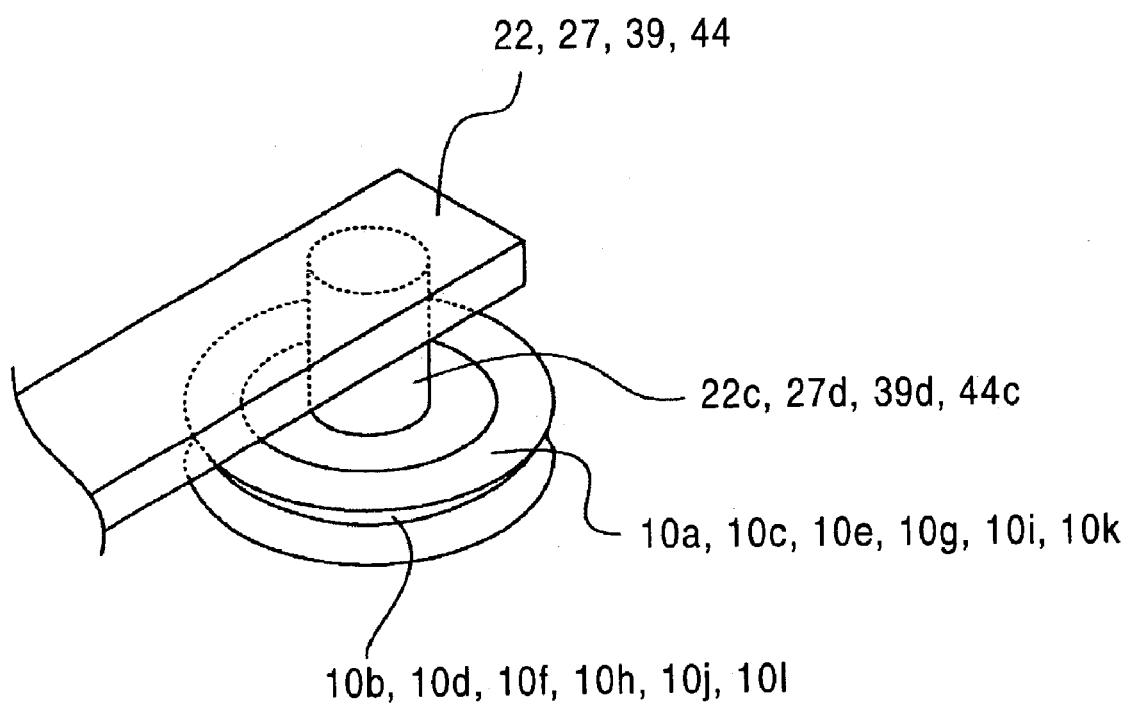

In the state in which the driven slider 22 is supported by the supporting chassis 12, a first feed member 10a is attached to the attachment shaft 22c (see FIGS. 8 and 9). The first feed member 10a has a flat columnar shape, and is placed under the supporting chassis 12. A retaining groove 10b is formed around the entire circumference of the first feed member 10a, and the first feed member 10a is fixed to the driven slider 22.

In the state in which both the driving slider 21 and the driven slider 22 are supported by the supporting chassis 12, a pinion 24 which engages with the rack portions 21e and 22e is rotatably disposed between the driving slider 21 and the driven slider 22 (see FIG. 8). Accordingly, the driving slider 21 and the driven slider 22 slide in the lateral direction in synchronization with each other. In addition, the driven slider 22 receives a force which urges the driven slider 22 to the left from the spring member 23 via the driving slider 21 and the pinion 24.

As described above, the driving slider 21 is urged to the right and the driven slider 22 is urged to the left by the spring member 23. When no external force is applied to the driving slider 21 and the driven slider 22, the restraining projection 21b of the driving slider 21 comes into contact with the restraining portion 22f of the driven slider 22, so that the rightward movement of the driving slider 21 and the leftward movement of the driven slider 22 are restrained (see FIG. 7).

(d) Second Slide Unit

A second slide unit 25 is supported on the supporting chassis 12 at a position behind the first slide unit 20, and the second slide unit 25 includes a driving slider 26 and a driven slider 27 which can slide in the lateral direction (see FIGS. 7 and 8).

The driving slider 26 has a main portion 26a which extends in the lateral direction, a projecting portion 26b which projects rearward from the left half area of the main portion 26a, and a restraining projection 26c which projects forward from the main portion 26a at a position near the let end of the main portion 26a. The projecting portion 26b and the main portion 26a are provided with retaining rods 26d which project downward with a gap therebetween in the longitudinal direction from the bottom surfaces of the projecting portion 26b and the main portion 26a at the left ends thereof. In addition, the main portion 26a is provided with a guide pin 26e which projects downward from the bottom surface of the main portion 26a at a position near the right end thereof. The main portion 26a is also provided with a rack portion 26f on the front surface thereof, and the right end portion of the main portion 26a serves as a restraining portion 26g.

The retaining rods 26d are inserted through two of the left through holes 17 from above, and the guide pin 26e is inserted through one of the guide holes 16 from above. Accordingly, the driving slider 26 can slide in the lateral direction with respect to the supporting chassis 12 while the retaining rods 26d and the guide pin 26e are guided by the left through holes 17 and the guide hole 16, respectively.

The driven slider 27 has a main portion 27a which extends in the lateral direction, a restraining projection 27b which projects rearward from the main portion 27a at the right end thereof, and a projection 27c which projects forward from the top edge of the main portion 27a at the right end thereof. The main portion 27a and the restraining projection 27b are provided with attachment shafts 27d which project downward with a gap therebetween in the longitudinal direction from the bottom surfaces of the main portion 27a and the restraining projection 27b at the right ends thereof. In addition, the main portion 27a is provided with a guide pin 27e on the bottom surface of the main portion 27a at a position near the left end thereof. The main portion 27a is also provided with a rack portion 27f on the rear surface thereof, and the left end portion of the main portion 27a serves as a restraining portion 27g.

The attachment shafts 27d are inserted through two of the right through holes 18 from above, and the guide pin 27e is inserted through one of the guide holes 16 from above. Accordingly, the driven slider 27 can slide in the lateral direction with respect to the supporting chassis 12 while the attachment shafts 27d and the guide pin 27e are guided by the right through holes 18 and the guide hole 16, respectively.

In the state in which the driven slider 27 is supported by the supporting chassis 12, a spring member (extension spring) 28 is stretched between the central portion of the main portion 27a in the lateral direction and the spring-retaining projection 14 on the left of the main portion 27a. Accordingly, the driven slider 27 is urged to the left by the spring member 28.

In the state in which the driven slider 27 is supported by the supporting chassis 12, a second feed member 10c and a third feed member 10e are attached to the attachment shafts 27d (see FIGS. 8 and 9). The second and the third feed members 10c and 10e have a flat columnar shape, and are placed under the supporting chassis 12. Retaining grooves 10d and 10f are formed around the entire circumferences of the second and the third feed members 10c and 10e, respectively, and the second and the third feed members 10c and 10e are fixed to the driven slider 27.

In the state in which both the driving slider 26 and the driven slider 27 are supported by the supporting chassis 12, a pinion 29 which engages with the rack portions 26f and 27f is rotatably disposed between the driving slider 26 and the driven slider 27 (see FIG. 8). Accordingly, the driving slider 26 and the driven slider 27 slide in the lateral direction in synchronization with each other. In addition, the driving slider 26 receives a force which urges the driving slider 26 to the right from the spring member 28 via the driven slider 27 and the pinion 29.

As described above, the driving slider 26 is urged to the right and the driven slider 27 is urged to the left by the spring member 28. When no external force is applied to the driving slider 26 and the driven slider 27, the restraining projection 26c of the driving slider 26 comes into contact with the restraining portion 27g of the driven slider 27 and the restraining portion 26g of the driving slider 26 comes into contact with the restraining projection 27b of the driven slider 27, so that the rightward movement of the driving slider 26 and the leftward movement of the driven slider 27 are restrained (see FIG. 7).

When the driving slider 21 and the driven slider 22 of the first slide unit 20 slide in synchronization with each other and the driven slider 22 moves to the right to a predetermined position, the pushing projection 22b of the driven slider 22 pushes the projection 27c of the driven slider 27 of the second slide unit 25 to the right. Accordingly, the driving slider 26 and the driven slider 27 slide in the lateral direction in synchronization with each other along with the movement of the driven slider 22.

(e) Third Slide Unit

A third slide unit 30 is supported on the supporting chassis 12 at a position behind the pulley-supporting hole 19, and the third slide unit 30 includes a first slider 31 and a second slider 32 which can slide in the lateral direction (see FIGS. 7 and 8).

The first slider 31 has a main portion 31a which extends in the lateral direction and a restraining projection 31b which projects forward from the left end of the main portion 31a. The restraining projection 31b is provided with a retaining shaft 31c which projects downward from the bottom surface of the restraining projection 31b, and the main portion 31a is provided with a guide pin 31d which projects downward from the bottom surface of the main portion 31a at a position near the right end thereof. In addition, the main portion 31a is also provided with a rack portion 31e on the front surface thereof.

The retaining shaft 31c is inserted through one of the left through holes 17 from above, and the guide pin 31d is inserted through one of the guide holes 16 from above. Accordingly, the first slider 31 can slide in the lateral direction with respect to the supporting chassis 12 while the retaining shaft 31c and the guide pin 31d are guided by the left through hole 17 and the guide hole 16, respectively.

Figure 10:
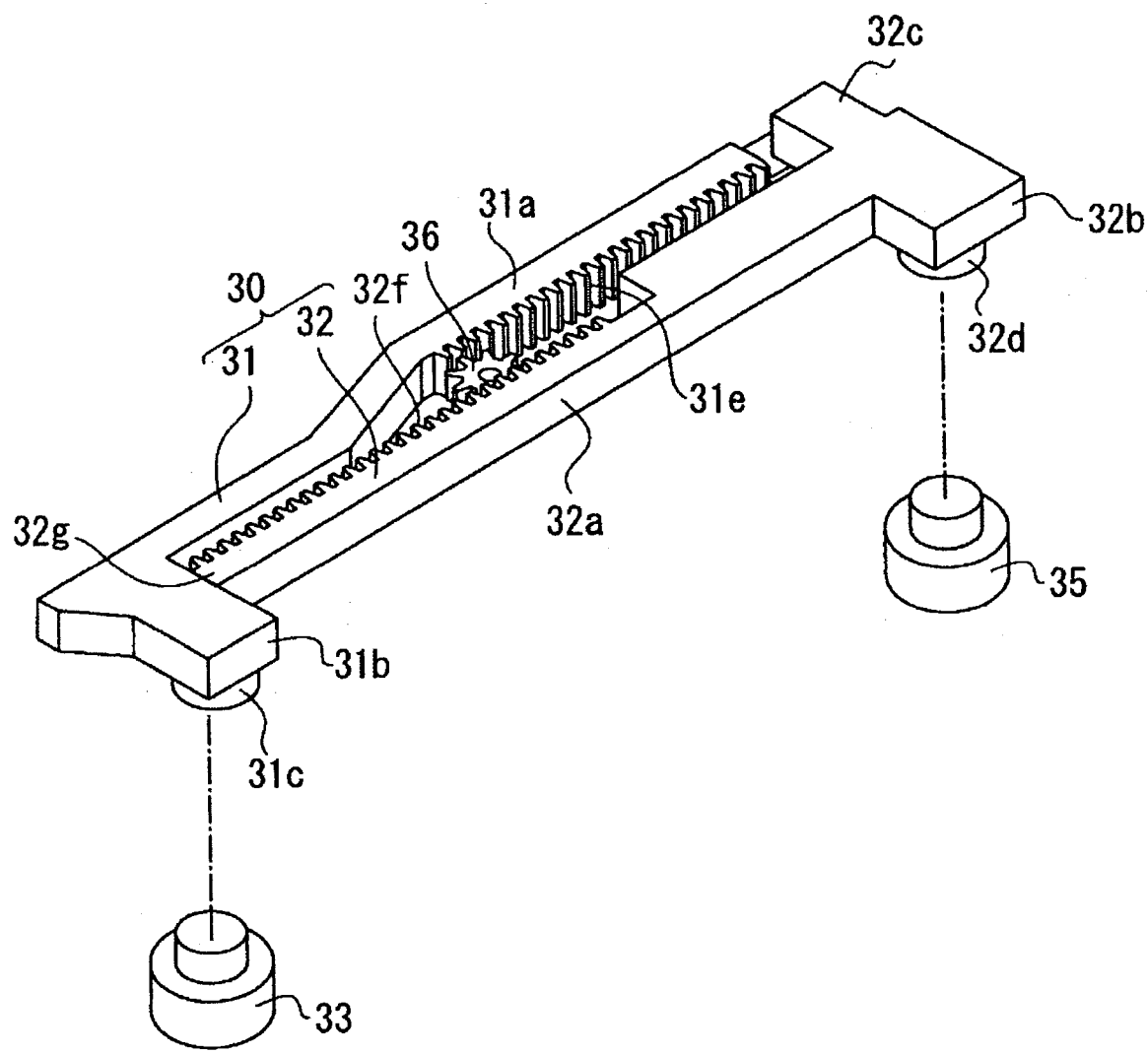

A first restraining roller 33 is rotatably retained by the retaining shaft 31c of the first slider 31 (see FIGS. 8 and 10).

In the state in which the first slider 31 is supported by the supporting chassis 12, a spring member (extension spring) 34 is stretched between the right end portion of the main portion 31a and the spring-retaining projection 14 on the right of the main portion 31a. Accordingly, the first slider 31 is urged to the right by the spring member 34.

The second slider 32 has a main portion 32a which extends in the lateral direction, a projecting portion 32b which projects forward from the main portion 32a at the right end thereof, and a projection 32c which projects rearward from the top edge of the main portion 32a at the right end thereof (see FIGS. 7 and 8). The projecting portion 32b is provided with a retaining shaft 32d which projects downward from the bottom surface of the projecting portion 32b at the right end thereof, and the main portion 32a is provided with a guide pin 32e which projects downward from the bottom surface of the main portion 32a at a position near the left end thereof. In addition, the main portion 32a is also provided with a rack portion 32f on the rear surface thereof, and the left end portion of the main portion 32a serves as a restraining portion 32g.

The retaining shaft 32d is inserted through one of the right through holes 18 from above, and the guide pin 32e is inserted through one of the guide holes 16 from above. Accordingly, the second slider 32 can slide in the lateral direction with respect to the supporting chassis 12 while the retaining shaft 32d and the guide pin 32e are guided by the right through hole 18 and the guide hole 16, respectively.

A second restraining roller 35 is rotatably retained by the retaining shaft 32d of the second slider 32 (see FIGS. 8 and 10).

In the state in which both the first slider 31 and the second slider 32 are supported by the supporting chassis 12, a pinion 36 which engages with the rack portions 31e and 32f is rotatably disposed between the first slider 31 and the second slider 32 (see FIG. 8). Accordingly, the first slider 31 and the second slider 32 slide in the lateral direction in synchronization with each other. In addition, the second slider 32 receives a force which urges the second slider 32 to the left from the spring member 34 via the first slider 31 and the pinion 36.

As described above, the first slider 31 is urged to the right and the second slider 32 is urged to the left by the spring member 34. When no external force is applied to the first slider 31 and the second slider 32, the restraining projection 31b of the first slider 31 comes into contact with the restraining portion 32g of the second slider 32, so that the rightward movement of the first slider 31 and the leftward movement of the second slider 32 are restrained.

(f) Fourth Slide Unit

A fourth slide unit 37 is supported on the supporting chassis 12 at a position behind the third slide unit 30, and the fourth slide unit 37 includes a driving slider 38 and a driven slider 39 which can slide in the lateral direction (see FIGS. 7 and 8).

The driving slider 38 has a main portion 38a which extends in the lateral direction and a restraining projection 38b which projects forward from the main portion 38a at a position slightly shifted to the left from the center of the main portion 38a in the lateral direction. The main portion 38a is provided with a retaining rod 38c which projects downward from the bottom surface of the main portion 38a at the left end thereof and a guide pin 38d which projects downward from the bottom surface of the main portion 38a at a position near the right end thereof. In addition, the main portion 38a is also provided with a rack portion 38e on the front surface thereof.

The retaining rod 38c is inserted through one of the left through holes 17 from above, and the guide pin 38d is inserted through one of the guide holes 16 from above. Accordingly, the driving slider 38 can slide in the lateral direction with respect to the supporting chassis 12 while the retaining rod 38c and the guide pin 38d are guided by the left through hole 17 and the guide hole 16, respectively.

In the state in which the driving slider 38 is supported by the supporting chassis 12, a spring member (extension spring) 40 is stretched between the right end portion of the main portion 38a and the spring-retaining projection 14 on the right of the main portion 38a. Accordingly, the driving slider 38 is urged to the right by the spring member 40.

The driven slider 39 has a main portion 39a which extends in the lateral direction, a projecting portion 39b which projects rearward from the main portion 39a at the right end thereof, and a pushing projection 39c which projects forward from the main portion 39a at a position near the right end thereof. The projecting portion 39b is provided with an attachment shaft 39d which projects downward from the bottom surface of the projecting portion 39b, and the main portion 39a is provided with a guide pin 39e which projects downward from the bottom surface of the main portion 39a at the left end thereof. In addition, the main portion 39a is also provided with a rack portion 39f on the rear surface thereof, and the left end portion of the main portion 39a serves as a restraining portion 39g.

The attachment shaft 39d is inserted through one of the right through holes 18 from above, and the guide pin 39e is inserted through one of the guide holes 16 from above. Accordingly, the driven slider 39 can slide in the lateral direction with respect to the supporting chassis 12 while the attachment shaft 39d and the guide pin 32e are guided by the right through hole 18 and the guide hole 16, respectively.

In the state in which the driven slider 39 is supported by the supporting chassis 12, a fourth feed member 10g is attached to the attachment shaft 39d (see FIGS. 8 and 9). The fourth feed member 10g has a flat columnar shape, and is placed under the supporting chassis 12. A retaining groove 10h is formed around the entire circumference of the fourth feed member 10g, and the fourth feed member 10g is fixed to the driven slider 39.

In the state in which both the driving slider 38 and the driven slider 39 are supported by the supporting chassis 12, the pushing projection 39c of the driven slider 39 is positioned above the first slider 31 of the third slide unit 30 at a position on the right of a step portion of the first slider 31, and is in contact with the projection 32c of the second slider 32 of the third slide unit 30 at the left side of the projection 32c.

In the state in which both the driving slider 38 and the driven slider 39 are supported by the supporting chassis 12, a pinion 41 which engages with the rack portions 38e and 39f is rotatably disposed between the driving slider 38 and the driven slider 39 (see FIG. 8). Accordingly, the driving slider 38 and the driven slider 39 slide in the lateral direction in synchronization with each other. In addition, the driven slider 39 receives a force which urges the driven slider 39 to the left from the spring member 40 via the driving slider 38 and the pinion 41.

As described above, the driving slider 38 is urged to the right and the driven slider 39 is urged to the left by the spring member 40. When no external force is applied to the driving slider 38 and the driven slider 39, the restraining projection 38b of the driving slider 38 comes into contact with the restraining portion 39g of the driven slider 39, so that the rightward movement of the driving slider 38 and the leftward movement of the driven slider 39 are restrained.

When the driving slider 38 and the driven slider 39 slide in synchronization with each other, the pushing projection 39c of the driven slider 39 pushes the projection 32c of the second slider 32 of the third slide unit 30 to the right. Accordingly, the first slider 31 and the second slider 32 slide in the lateral direction in synchronization with each other along with the movement of the driven slider 39.

(g) Fifth Slide Unit

A fifth slide unit 42 is supported on the supporting chassis 12 at a position behind the fourth slide unit 37, and the fifth slide unit 42 includes a driving slider 43 and a driven slider 44 which can slide in the lateral direction (see FIGS. 7 and 8).

The driving slider 43 has a main portion 43a which extends in the lateral direction, a restraining projection 43b which projects rearward from the left half area of the main portion 43a, and a projecting portion 43c which projects toward the left rear from the left end portion of the restraining projection 43b. The projecting portion 43c is provided with two retaining rods 43d which project downward from the bottom surface of the projecting portion 43c with a gap therebetween in the longitudinal direction, and the driving slider 43 is provided with three guide pins 43e which project downward from the bottom surface of the driving slider 43 with gaps therebetween in the longitudinal direction. In addition, the main portion 43a is provided with a rack portion 43f on the rear surface thereof. The driving slider 43 is also provided with a first switching projection 43g at a position near the left end of the driving slider 43 and a second switching projection 43h on the left of the first switching projection 43g.

The retaining rods 43d are inserted through two of the left through holes 17 from above, and the guide pins 43e are inserted through three of the guide holes 16 from above. Accordingly, the driving slider 43 can slide in the lateral direction with respect to the supporting chassis 12 while the retaining rods 43d and the guide pins 43e are guided by the left through holes 17 and the guide holes 16, respectively.

In the state in which the driving slider 43 is supported by the supporting chassis 12, a spring member (extension spring) 45 is stretched between the right end portion of the main portion 43a and the spring-retaining projection 14 on the right of the main portion 43a. Accordingly, the driven slider 43 is urged to the right by the spring member 45.

The driven slider 44 has a main portion 44a which extends in the lateral direction and a projecting portion 44b which projects toward the right rear from the right end portion of the main portion 44a. The projecting portion 44b is provided with two attachment shafts 44c which project downward from the bottom surface of the projecting portion 44b with a gap therebetween in the longitudinal direction, and the driven slider 44 is provided with three guide pins 44d which project downward from the bottom surface of the driven slider 44. In addition, the main portion 44a is provided with a rack portion 44e on the front surface thereof, and the left end portion of the main portion 44a serves as a restraining portion 44f.

The attachment shafts 44c are inserted through two of the right through holes 18 from above, and the guide pins 44d are inserted through three of the guide holes 16 from above. Accordingly, the driven slider 44 can slide in the lateral direction with respect to the supporting chassis 12 while the attachment shafts 44c and the guide pins 44d are guided by the right through holes 18 and the guide holes 16, respectively.

In the state in which the driven slider 44 is supported by the supporting chassis 12, a fifth feed member 10i and a sixth feed member 10k are attached to the attachment shafts 44c (see FIGS. 8 and 9). The fifth and the sixth feed members 10i and 10k have a flat columnar shape, and are placed under the supporting chassis 12. Retaining grooves 10j and 10l are formed around the entire circumferences of the fifth and the sixth feed members 10i and 10k, respectively, and the fifth and the sixth feed members 10i and 10k are fixed to the driven slider 44.

In the state in which both the driving slider 43 and the driven slider 44 are supported by the supporting chassis 12, a pinion 46 which engages with the rack portions 43f and 44e is rotatably disposed between the driving slider 43 and the driven slider 44 (see FIG. 8). Accordingly, the driving slider 43 and the driven slider 44 slide in the lateral direction in synchronization with each other. In addition, the driven slider 44 receives a force which urges the driven slider 44 to the left from the spring member 45 via the driving slider 43 and the pinion 46.

As described above, the driving slider 43 is urged to the right and the driven slider 44 is urged to the left by the spring member 45. When no external force is applied to the driving slider 43 and the driven slider 44, the restraining projection 43b of the driving slider 43 comes into contact with the restraining portion 44f of the driven slider 44, so that the rightward movement of the driving slider 43 and the leftward movement of the driven slider 44 are restrained.

An annular rubber member (not shown), for example, is attached to each of the retaining grooves 10b, 10d, 10f, 10h, 10j, and 10l of the above-described feed members 10a, 10c, 10e, 10g, 10i, and 10k, respectively, so that a certain amount of frictional force is generated when the feed members 10a, 10c, 10e, 10g, 10i, and 10k are pushed against the peripheral surface of the disc-shaped recording medium 100 and the feed members 10a, 10c, 10e, 10g, 10i, and 10k do not slip on the peripheral surface of the disc-shaped recording medium 100.

On the contrary, the first restraining roller 33 and the second restraining roller 35 are composed of a resin material or the like having a high smoothness, so that they slip on the peripheral surface of the disc-shaped recording medium 100 while they rotate.

The second conveyor unit 7 consists of the above-described feed members 10a, 10c, 10e, 10g, 10i, and 10k.

(h) Chucking Pulley

A chucking pulley 47 is supported by the pulley-supporting hole 19 formed in the supporting chassis 12 in such a manner that the chucking pulley 47 can rotate and move in the vertical direction (see FIGS. 4, 5, and 7).

(i) Mode-Setting Drive Mechanism

A mode-setting drive mechanism for setting five operation modes, which will be described below, is placed under the base chassis 15. The mode-setting drive mechanism and is driven by a mode-setting motor 48 attached to the base chassis 15 at the front end thereof.

The mode-setting drive mechanism includes a first rotary encoder which is placed under the base chassis 15, and the first rotary encoder has a function to detect the amount of rotation of the mode-setting motor 48 on the basis of the amount of rotation of itself. Accordingly, the operation modes, which will be described below, are set by controlling the rotation of the mode-setting motor 48 on the basis of the amount of rotation of the mode-setting motor 48 detected by the first rotary encoder.

(j) Base Unit

A base unit 49 having a support base 50 is rotatably supported on the base chassis 15 (see FIG. 5). An optical pickup 51 which plays back the information signals recorded on the disc-shaped recording medium 100 is supported by the support base 50 in such a manner that the optical pickup 51 can move in the radial direction of the disc-shaped recording medium 100. The optical pickup 51 includes an objective lens 51a, and the disc-shaped recording medium 100 is irradiated with a laser beam which passes through the objective lens 51a. A spindle motor (not shown) is provided on the base unit 49, and a disc table 52 is fixed to a motor shaft of the spindle motor.

(k) Disc Sensor

A disc sensor 53 is disposed under a light transmission hole 15a which is formed in the base chassis 15 at the front end thereof (see FIG. 5). The disc sensor 53 is, for example, a reflective optical sensor which has a function to emit light upward through the light transmission hole 15a and determine the presence/absence of the disc-shaped recording medium 100.

(l) Conveyor Drive Mechanism

A conveyor drive mechanism is used for rotating feed rollers 9a, 9c, 9e, 9g, 9i, and 9k which are included in the above-described first conveyor unit 6, and is driven by a drive motor 54 attached on the base chassis 15 at the central area thereof.

(m) Sub-Chassis

A sub-chassis 55 which extends in the longitudinal direction is attached to the base chassis 15 at the left end thereof (see FIGS. 4 and 5).

(n) Swing Mechanism

A first swing mechanism 56, a second swing mechanism 57, a third swing mechanism 58, and a fourth swing mechanism 59 are pivotally supported on the top surface of the sub-chassis 55 in the order from the front (see FIG. 5). Each of the swing mechanisms 56, 57, 58, and 59 has a plurality of pivoting levers which are supported in a pivotable manner. The first feed roller 9a is rotatably supported on the first swing mechanism 56 with a supporting shaft 60, the second and third feed rollers 9c and 9e are rotatably supported on the second swing mechanism 57 with supporting shafts 61 and 62, respectively, the fourth feed roller 9g is rotatably supported on the third swing mechanism 58 with a supporting shaft 63, and the fifth and the sixth feed rollers 9i and 9k are rotatably supported on the fourth swing mechanism 59 with supporting shafts 64 and 65, respectively. The supporting shafts 60, 61, 62, 63, 64, and 65 project upward from the feed rollers 9a, 9c, 9e, 9g, 9i, and 9k, respectively.

The feed rollers 9a, 9c, 9e, 9g, 9i, and 9k receive a drive force of the drive motor 54 via the above-described conveyor drive mechanism and rotate in a direction corresponding to the rotating direction of the drive motor 54.

The above-described first conveyor unit 6 consists of the feed rollers 9a, 9c, 9e, 9g, 9i, and 9k. Each of these feed rollers 9a, 9c, 9e, 9g, 9i, and 9k and the above-described feed members 10a, 10c, 10e, 10g, 10i, and 10k of the second conveyor unit 7 which are attached to the driven sliders 22, 27, 39, and 44 supported by the supporting chassis 12 serves as the feed unit 8. The first conveyor unit 6 and the second conveyor unit 7 are components of the conveyor mechanism 5.

(o) Storage-Unit Elevator Mechanism

A storage-unit elevator mechanism is placed on the base chassis 15 at the rear area thereof, and is driven by an elevator motor 66 attached on the base chassis 15 at the rear end thereof. The storage-unit elevator mechanism is used for moving the storage unit 4 which is supported at the rear area of the base chassis 15 such that the storage unit 4 can move in the vertical direction.

The storage-unit elevator mechanism includes a second rotary encoder which has a function to detect the amount of rotation of the elevator motor 66 on the basis of the amount of rotation of itself. Accordingly, the vertical position of the storage unit 4 is set by controlling the rotation of the elevator motor 66 on the basis of the amount of rotation of the elevator motor 66 detected by the second rotary encoder.

The storage unit 4 has a laminated structure of disc-receiving members 4a, and each of the disc-receiving members 4a can receive the large disc-shaped recording media 100a (see FIGS. 4 and 5).

(p) Construction of Housing

The housing 2 is constructed by attaching the supporting chassis 12 to the base chassis 15, on which the components are disposed as described above, from above (see FIGS. 4 and 5). In the state in which the supporting chassis 12 is attached to the base chassis 15, a predetermined amount of space is provided between the supporting chassis 12 and the base chassis 15, and this space serves as a conveyor space in which the disc-shaped recording medium 100 is inserted and conveyed.

In the state in which the housing 2 is completed, the supporting shaft 60 which supports the first feed roller 9a is rotatably retained by the retaining rod 21c of the driving slider 21 of the first slide unit 20. Similarly, the supporting shafts 62 and 63 which support the second and third feed rollers 9c and 9e, respectively, are rotatably retained by the retaining rods 26d of the driving slider 26 of the second slide unit 25, the supporting shaft 63 which support the fourth feed roller 9g is rotatably retained by the retaining rod 38c of the driving slider 38 of the fourth slide unit 37, and the supporting shafts 64 and 65 which support the fifth and the sixth feed rollers 9i and 9k, respectively, are rotatably retained by the retaining rods 43d of the driving slider 43 of the fifth slide unit 42.

(q) Detection Switches

A control operation circuit is placed on the base chassis 15, and four connection cables 67 extend from the control operation circuit (see FIG. 4).

Four switch attachment plates 68 are attached to the supporting chassis 12 at the left end thereof with gaps therebetween in the longitudinal direction. A first detection switch 69 is mounted on the switch attachment plate 68 at the front, second detection switches 70 and 71 are mounted on the second switch attachment plate 68 from the front, and a third detection switch 72 is mounted on the third switch attachment plate 68 from the front. In addition, a fourth detection switch 73 is mounted on the last switch attachment plate 68 at the front end thereof, and fifth detection switches 74 and 75 are mounted on the last switch attachment plate 68 at the rear end thereof (see FIG. 4).

The detection switches 69, 70, 71, 72, 73, 74, and 75 are connected to the control operation circuit via the connection cables 67.

In addition, the detection switches 69, 70, 71, 72, 73, 74, and 75 are in the 'low' state when they are not operated.

The first detection switch 69 is operated by the main portion 21a of the driving slider 21 of the first slide unit 20 and is switched to the 'high' state when the driving slider 21 moves to the left. The second detection switches 70 and 71 are operated by the projecting portion 26b of the driving slider 26 of the second slide unit 25 and are switched to the 'high' state when the driving slider 26 moves to the left. The third detection switch 72 is operated by the main portion 31a of the first slider 31 of the third slide unit 30 and is switched to the 'high' state when the first slider 31 moves to the left. The fourth detection switch 73 is operated by the main portion 38a of the driving slider 38 of the fourth slide unit 37 and is switched to the 'high' state when the driving slider 38 moves to the left. The fifth detection switches 74 and 75 are operated by the first and the second switching projection 43g and 43h, respectively, of the driving slider 43 of the fifth slide unit 42 and are switched to the 'high' state when the driving slider 43 moves to the right.

(r) Control Unit

Figure 11:
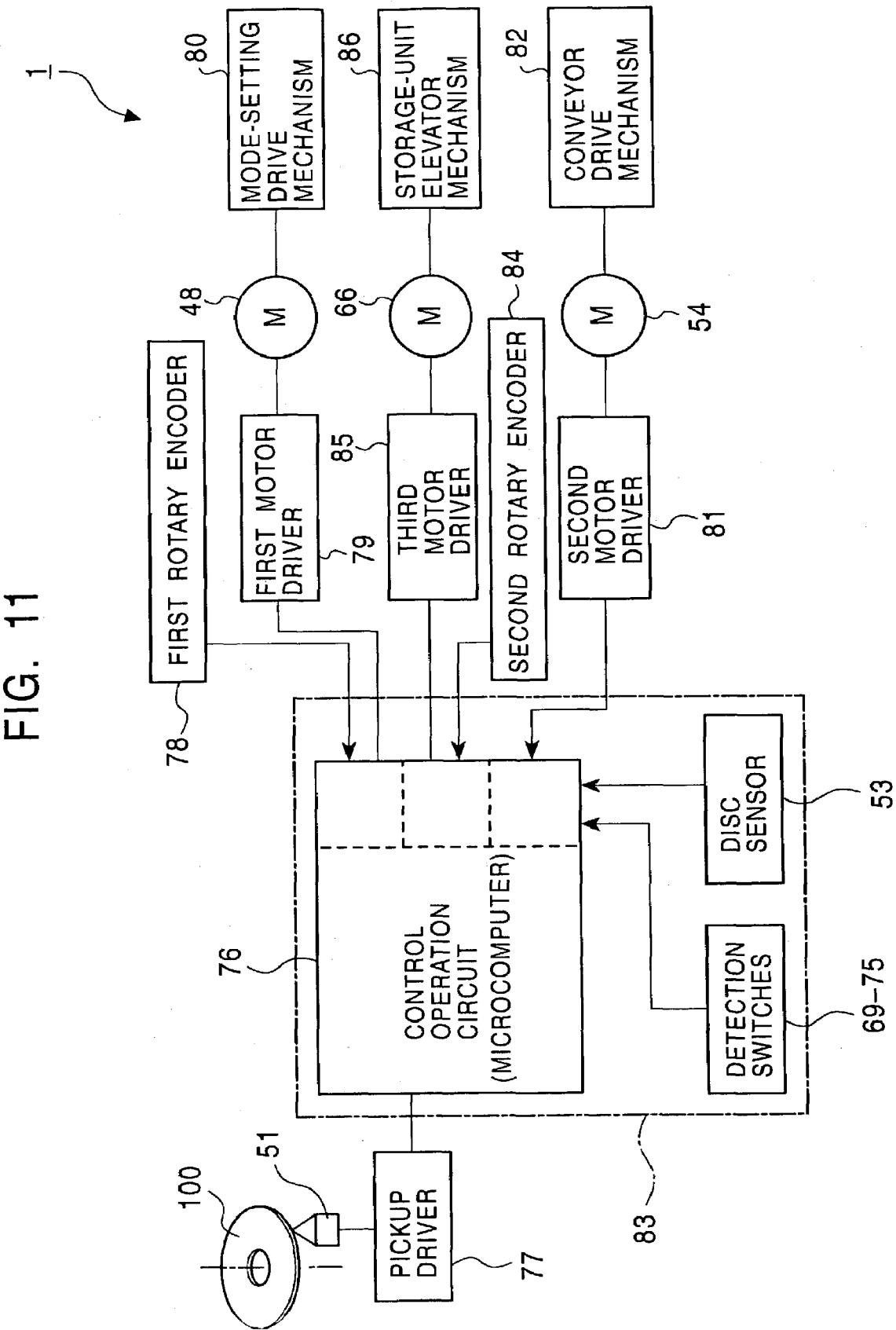

The operation performed in the disc loading apparatus 1 is controlled by the control operation circuit 76 which includes a microcomputer (see FIG. 11).

The optical pickup 51 is driven by a pickup driver 77 under the control of the control operation circuit 76.

The mode-setting motor 48 is driven by a first motor driver 79 under the control of the control operation circuit 76 on the basis of an input from the first rotary encoder 78 to the control operation circuit 76. As described above, the mode-setting drive mechanism 80 is driven by the mode-setting motor 48.

The drive motor 54 is driven by a second motor driver 81 under the control of the control operation circuit 76 on the basis of inputs from the detection switches 69, 70, 71, 72, 73, 74, and 75 and the disc sensor 53 to the control operation circuit 76. As described above, the conveyor drive mechanism 82 is driven by the drive motor 54.

Accordingly, the detection switches 69, 70, 71, 72, 73, 74, and 75, the disc sensor 53, and control operation circuit 76 serve as a control unit 83 which controls the conveyor drive mechanism 82.

The elevator motor 66 is driven by a third motor driver 85 under the control of the control operation circuit 76 on the basis of an input from the second rotary encoder 84 to the control operation circuit 76. As described above, the storage-unit elevator mechanism 86 is driven by the elevator motor 66.

(3) Control Operation of Disc Loading Apparatus

A control operation performed in the disc loading apparatus 1 will be described below with reference to FIGS. 12 to 21.

(a) Five Operation Modes

In the disc loading apparatus 1, five operation modes are set: a front loading mode in which the large disc-shaped recording medium 100a or the small disc-shaped recording medium 100b is conveyed between the disc insertion slot 2a and the playback unit 3; an elevator mode in which the storage unit 4 is moved vertically; a rear loading mode in which the disc-shaped recording medium 100a is conveyed between the playback unit 3 and the storage unit 4; a chucking mode in which the disc-shaped recording medium 100a or the disc-shaped recording medium 100b conveyed to the playback unit 3 is clamped or released; and a playback mode in which the disc-shaped recording medium 100a or the disc-shaped recording medium 100b is released from the feed rollers 9 and the feed members 10 so that playback can be performed.

(b) Overall of Control Operation

Figure 12:
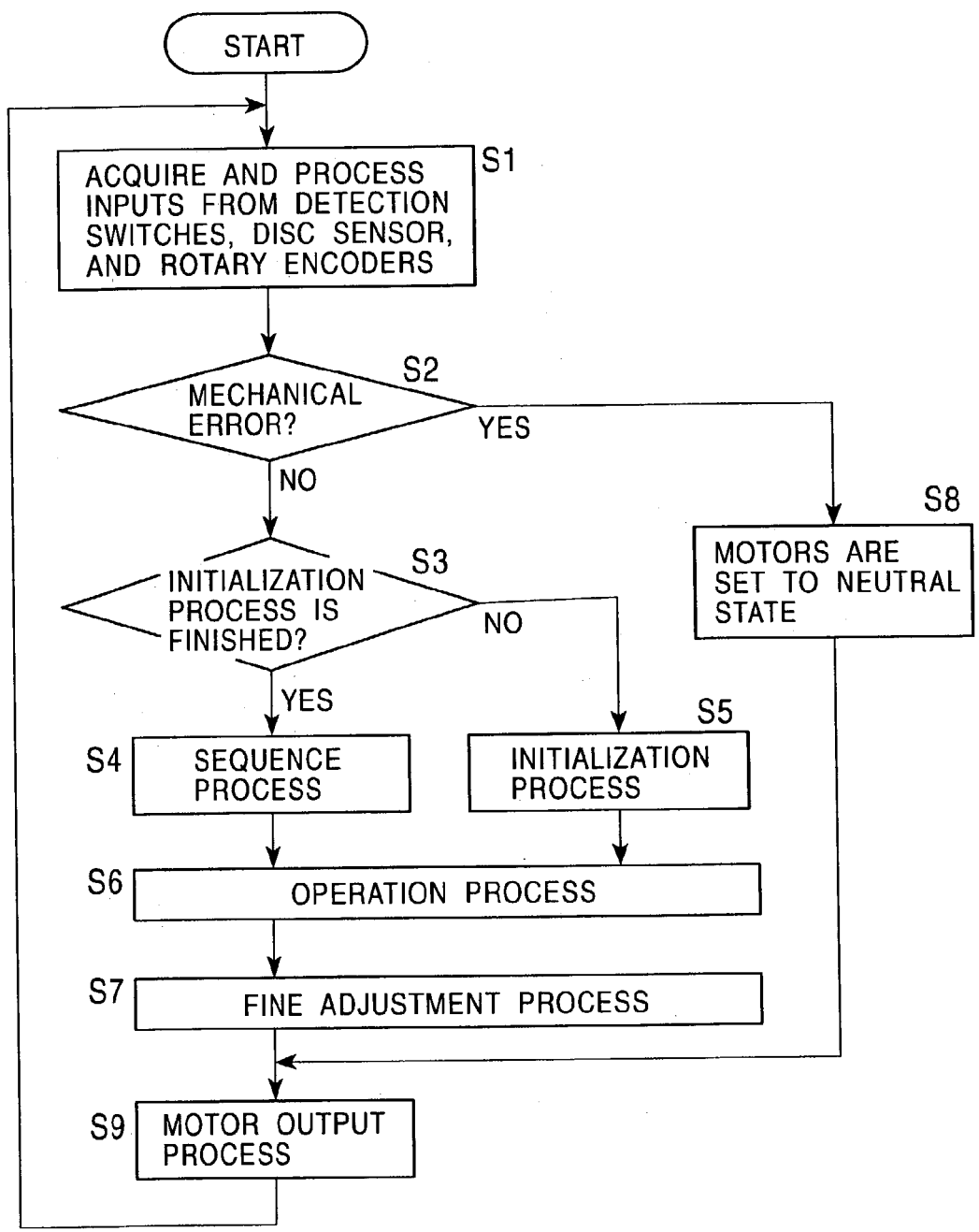

The overall control operation performed in the disc loading apparatus 1 will be described below with reference to FIG. 12.

For simplification, in the following description of the control operation performed in the disc loading apparatus 1, the first detection switch 69 is expressed as SW1, the second detection switch 70 on the right is expressed as SW2a, the second detection switch 71 on the left is expressed as SW2b, the third detection switch 72 is expressed as SW3, the fourth detection switch 73 is expressed as SW4, the fifth detection switch 74 on the right is expressed as SW5a, and the fifth detection switch 75 on the left is expressed as SW5b.

In the disc loading apparatus 1, detections and processes according to steps described below are performed at, for example, 4 millisecond cycle.

<S1>

The control operation of the disc loading apparatus 1 is started, and an input acquisition process is performed in which inputs from SW1 to SW5b, the disc sensor 53, and the rotary encoders 78 and 84 to the control operation circuit 76 is acquired and confirmed. The position of the disc-shaped recording medium 100, the size of the disc-shaped recording medium 100, the operation mode, and the vertical position of the storage unit 4 are calculated on the basis of the inputs. Detailed steps of the input acquisition process will be described below. When the input acquisition process is finished, the operation proceeds to <S2>.

<S2>

When the input acquisition process is finished, it is determined whether or not a mechanical error is detected. The mechanical error is, for example, an error which occurs when the mechanisms of the disc loading apparatus 1 do not operate normally, an error which occurs when a predetermined operation is not performed in a predetermined time, etc. If the mechanical error is not detected, the operation proceeds to <S3>. If the mechanical error is detected, the operation proceeds to <S8>.

<S3>

When the mechanical error is not detected, it is determined whether or not an initialization process is finished. The initialization process is performed by the mode-setting drive mechanism 80, the conveyor drive mechanism 82, and the storage-unit elevator mechanism 86 when a power (not shown) of the disc loading apparatus 1 is turned on. The initializing process is a preparation process for the next process after detecting the position of the disc-shaped recording medium 100 and the vertical position of the storage unit 4. If the initialization process is finished, the operation proceeds to <S4>. If the initialization process is not finished, the operation proceeds to <S5>.

<S4>

If the initialization process is finished, a sequence process is performed. The sequence process is a management process which is performed when the mode-setting drive mechanism 80, the conveyor drive mechanism 82, and the storage-unit elevator mechanism 86 are operated on the basis of the inputs from the operation buttons such as the load button, the eject button, the playback button, the stop button, the store button, the extract button, the exchange button, etc., which are operated by the operator. Detailed steps of the sequence process will be described below. When the sequence process is finished, the operation proceeds to <S6>.

<S5>

If the initialization process is not finished at <S3>, the initialization process is performed. When the initialization process is finished, the operation proceeds to <S6>.

<S6>

When the sequence operation is finished, an operation process is performed. The operation process is performed for moving the disc-shaped recording medium 100, the storage unit 4, etc., to predetermined target positions corresponding to the inputs from the operation buttons by operating the mode-setting drive mechanism 80, the conveyor drive mechanism 82, and the storage-unit elevator mechanism 86. In the operation process, outputs to the mode-setting motor 48, the drive motor 54, and the elevator motor 66 are set in accordance with the positional relationship between the current position and the target position. Detailed steps of the operation process will be described below. When the operation process is finished, the operation proceeds to <S7>.

<S7>

When the operation process is finished, a fine adjustment process is performed. The fine adjustment process is performed for finely adjusting the positions of the disc-shaped recording medium 100, the storage unit 4, etc., to the target positions, and outputs to the mode-setting motor 48, the drive motor 54, and the elevator motor 66 are set in the fine adjustment process. Detailed steps of the fine adjustment process will be described below. When the fine adjustment process is finished, the operation proceeds to <S9>.

<S8>

If the mechanical error is detected in <S2>, the mode-setting motor 48, the drive motor 54, and the elevator motor 66 are stopped in a neutral state. Each of the motors 48, 54, and 66 has four states: a braking state in which they are stopped while the brake is applied; a neutral state in which they are stopped while no brake is applied; a high-speed rotational state in which they are rotated at a high speed; a decelerated rotational state in which they are rotated while being decelerated. In addition, each of the motors 48, 54, and 66 rotates in two directions: forward and reverse. In this step, since the motors 48, 54, and 66 are stopped in the neutral state, heat does not generate as in the case in which the brake is applied. When the motors 48, 54, and 66 are set to the neutral state, the operation proceeds to <S9>. While the motors 48, 54, and 66 wait for rotational drive signals, they are set to the neutral state in order to prevent heat generation.

<S9>

A motor output process is performed in which the outputs which are set as described above are supplied to the motors 48, 54, and 66 so as to drive the motors 48, 54, and 66. Detailed steps of the motor output process will be described below. When the motor output process is finished, the operation returns to <S1> to perform the input acquisition process of the next cycle, and <S2> and the following steps are repeated.

(c) Input Acquisition Process

Figure 13:
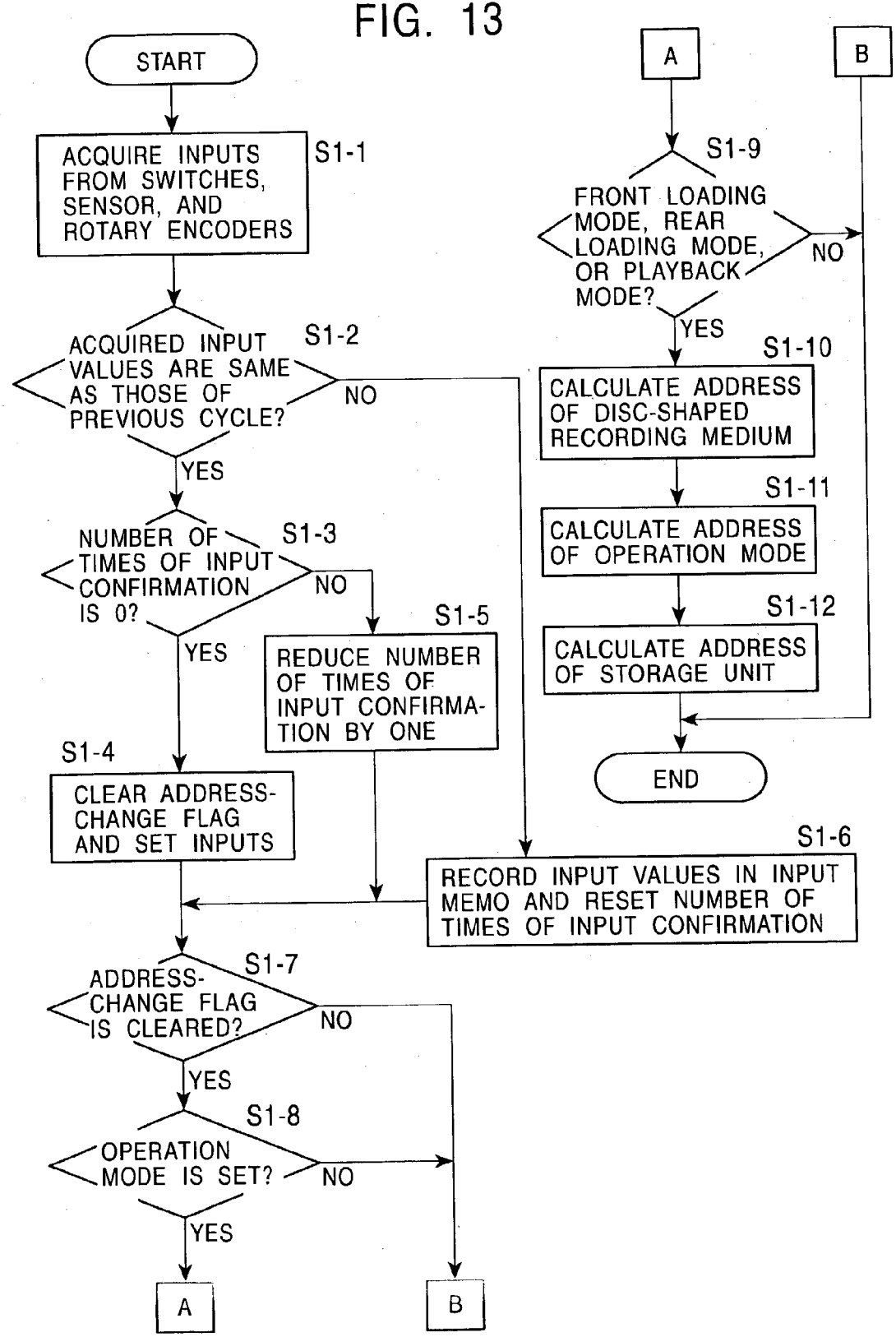

The detailed steps of the input acquisition process explained above in (b) Overall Control Operation will be described below with reference to FIG. 13.

<S1-1>

The data acquisition process is started, and inputs from SW1 to SW5*b*, the disc sensor 53, and the rotary encoders 78 and 84 are acquired and recorded in an input memo. After the inputs are recorded in the input memo, the process proceeds to <S1-2>.

<S1-2>

The inputs are acquired and recorded in the input memo at, for example, 4 millisecond cycle, and whether or not the input values recorded in the input memo in the current cycle are the same as those recorded in the previous cycle is determined each time the inputs are acquired. If the input values of the current cycle are the same as those of the previous cycle, the process proceeds to <S1-3>. If the input values of the current cycle are not the same as those of the previous cycle, the process proceeds to <S1-6>.

<S1-3>

In the disc loading apparatus 1, the inputs are set when the same set of input values is acquired for a plurality of times, for example, three times. Accordingly, it is determined whether or not the number of times of input confirmation, that is, the confirmation that the input values are the same as those acquired in the previous cycle must be additionally performed, is changed to zero. If the number of times of input confirmation is zero, the process proceeds to <S1-4>. If the number of times of input confirmation is one or more, the process proceeds to <S1-5>.

<S1-4>

An address-change flag is cleared and the inputs are set. After the inputs are set, the process proceeds to <S1-7>.

<S1-5>

If the number of times of input confirmation is one or more at <S1-3>, it is determined whether or not the input values recorded in the input memo in the current cycle are the same as those recorded in the previous cycle, and the number of times of input confirmation is reduced by one. After the number of times of input confirmation is reduced by one, the process proceeds to <S1-7>.

<S1-6>

If the input values of the current cycle are not the same as those of the previous cycle at <S1-2>, the input values are recorded in the input memo, and the number of times of input confirmation is reset to, for example, three. At the same time, the address-change flag is set. After the number of times of input confirmation is reset, the process proceeds to <S1-7>.

<S1-7>

It is determined whether or not the address-change flag is cleared. If the address-change flag is cleared, it means that the inputs are set and the process proceeds to <S1-8>. If the address-change flag is not cleared, it means that the inputs are not set and the input acquisition process is finished.

<S1-8>

It is determined whether or not one of the five operation modes (the front loading mode, the elevator mode, the rear loading mode, the chucking mode, and the playback mode) is set, that is, whether or not switching of operation modes is finished. If one of the operation modes is set, the process proceeds to <S1-9>. If none of the operation modes is set, the input acquisition process is finished.

<S1-9>

It is determined whether or not the operation mode is one of the front loading mode, the rear loading mode and the playback mode. The address (position) of the disc-shaped recording medium 100 is detected only when one of these three operation modes is set. If the operation mode is one of the front loading mode, the rear loading mode, and the playback mode, the process proceeds to <S1-10>. If the operation mode is not one of the front loading mode, the rear loading mode, and the playback mode, the input acquisition process is finished.

<S1-10>

The address of the disc-shaped recording medium 100 is calculated. The address of the disc-shaped recording medium 100 is calculated on the basis of the acquired input values. For example, a reference value of the acquired input values is determined, and the calculation is performed on the basis of this reference value. After the address of the disc-shaped recording medium 100 is calculated, the process proceeds to <S1-11>.

<Si-11>

The address of the operation mode is calculated. The address of the operation mode is calculated on the basis of the input value acquired from the first rotary encoder 78. After the address of the operation mode is calculated, the process proceeds to <S1-12>.

<S1-12>

The address of the storage unit 4 is calculated. The address of the storage unit 4 is calculated on the basis of the input value acquired from the second rotary encoder 84. When the address of the storage unit 4 is calculated, the input acquisition process is finished.

(d) Sequence Process

Figure 14:
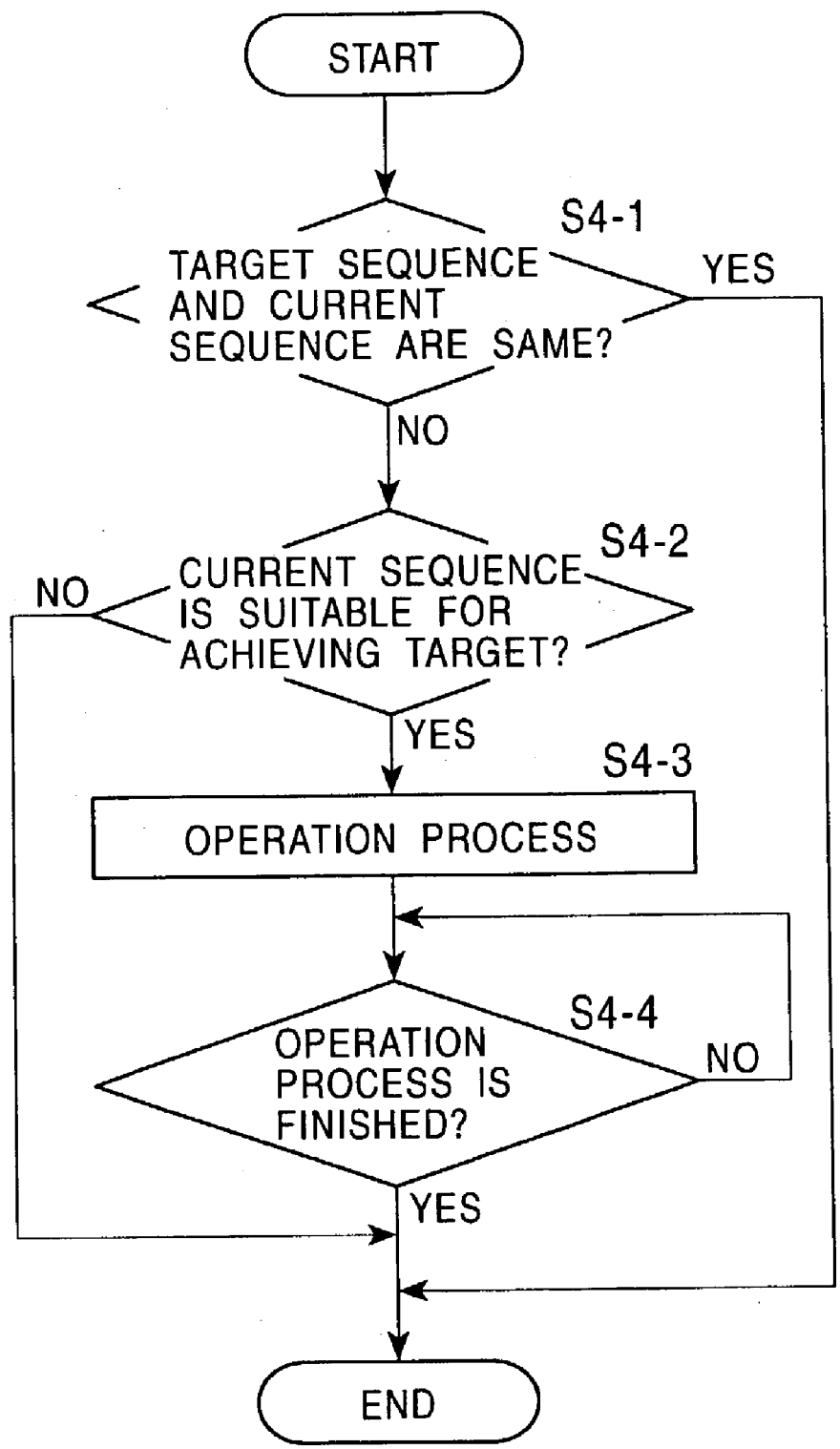

The detailed steps of the sequence process explained above in (b) Overall Control Operation will be described below with reference to FIG. 14.

<S4-1>

The sequence process is started when one of the operation buttons such as the load button, the eject button, the playback button, the stop button, the store button, the extract button, the exchange button, etc., is operated by the operator and a command signal corresponding to the operation by the operator is input. When the command signal is input, it is determined whether or not the target sequence (command) corresponding to the command signal and the current sequence (state) are the same. If the target sequence and the current sequence are the same, the sequence process is finished and the next necessary sequence process is performed. For example, if a command signal to play back the disc-shaped recording medium 100 is input when the playback operation of the disc-shaped recording medium 100 is being performed, the sequence process is finished. If the target sequence and the current sequence are not the same, the process proceeds to <S4-2>.

<S4-2>

It is determined whether or not the current sequence is suitable for achieving the target. If the current sequence is suitable for achieving the target, the process proceeds to <S4-3>. If the current sequence is not suitable for achieving the target, the sequence process is finished.

<S4-3>

The operation process is performed for achieving the target. Detailed steps of the operation will be described below. After the operation process, the operation proceeds to <S4-4>.

<S4-4>

It is determined whether or not the operation process is finished and the target is achieved. If the operation process is finished and the target is achieved, the sequence process is finished. If the operation process is not finished and the target is not achieved, whether or not the operation process is finished and the target is achieved is repeatedly determined until the operation process is finished and the target is achieved.

(e) Operation Process

Figure 15:
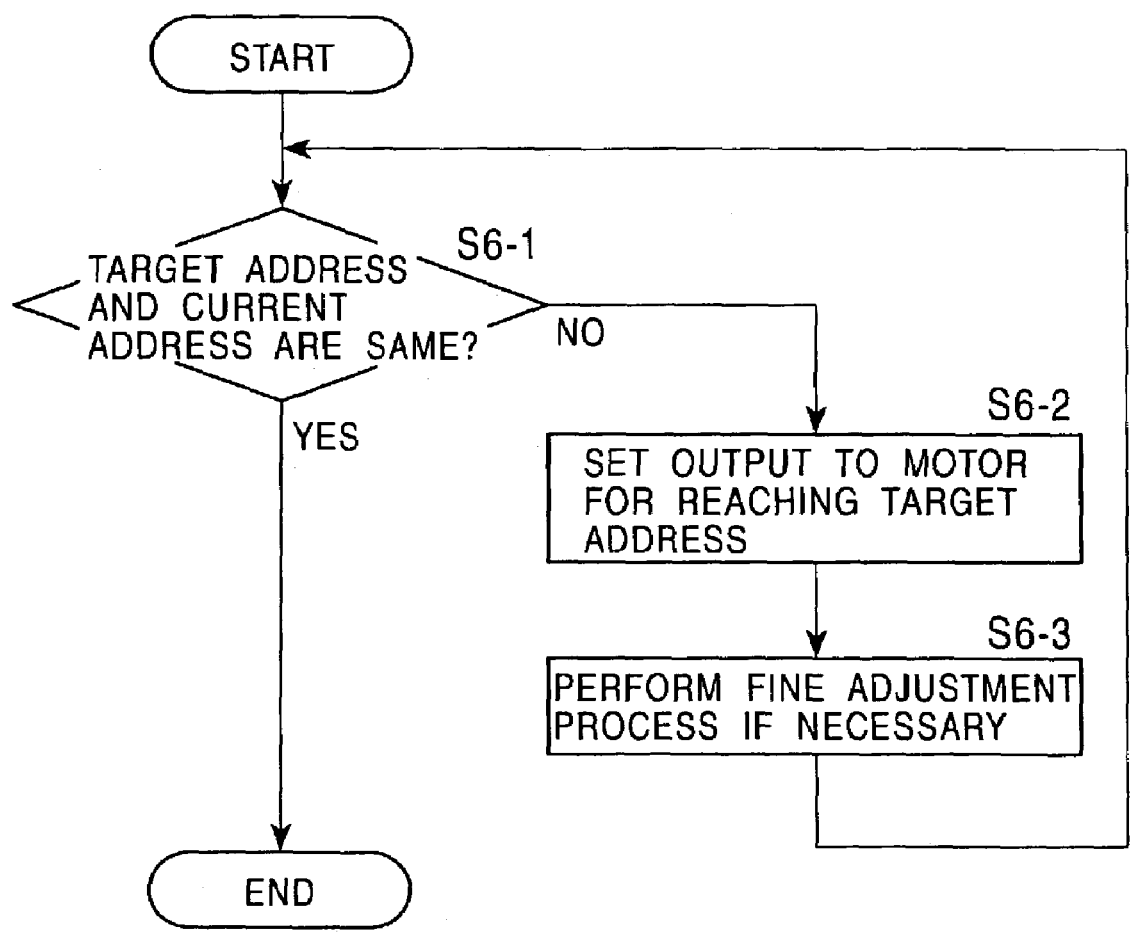

The detailed steps of the operation process explained above in (b) Overall Control Operation and (d) Sequence Process will be described below with reference to FIG. 15.

<S6-1>

The operation process is started, and it is determined whether or not the target address and the current address (position of the disc-shaped recording medium 100) are the same. If the target address and the current address are the same, the operation process is finished. If the target address and the current address are not the same, the process proceeds to <S6-2>.

<S6-2>

An output to the mode-setting motor 48, the drive motor 54, or the elevator motor 66 for reaching the target address is set. After the output is set, the process proceeds to <S6-3>.

<S6-3>

When an operation for finely moving the disc-shaped recording medium 100, the storage unit 4, etc., to the target position is necessary, the fine adjustment process is performed. Detailed steps of the fine adjustment process will be described below. If the fine adjustment process is not necessary, or when the fine adjustment process is finished, the process returns to <S6-1>.

(f) Fine Adjustment Process

Figure 16:
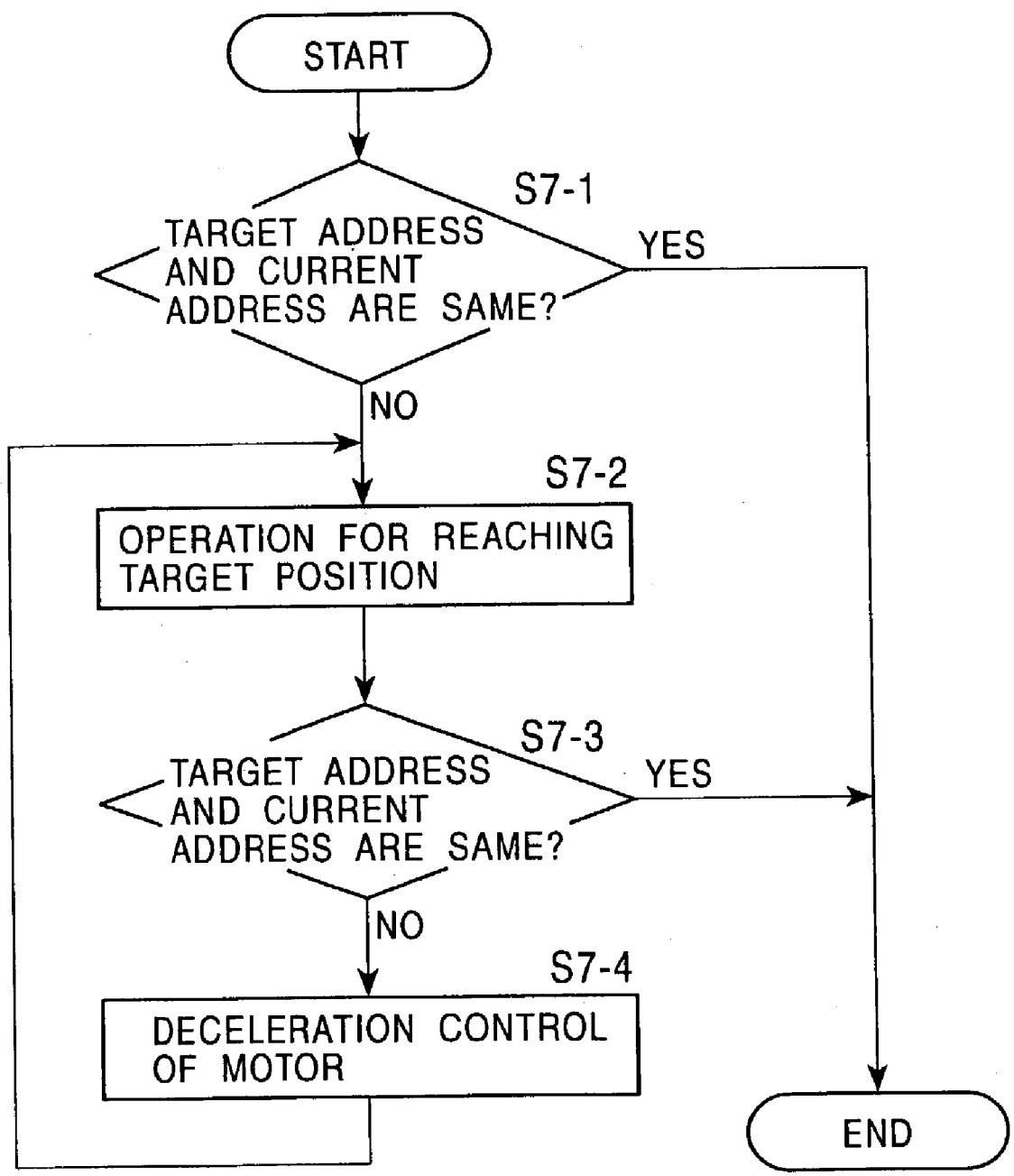

The detailed steps of the fine adjustment process explained above in (b) Overall Control Operation and (e) Operation Process will be described below with reference to FIG. 16.

<S7-1>

The fine adjustment process is started, and it is determined whether or not the target address and the current address are the same. If the target address and the current address are the same, the fine adjustment process is finished. If the target address and the current address are not the same, the process proceeds to <S7-2>.

<S7-2>

The operation for reaching the target position is performed, and the mode-setting motor 48, the drive motor 54, or the elevator motor 66 is rotated. After the operation for reaching the target positions is performed, the process proceeds to <S7-3>.

<S7-3>

It is determined whether or not the target address and the current address are the same. If the target address and the current address are the same, the fine adjustment process is finished. If the target address and the current address are not the same, the process proceeds to <S7-4>.

<S7-4>

Deceleration control of the mode-setting motor 48, the drive motor 54, or the elevator motor 66 is performed. The deceleration control is performed by, for example, controlling the on/off times of the motor 48, 54, or 66. In the deceleration control, the rotating direction of the motor 48, 54, or 66 is reversed if the target position is overreached, and the motor 48, 54, or 66 is continuously rotated without reversing the rotating direction if the target position is not yet reached. After the deceleration control, the process returns to <S7-2>.

(g) Motor Output Process

Figure 17:
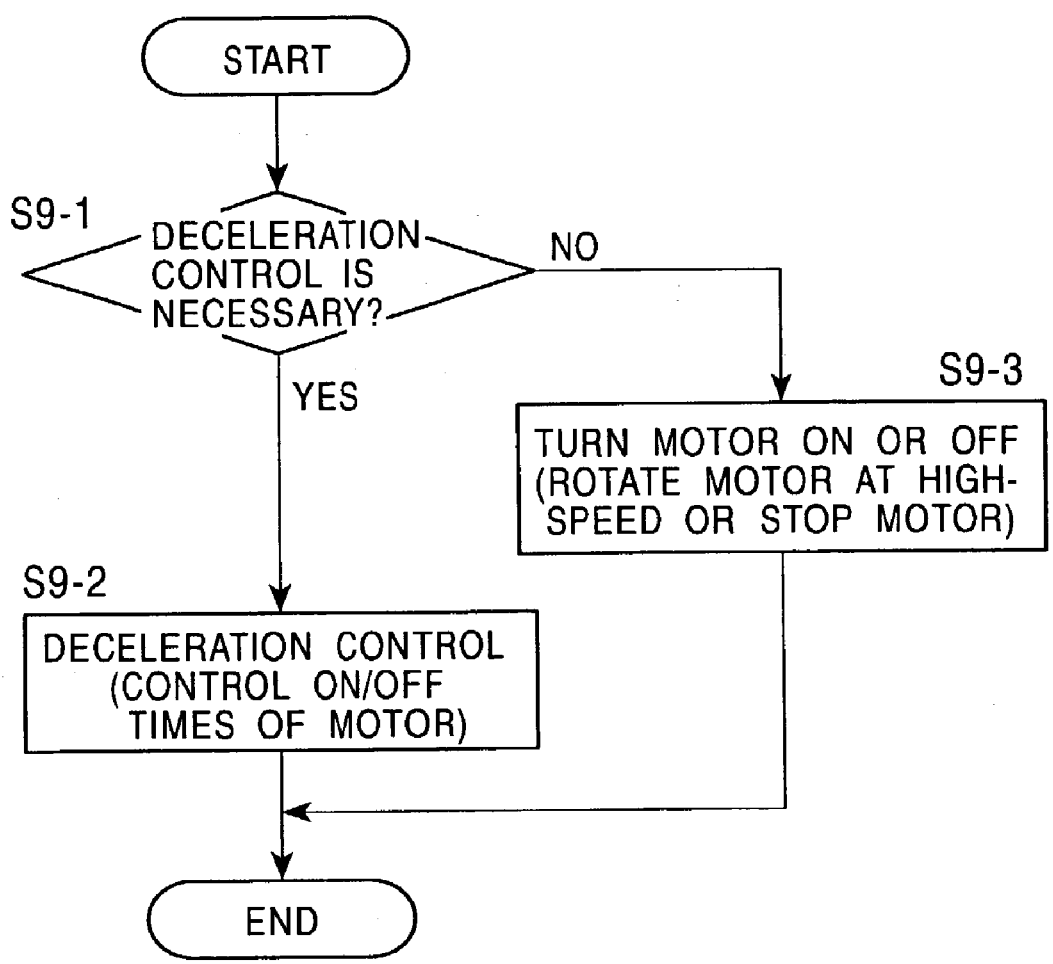

The detailed steps of the motor output process explained above in (b) Overall Control Operation will be described below with reference to FIG. 17.

<S9-1>

The motor output process is started, and it is determined whether or not the deceleration control of the motor 48, 54, or 66 is necessary. If the deceleration control is necessary, the process proceeds to <S9-2>. If the deceleration control is not necessary, the process proceeds to <S9-3>.

<S9-2>

The deceleration control is performed. As described above, the deceleration control is performed by controlling the on/off times the motor 48, 54, or 66. For example, the on/off ratio is set to 1:4 to achieve 20% deceleration and the on/off ratio is set to 1:1 to achieve 50% deceleration. After the deceleration control, the motor output process is finished.

<S9-3>

If the deceleration control is not performed, the motor 48, 54, or 66 is either turned on to rotate at a high speed or turned off to stop, and is driven in accordance with the setting thereof. There are two kinds of settings in which the motors 48, 54, and 66 are off: a braking state in which the motors 48, 54, and 66 are stopped while the brake is applied and a neutral state in which they are stopped while no brake is applied. In addition, there are also two kinds of settings in which the motors 48, 54, and 66 are on: a forward rotation in which the motors 48, 54, and 66 are rotated in the forward direction and a rearward rotation in which they are rotated in the reverse direction. For example, the disc-shaped recording medium 100 is conveyed in the direction from the disc insertion slot 2a to the storage unit 4 when the drive motor 54 is set to rotate in the reverse direction, and is conveyed in the direction from the storage unit 4 to the disc insertion slot 2a when the drive motor 54 is set to rotate in the forward direction. After the motor 48, 54, or 66 is driven, the motor output process is finished.

(h) Control Operation in Front Loading Mode (Conveyance to Playback Unit)

Figure 18:
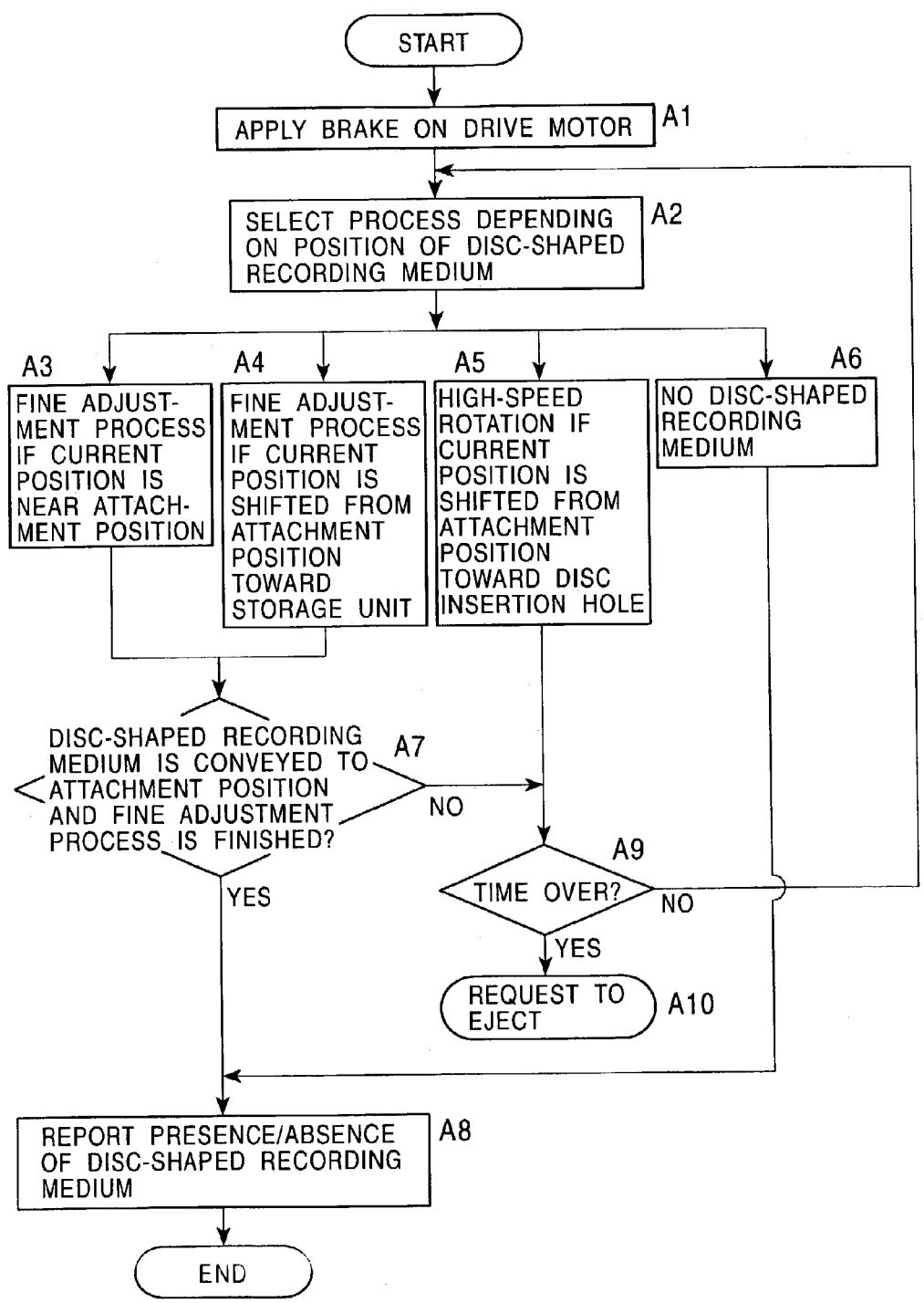

Next, the control operation in which the disc-shaped recording medium 100 is conveyed from the disc insertion slot 2a of the playback unit 3 in the front loading mode will be described below with reference to FIG. 18.

<A1>

The control operation is started, and the brake is applied to the drive motor 54 for, for example, 100 msec. After the brake is applied, the operation proceeds to <A2>.

<A2>

A step to be performed is selected from among <A3> to <A6>, which will be described below, depending on the position of the disc-shaped recording medium 100.

<A3>

When the center hole of the disc-shaped recording medium 100 is positioned approximately directly above the disc table 52, that is, when the disc-shaped recording medium 100 is at a position near an attachment position at which the disc-shaped recording medium 100 can be attached to the disc table 52, the fine adjustment process is performed. After the fine adjustment process, the operation proceeds to <A7>.

<A4>

When the disc-shaped recording medium 100 is shifted from the attachment position toward the storage unit 4, the fine adjustment process is performed. After the fine adjustment process, the operation proceeds to <A7>.

<A5>

When the disc-shaped recording medium 100 is shifted from the attachment position toward the disc insertion slot 2a, the drive motor 54 is rotated in the reverse direction at a high speed so as to convey the disc-shaped recording medium 100 toward the attachment position. After the high-speed rotation of the drive motor 54, the operation proceeds to <A9>.

<A6>

When the disc-shaped recording medium 100 is not inserted through the disc insertion slot 2a and the presence thereof is not detected, the operation proceeds to <A8>.

<A7>

It is determined whether or not the disc-shaped recording medium 100 is conveyed to the attachment position and the fine adjustment process is finished. If the fine adjustment process is finished, the operation proceeds to <A8>. If the fine adjustment process is not finished, the operation proceeds to <A9>.

<A8>

The presence/absence of the disc-shaped recording medium 100 is reported. After reporting, the control operation is finished.

<A9>

It is determined whether or not the process is performed within a set time, that is, whether or not the time is over. If the time is over, the operation proceeds to <A10>. If the time is not over, the operation returns to <A2>.

<A10>

A request for a command to eject the disc-shaped recording medium 100 toward the disc insertion slot 2a is issued, and the operation waits for the command.

(i) Control Operation in Rear Loading Mode (Conveyance to Storage Unit)

Figure 19:
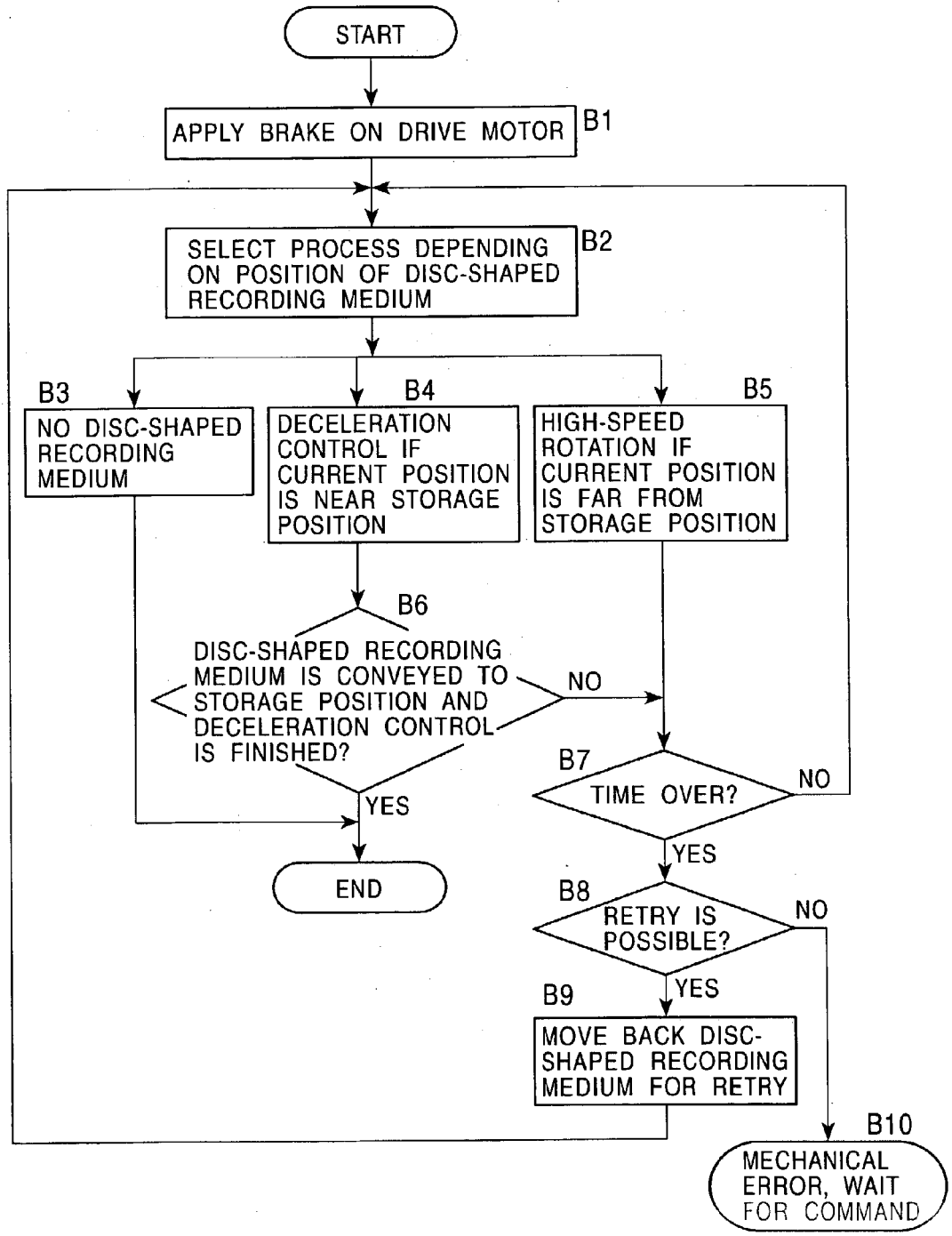

Next, the control operation in which the disc-shaped recording medium 100 is conveyed from the playback unit 3 to the storage unit 4 in the rear loading mode will be described below with reference to FIG. 19.

<B1>

The control operation is started, and the brake is applied to the drive motor 54 for, for example, 100 milliseconds. After the brake is applied, the operation proceeds to <B2>.

<B2>

A step to be performed is selected from among <B3> to <B5>, which will be described below, depending on the position of the disc-shaped recording medium 100.

<B3>

When the presence of the disc-shaped recording medium 100 is not detected, the control operation is finished.

<B4>

When the disc-shaped recording medium 100 is at a position near a storage position at which the disc-shaped recording medium 100 is stored in one of the disc-receiving members 4a of the storage unit 4, the deceleration control of the drive motor 54 is performed. After the deceleration control, the operation proceeds to <B6>.

<B5>

When the disc-shaped recording medium 100 is not at a position near the storage position, the drive motor 54 is rotated in the reverse direction at a high speed so as to convey the disc-shaped recording medium 100 toward the storage position. After the high-speed rotation of the drive motor 54, the operation proceeds to <B7>.

<B6>

It is determined whether or not the disc-shaped recording medium 100 is conveyed to the storage position and the deceleration control is finished. If the deceleration control is finished, the control operation is finished. If the deceleration control is not finished, the operation proceeds to <B7>.

<B7>

It is determined whether or not the time is over. If the time is over, the operation proceeds to <B8>. If the time is not over, the operation returns to <B2>.

<B8>

It is determined whether or not the disc-shaped recording medium 100 can be conveyed again, that is, whether or not retry is possible. If retry is possible, the operation proceeds to <B9>. If retry is not possible, the operation proceeds to <B10>.

<B9>

The disc-shaped recording medium 100 is moved back toward the playback unit 3 by a predetermined distance for retry. The number of times retry can be performed may be set arbitrarily, and is set to two in the disc loading apparatus 1.

<B10>

It is determined that a mechanical error has occurred when, for example, the number of times retry can be performed is exceeded, and the operation waits for the next command.

(j) Control Operation in Rear Loading Mode (Conveyance to Playback Unit)

Figure 20:
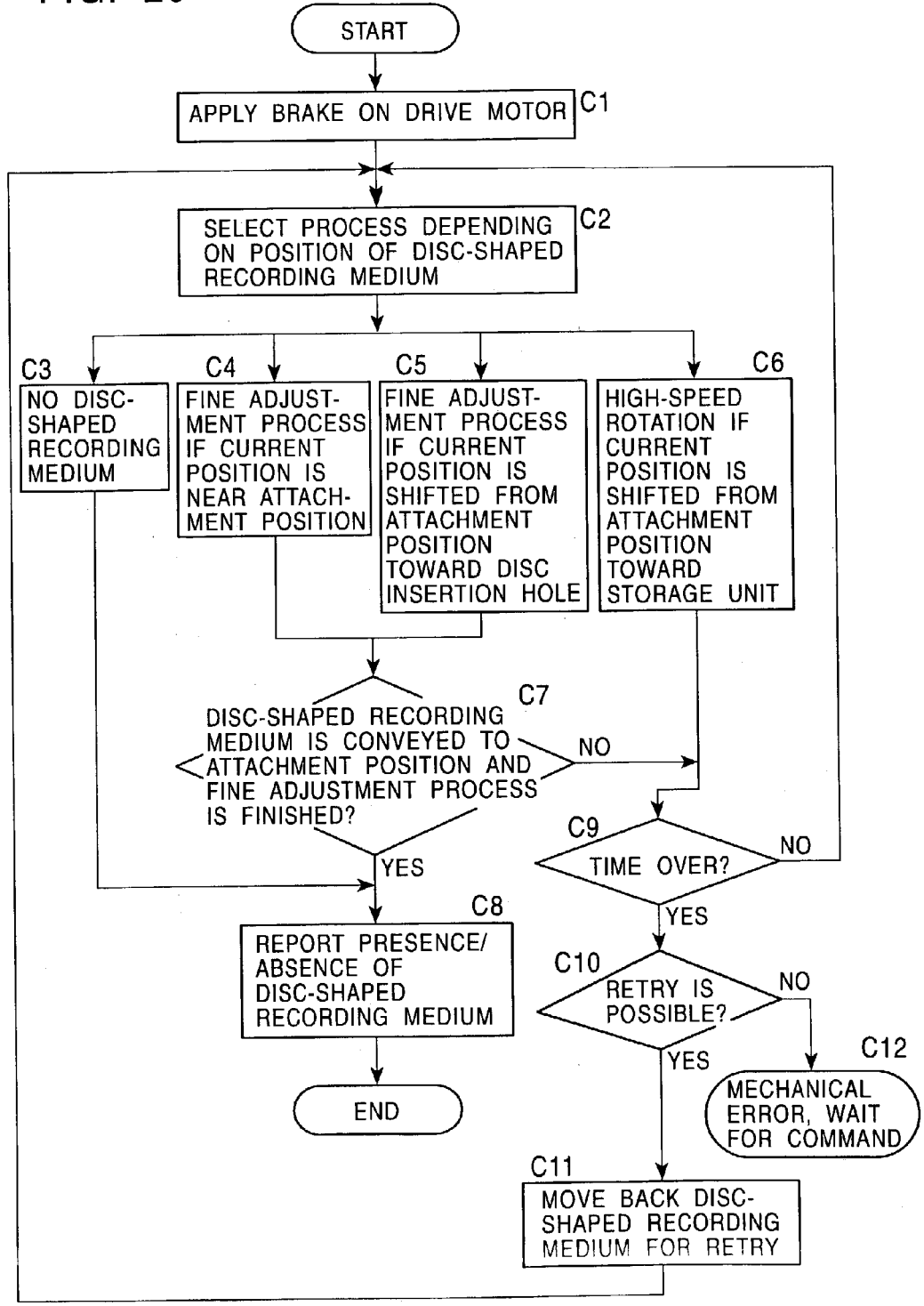

Next, the control operation in which the disc-shaped recording medium 100 is conveyed from the storage unit 4 to the playback unit 3 in the rear loading mode will be described below with reference to FIG. 20.

<C1>

The control operation is started, and the brake is applied to the drive motor 54 for, for example, 100 milliseconds. After the brake is applied, the operation proceeds to <C2>.

<C2>

A step to be performed is selected from among <C3> to <C6>, which will be described below, depending on the position of the disc-shaped recording medium 100.

<C3>

When the presence of the disc-shaped recording medium 100 is not detected, the operation proceeds to <C8>.

<C4>

When the disc-shaped recording medium 100 is at a position near the attachment position, the fine adjustment process is performed. After the fine adjustment process, the operation proceeds to <C7>.

<C5>

When the disc-shaped recording medium 100 is shifted from the attachment position toward the disc insertion slot 2a, the fine adjustment process is performed. After the fine adjustment process, the operation proceeds to <C7>.

<C6>

When the disc-shaped recording medium 100 is shifted from the attachment position toward the storage unit 4, the drive motor 54 is rotated in the forward direction at a high speed so as to convey the disc-shaped recording medium 100 toward the attachment position. After the high-speed rotation of the drive motor 54, the operation proceeds to <C9>.

<C7>

It is determined whether or not the disc-shaped recording medium 100 is conveyed to the attachment position and the fine adjustment process is finished. If the fine adjustment process is finished, the operation proceeds to <C8>. If the fine adjustment process is not finished, the operation proceeds to <C9>.

<C8>

The presence/absence of the disc-shaped recording medium 100 is reported. After reporting, the control operation is finished.

<C9>

It is determined whether or not the time is over. If the time is over, the operation proceeds to <C10>. If the time is not over, the operation returns to <C2>.

<C10>

It is determined whether or not retry is possible. If retry is possible, the operation proceeds to <C11>. If retry is not possible, the operation proceeds to <C12>.

<C11>

The disc-shaped recording medium 100 is moved back toward the storage unit 4 by a predetermined distance for retry. The number of times retry can be performed may be set arbitrarily, and is set to two in the disc loading apparatus 1.

<C12>

It is determined that a mechanical error has occurred, and the operation waits for the next command.

(k) Control Operation in Front Loading Mode (Conveyance to Disc Insertion Slot)

Figure 21:
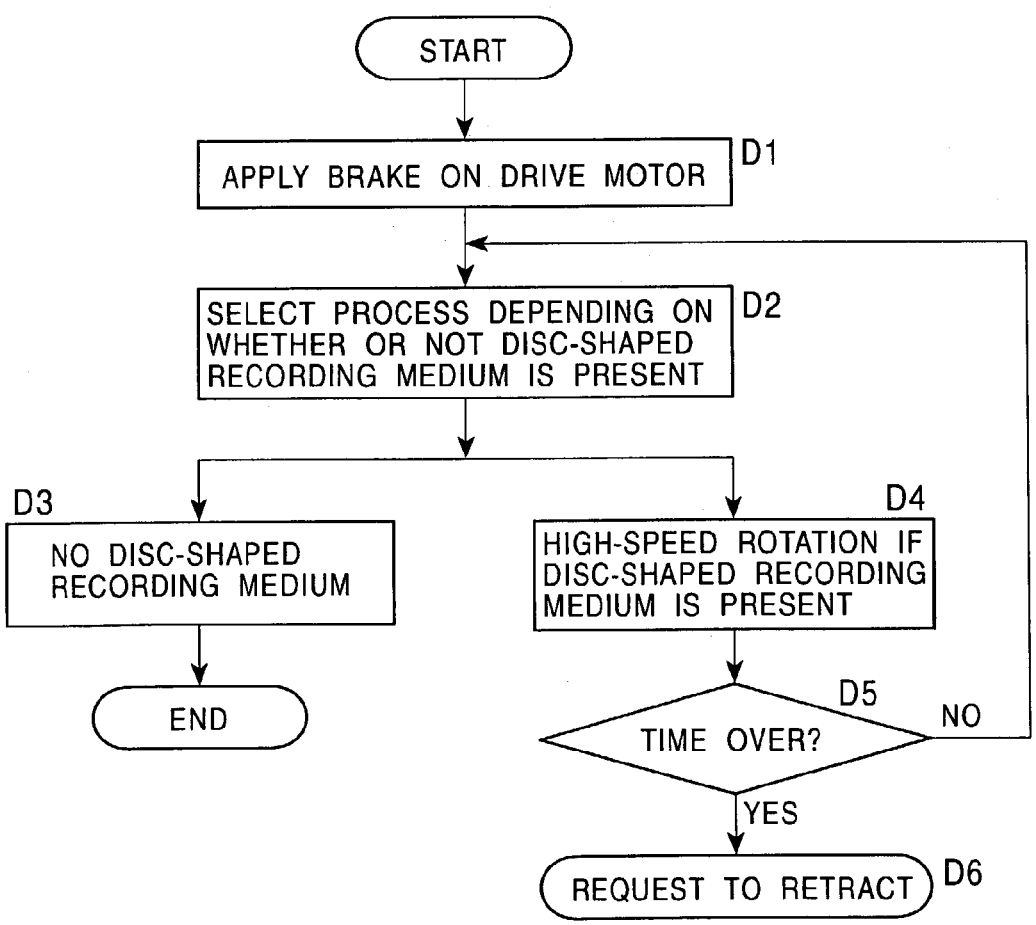
Figure 22:
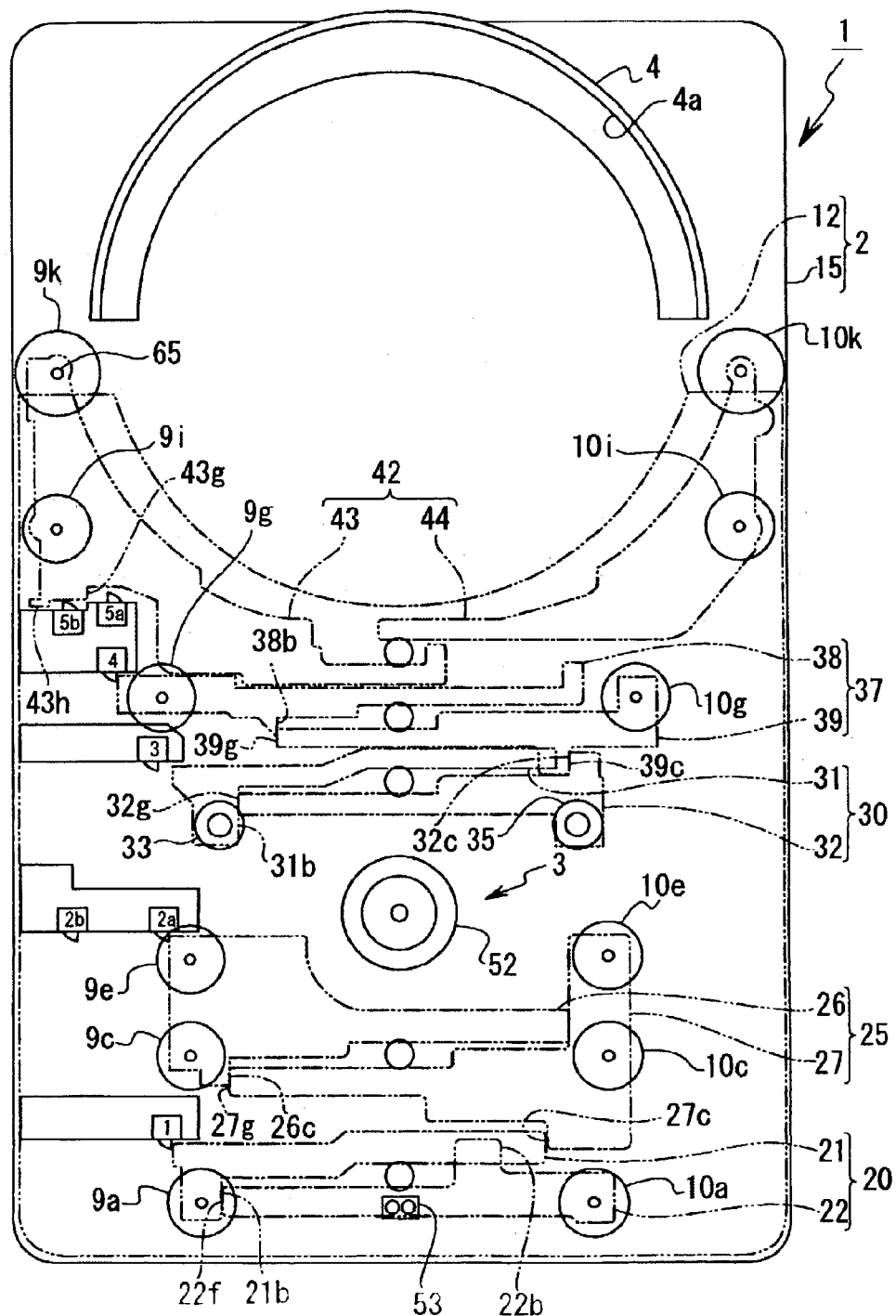
Figure 23:
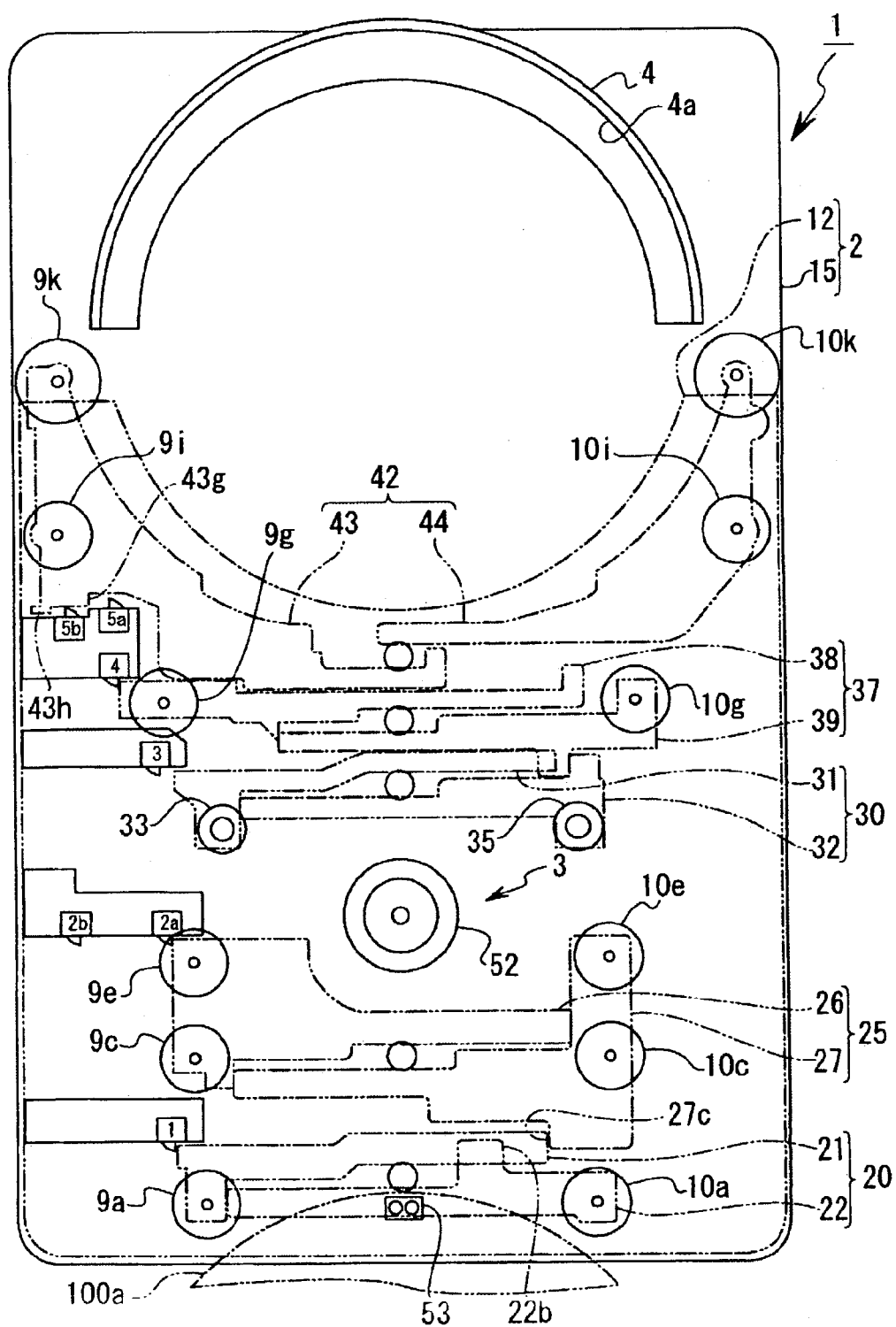

Next, the control operation in which the disc-shaped recording medium 100 is conveyed from the playback unit 3 to the disc insertion slot 2a in the front loading mode will be described below with reference to FIG. 21.

<D1>

The control operation is started, and the brake is applied to the drive motor 54 for, for example, 100 milliseconds. After the brake is applied, the operation proceeds to <D2>.

<D2>

A step to be performed is selected from among <D3> and <D4>, which will be described below, depending on the position of the disc-shaped recording medium 100.

<D3>

When the presence of the disc-shaped recording medium 100 is not detected, the control operation is finished.

<D4>

When the presence of the disc-shaped recording medium 100 is detected, the drive motor 54 is rotated in the forward direction at a high speed so as to convey the disc-shaped recording medium 100 toward the disc insertion slot 2a. After the high-speed rotation of the drive motor 54, the operation proceeds to <D5>.

<D5>

It is determined whether or not the time is over. If the time is over, the operation proceeds to <D6>. If the time is not over, the operation returns to <D2>.

<D6>

A request for a command to retract the disc-shaped recording medium 100 to the playback unit 3 is issued, and the operation waits for the command.

(4) Operation of Disc Loading Apparatus

The operation of the disc loading apparatus 1 will be described below with reference to FIGS. 22 to 48.

In the disc loading apparatus 1, the disc-shaped recording medium 100 is conveyed while being retained between the feed rollers 9 and the feed members 10.

Figure 44:
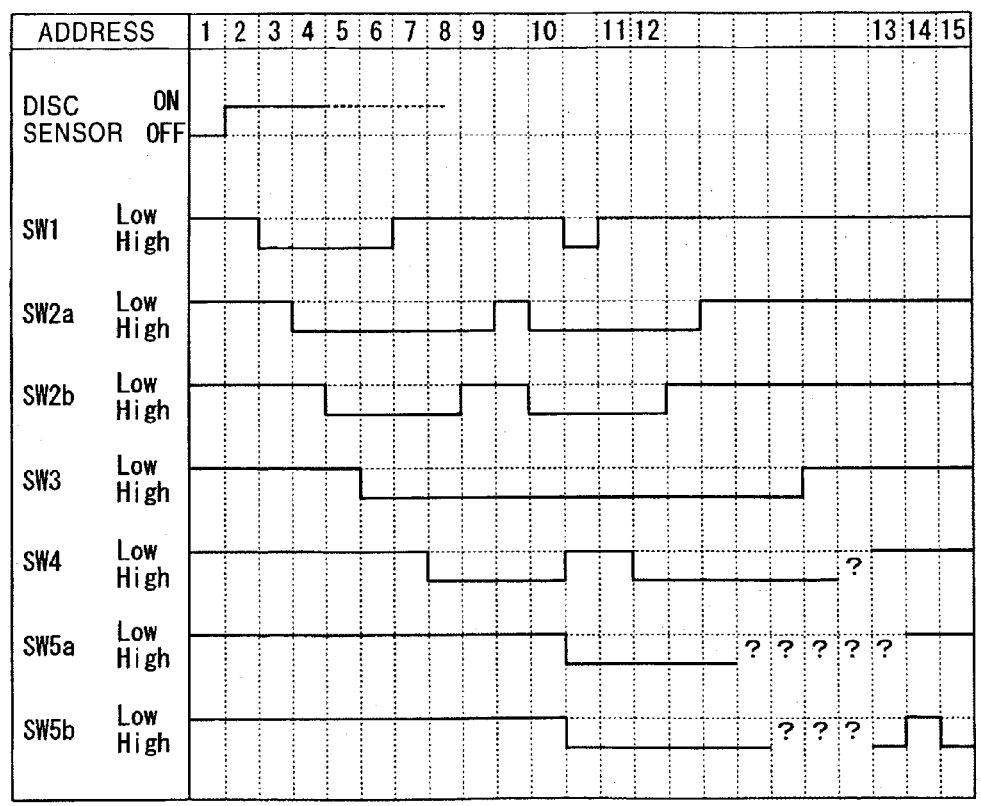

FIGS. 22 to 42 are plan views showing the operational states of the detection switches 69 to 75 of the slide units 20, 25, 30, 37, and 42. FIG. 43 is a table showing the states of the disc sensor 53 and the detection switches 69 to 75 when the position (address) of the large disc-shaped recording medium 10a is detected. FIG. 44 is a timechart of FIG. 43. FIG. 45 is a table showing the states of the disc sensor 53 and the detection switches 69 to 75 when the size of the large disc-shaped recording medium 100a is detected. In FIGS. 43 to 45, "AD" followed by a number denotes the address of the large disc-shaped recording medium 100a.

FIG. 46 is a table showing the states of the disc sensor 53 and the detection switches 69 to 75 when the position (address) of the small disc-shaped recording medium 100b is detected. FIG. 47 is a timechart of FIG. 46. FIG. 48 is a table showing the states of the disc sensor 53 and the detection switches 69 to 75 when the size of the small disc-shaped recording medium 100b is detected. In FIGS. 46 to 48, "ad" followed by a number denotes the address of the small disc-shaped recording medium 100b.

In FIGS. 43, 45, 46, and 48, "H" indicates that the detection switch is in the 'high' state, "(H)" indicates that the detection switch is in the 'high' state when it serves to detect the address, "(L)" indicates that the detection switch is in the 'low' state when it serves to detect the address, blank columns indicate that the detection switch is in the 'low' state. In addition, "H/L" indicates that the detection switch is in either the 'high' or the 'low' state. It is known that there are slight differences in diameter between the large disc-shaped recording media 100a and between the small disc-shaped recording media 100b. Thus, when the disc-shaped recording media having slightly different diameters are conveyed, there is a case in which the states of the detection switches may be in either the 'high' state or the 'low' state depending on the exact diameter of the disc-shaped recording media. Accordingly, such case is indicated by "H/L".

(a) Front Loading Mode

The front loading mode in which the disc-shaped recording medium 100 is conveyed between the disc insertion slot 2a and the playback unit 3 when it is inserted through the disc insertion slot 2a will be described below. First, the states of the components in the front loading mode before the disc-shaped recording medium 100 is inserted through the disc insertion slot 2a will be described with reference to FIG. 22.

In the first slide unit 20 supported by the supporting chassis 12, the restraining portion 22f of the driven slider 22 is in contact with the restraining projection 21b of the driving slider 21 due to the spring force applied by the spring member 23, so that the driving slider 21 and the driven slider 22 are at the ends of the moving ranges in the direction in which they move toward each other. Accordingly, the first feed roller 9a retained by the driving slider 21 and the first feed member 10a attached to the driven slider 22 are at the ends of the moving ranges in the direction in which they move toward each other.

In the second slide unit 25, the restraining portion 27g of the driven slider 27 is in contact with the restraining projection 26c of the driving slider 26 and the restraining portion 26g of the driving slider 26 is in contact with the restraining projection 27b of the driven slider 27 due to the spring force applied by the spring member 28, so that the driving slider 26 and the driven slider 27 are at the ends of the moving ranges in the direction in which they move toward each other. Accordingly, the second and the third feed rollers 9c and 9e retained by the driving slider 26 and the second and the third feed members 10c and 10e attached to the driven slider 27 are at the ends of the moving ranges in the direction in which they move toward each other. At this time, the pushing projection 22b of the driven slider 22 of the first slide unit 20 is positioned on the left of the projection 27c of the driven slider 27 with a predetermined gap therebetween.

In the third slide unit 30, the restraining portion 32g of the second slider 32 is in contact with the restraining projection 31b of the first slider 31 due to the spring force applied by the spring member 34, so that the first slider 31 and the second slider 32 are at the ends of the moving ranges in the direction in which they move toward each other. Accordingly, the first restraining roller 33 retained by the first slider 31 and the second restraining roller 35 retained by the second slider 32 are at the ends of the moving ranges in the direction in which they move toward each other.

In the fourth slide unit 37, the restraining portion 39g of the driven slider 39 is in contact with the restraining projection 38b of the driving slider 38 due to the spring force applied by the spring member 40, so that the driving slider 38 and the driven slider 39 are at the ends of the moving ranges in the direction in which they move toward each other. Accordingly, the fourth feed roller 9g retained by the driving slider 38 and the fourth feed member 10g attached to the driven slider 39 are at the ends of the moving ranges in the direction in which they move toward each other. At this time, the pushing projection 39c of the driven slider 39 is in contact with the projection 32c of the second slider 32 of the third slide unit 30 at the left side of the projection 32c.

In the fifth slide unit 42, the rightward movement of the supporting shaft 65 which supports the sixth feed roller 9k is restrained by a restraining member (not shown), so that the driving slider 43 and the driven slider 44 are at the ends of the moving ranges in the direction in which they move away from each other. Accordingly, the fifth and the sixth feed rollers 9i and 9k retained by the driving slider 43 and the fifth and the sixth feed members 10i and 10k attached to the driven slider 44 are at the ends of the moving ranges in the direction in which they move away from each other.

The base unit 49 is inclined with respect to the base chassis 15 in a state in which the disc table 52 is at the lower end of the moving range.

The disc sensor 53 is in the 'off' state since neither the disc-shaped recording medium 100a nor the disc-shaped recording medium 100b is inserted through the disc insertion slot 2a (see AD1 in FIGS. 43 to 45 and ad1 in FIGS. 46 to 48). Since the disc sensor 53 is in the 'off' state, it is determined that the neither the disc-shaped recording medium 100a nor the disc-shaped recording medium 100b is inserted through the disc insertion slot 2a.

All of the detection switches 69 to 75 are in the 'low' state since none of the detection switches 69 to 75 are operated by the slide units 20, 25, 30, 37, and 42 (see AD1 in FIGS. 43 to 45 and ad1 in FIGS. 46 to 48).

(b) Conveyance Operation Between Disc Insertion Slot and Playback Unit (Large Disc-Shaped Recording Medium)

Next, the operation in which the large disc-shaped recording medium 100a is conveyed between the disc insertion slot 2a and the playback unit 3 will be described below with reference to FIGS. 22 to 31 and FIGS. 43 to 45.

The states of the components in the front loading mode before the disc-shaped recording medium 100a is inserted through the disc insertion slot 2a are as described above (see FIG. 22). In this state, when the disc-shaped recording medium 100a is inserted through the disc insertion slot 2a, the peripheral portion of the disc-shaped recording medium 100a reaches a position above the disc sensor 53 (see FIG. 23). Accordingly, the state of the disc sensor 53 is changed to the 'on' state, and the insertion of the disc-shaped recording medium 100a through the disc insertion slot 2a is detected (see AD2 in FIGS. 43 to 45).

Although the state of the disc sensor 53 may also be in the 'on' state at AD3 and the following addresses, which will be described below, the state of the disc sensor 53 is not used for the address detection at AD3 and the following addresses.

When the state of the disc sensor 53 is changed to the 'on' state, the drive motor 54 is rotated in the reverse direction and the feed rollers 9a, 9c, 9e, 9g, 9i, and 9k are rotated counterclockwise in a plan view, as described above.

Figure 24:
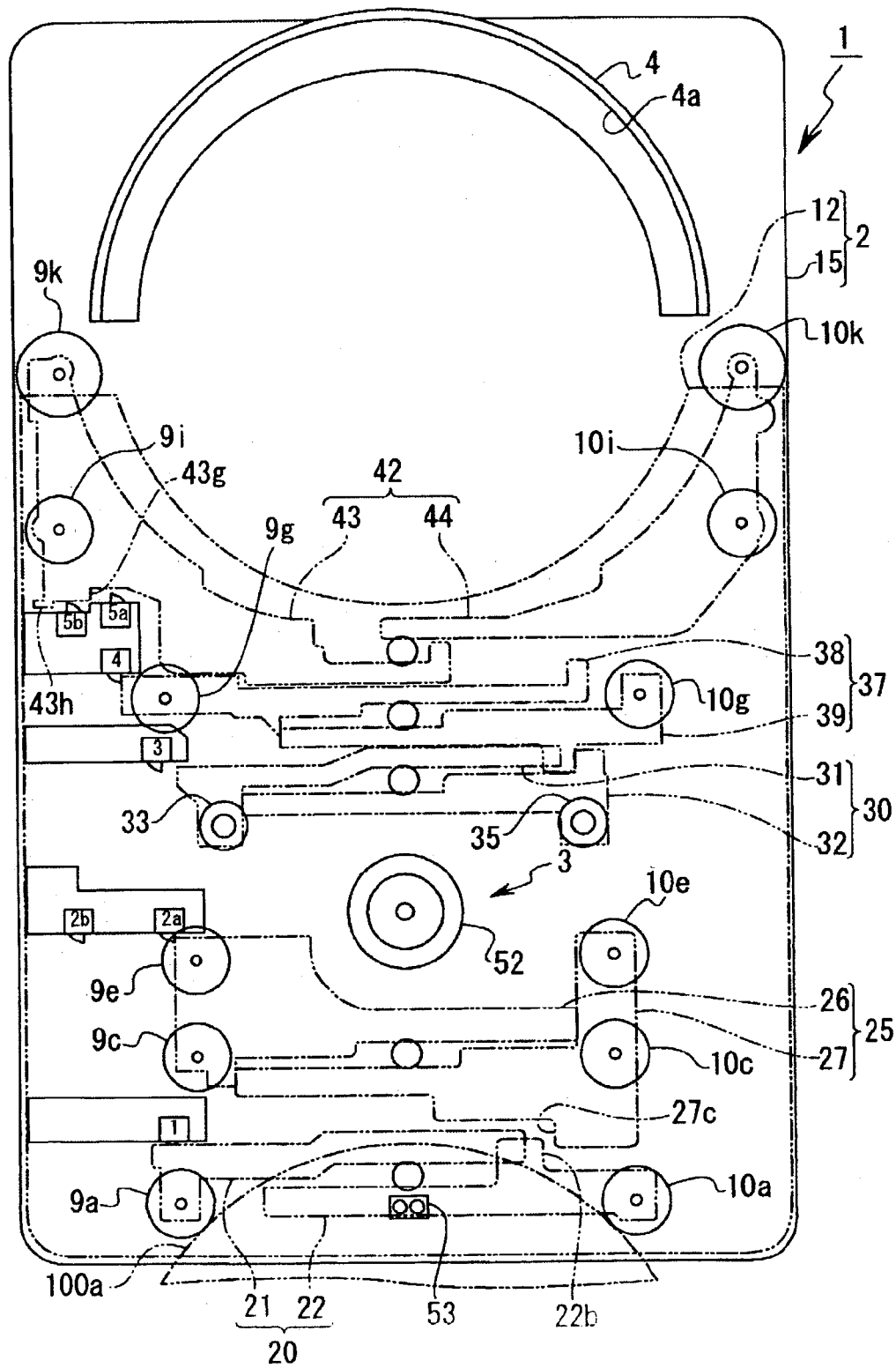

When the disc-shaped recording medium 100a is inserted through the disc insertion slot 2a and the peripheral surface thereof is pushed against the feed roller 9a and the feed member 10a, the disc-shaped recording medium 100a is pulled into the housing 2 due to the rotation of the feed roller 9a (see FIG. 24). While the disc-shaped recording medium 100a is being pulled, the feed roller 9a rolls on the peripheral surface of the disc-shaped recording medium 100a.

When the disc-shaped recording medium 100a is pulled in, the distance between the feed roller 9a and the feed member 10a constantly changes according to the position of the disc-shaped recording medium 100a, and the driving slider 21 and the driven slider 22 of the first slide unit 20 slide away from each other with respect to the supporting chassis 12 against the spring power applied by the spring member 23 (see FIG. 24).

When the driving slider 21 and the driven slider 22 slide away from each other, SW1 is operated by the driving slider 21 and the state thereof is changed to the 'high' state (see FIG. 24 and AD3 in FIGS. 43 to 45).

As described above, when the state of the disc sensor 53 is changed to the 'on' state, the drive motor 54 is rotated in the reverse direction and the disc-shaped recording medium 10a is pulled into the housing 2. However, when, for example, a part or all of the disc-shaped recording medium 100a is transparent or translucent, there is a risk that the state of the disc sensor 53 will not be changed to the 'on' state and the drive motor 54 will not start rotating even when the disc-shaped recording medium 100a is inserted.

In order to prevent this, in the disc loading apparatus 1, the rotation of the drive motor 54 is also started when the disc-shaped recording medium 100a is inserted into the housing 2, the first feed roller 9a and the first feed member 10a are pushed rearward by the disc-shaped recording medium 10a so that the driving slider 21 and the driven slider 22 of the first slide unit 20 slide away from each other, and the state of SW1 is changed to the 'high' state.

When the disc-shaped recording medium 100a is pulled further in and the driving slider 21 and the driven slider 22 slide further away from each other against the spring force applied by the spring member 23, the pushing projection 22b of the driven slider 22 pushes the projection 27c of the driven slider 27 of the second slide unit 25 to the right. Accordingly, the driving slider 26 and the driven slider 27 slide away from each other along with the sliding movement of the driving slider 21 and the driven slider 22 (see FIG. 25).

Figure 25:
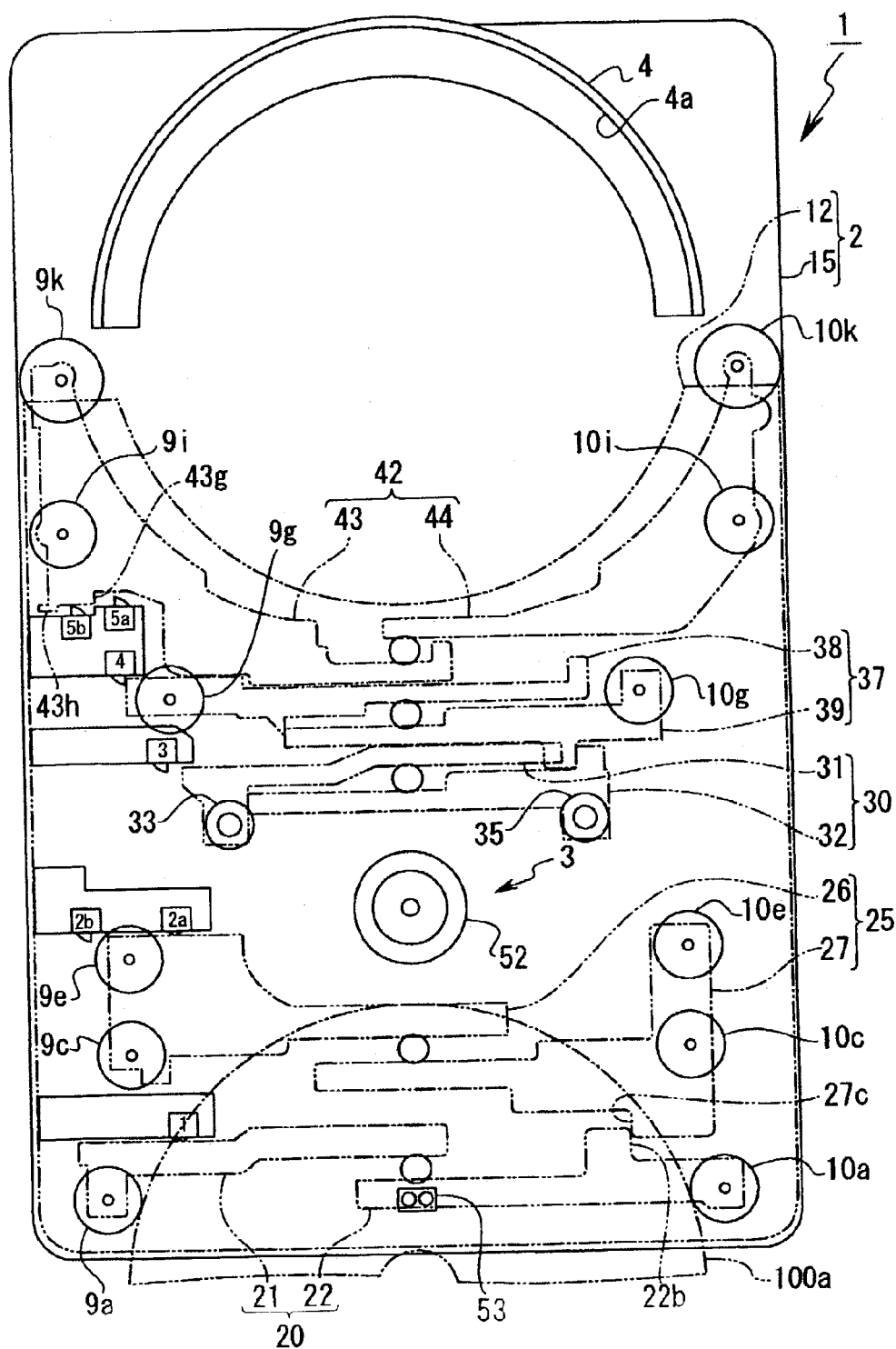

When the driving slider 26 and the driven slider 27 slide away from each other, SW2a is operated by the driving slider 26 and the state thereof is changed to the 'high' state (see FIG. 25 and AD4 in FIGS. 43 to 45). At this time, SW1 is also in the 'high' state.

Figure 26:
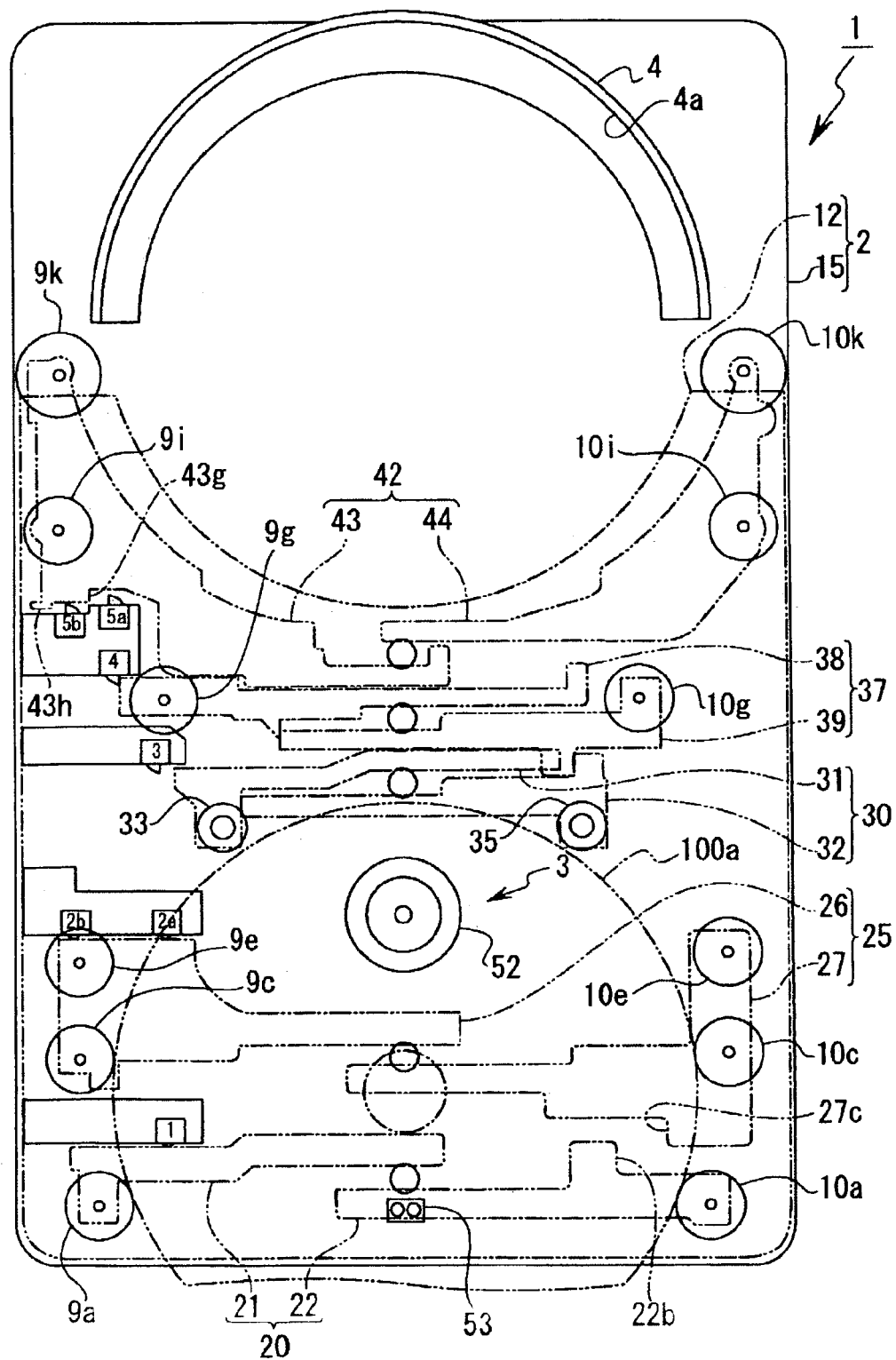

When the disc-shaped recording medium 100a is pulled further in, the driving slider 26 and the driven slider 27 slide further away from each other against the spring force applied by the spring member 28, and the driving slider 21 and the driven slider 22 slide toward each other due to the spring force applied by the spring member 23 (see FIG. 26). At this time, the disc-shaped recording medium 100a is passed from the first feed roller 9a and the first feed member 10a to the second feed roller 9c and the second feed member 10c. At the time when the disc-shaped recording medium 100a is passed, the peripheral surface of the disc-shaped recording medium 100a comes into contact with the first feed roller 9a, the second feed roller 9c, the first feed member 10a, and the second feed member 10c.

When the driving slider 26 and the driven slider 27 slide further away from each other, SW2b is operated by the driving slider 26 and the state thereof is changed to the 'high' state (see FIG. 26 and AD5 in FIGS. 43 to 45). At this time, SW1 and SW2a are also in the 'high' state.

When the disc-shaped recording medium 100a is pulled further in, the peripheral surface of the disc-shaped recording medium 100a pushes the first restraining roller 33 and the second restraining roller 35 which are retained by the first slider 31 and the second slider 32, respectively, of the third slide unit 30 in the rearward direction. Accordingly, the first slider 31 and the second slider 32 slide away from each other, and the disc-shaped recording medium 100a is passed from the second feed roller 9c and the second feed member 10c to the third feed roller 9e and the third feed member 10e (see FIG. 27). At the time when the disc-shaped recording medium 100a is passed, the peripheral surface of the disc-shaped recording medium 100a comes into contact with the first feed roller 9a, the third feed roller 9e, the first restraining roller 33, the first feed member 10a, the third feed member 10e, and the second restraining roller 35. Since the first restraining roller 33 and the second restraining roller 35 slip on the peripheral surface of the disc-shaped recording medium 100a when they come into contact with the peripheral surface of the disc-shaped recording medium 100a, the first restraining roller 33 and the second restraining roller 35 do not serve to convey the disc-shaped recording medium 100a.

Figure 27:
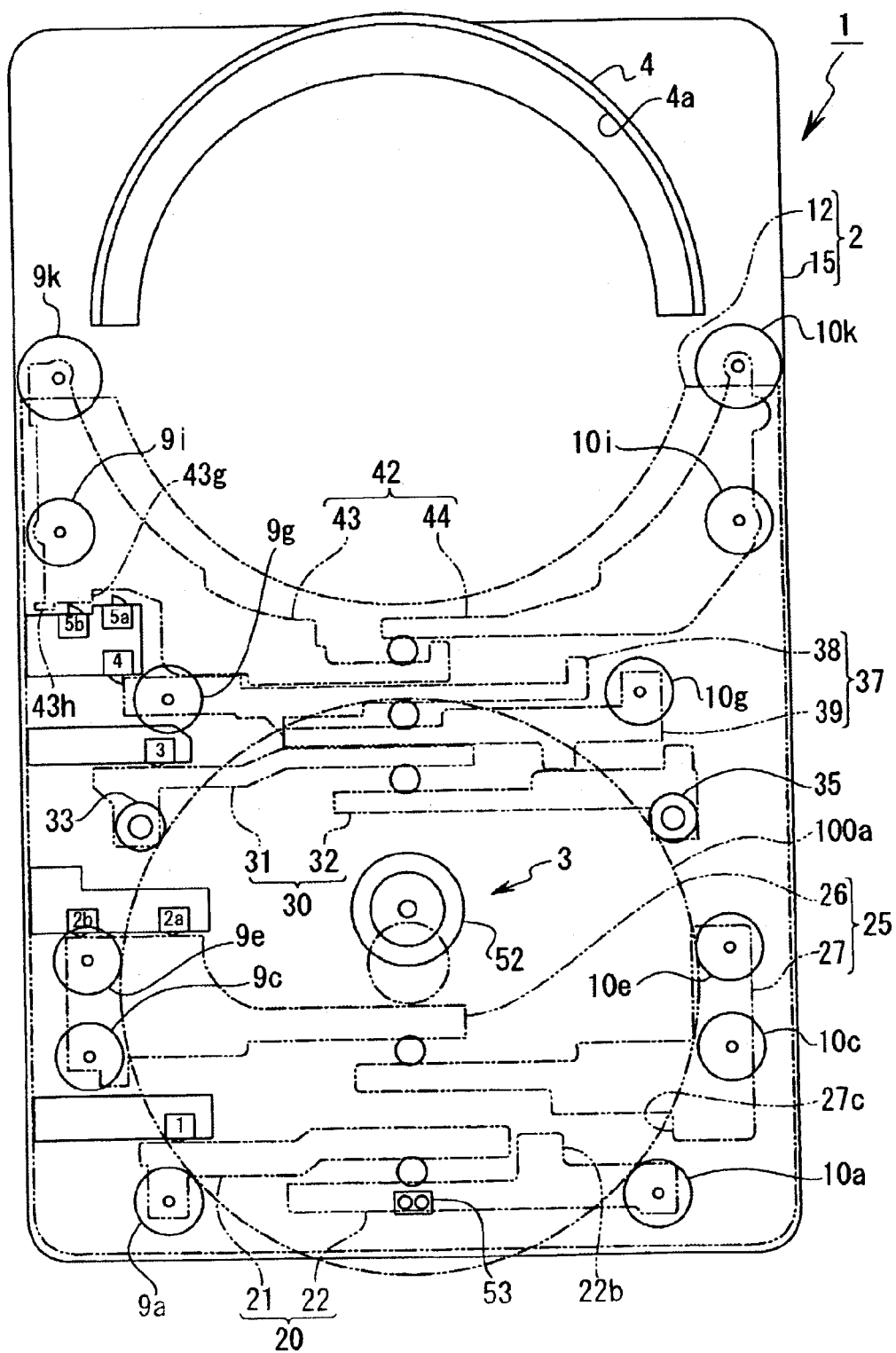

When the first slider 31 and the second slider 32 slide away from each other, SW3 is operated by the first slider 31 and the state thereof is changed to the 'high' state (see FIG. 27 and AD6 in FIGS. 43 to 45). At this time, SW1, SW2a, and SW2b are also in the 'high' state.

When the state of SW3 is changed to the 'high' state while SW2b is in the 'high' state, it is determined that the inserted disc-shaped recording medium 100 is the large disc-shaped recording medium 100a (see AD6 in FIG. 45). Accordingly, whether the inserted disc-shaped recording medium 100 is the large disc-shaped recording medium 100a or the small disc-shaped recording medium 100b is not known while the address is AD1 to AD5.

Once it is determined that the inserted disc-shaped recording medium 100 is the large disc-shaped recording medium 100*a* as described above, the determined size of the disc-shaped recording medium 100 is not changed afterwards. Accordingly, misoperation in which an operation for the small disc-shaped recording medium 100*b* is accidentally performed for the large disc-shaped recording medium 100*a* can be prevented.

The size of the disc-shaped recording medium 100 is cleared when the disc-shaped recording medium 100 to be played back is exchanged or the disc-shaped recording medium 100 is ejected from the housing 2.

Figure 28:
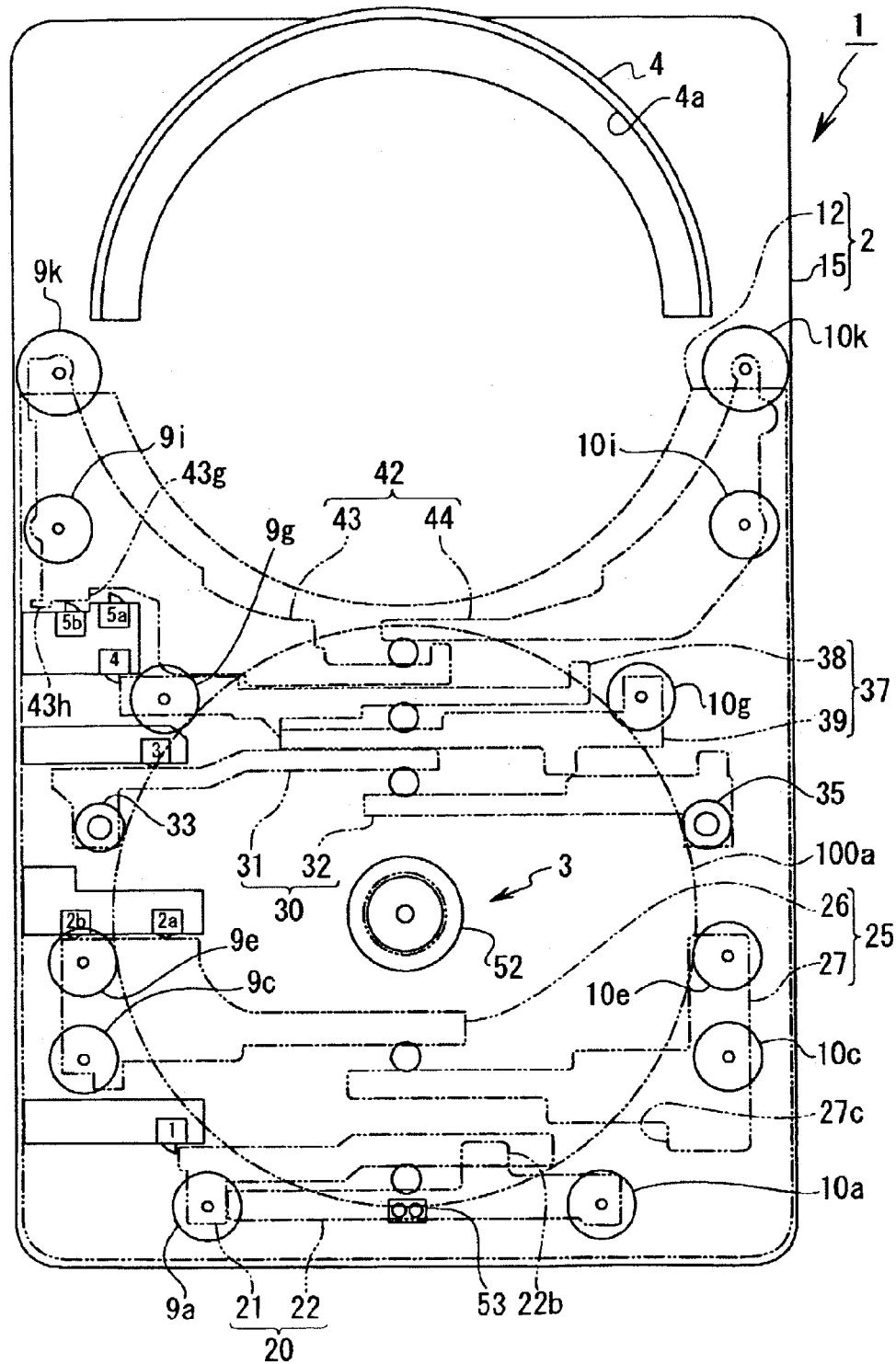

When the disc-shaped recording medium 100*a* is passed to the third feed roller 9*e* and the third feed member 10*e* and is pulled further in, the peripheral surface of the disc-shaped recording medium 100*a* comes into contact with the fourth feed roller 9*g* and the fourth feed member 10*g* (see FIG. 28). At this time, the driving slider 21 and the driven slider 22 of the first slide unit 20 slide toward each other due to the spring fore applied by the spring member 23, and the peripheral surface of the disc-shaped recording medium 100*a* comes away from the first feed roller 9*a* and the first feed member 10*a*. Thus, in this state, the peripheral surface of the disc-shaped recording medium 10*a* is in contact with the third feed roller 9*e*, the fourth feed roller 9*g*, the first restraining roller 33, the third feed member 10*e*, the fourth feed member 10*g*, and the second restraining roller 35. The center hole of the disc-shaped recording medium 100*a* reaches the position approximately directly above the disc table 52, and the disc-shaped recording medium 100*a* reaches the attachment position where it can be attached to the disc table 52 (see FIG. 28).

When the driving slider 21 and the driven slider 22 slide toward each other, SW1 is released from the driving slider 21 and the state thereof is changed to the 'low' state (see FIG. 28 and AD7 in FIGS. 43 and 44). At this time, SW2*a*, SW2*b*, and SW3 are in the 'high' state.

Figure 29:
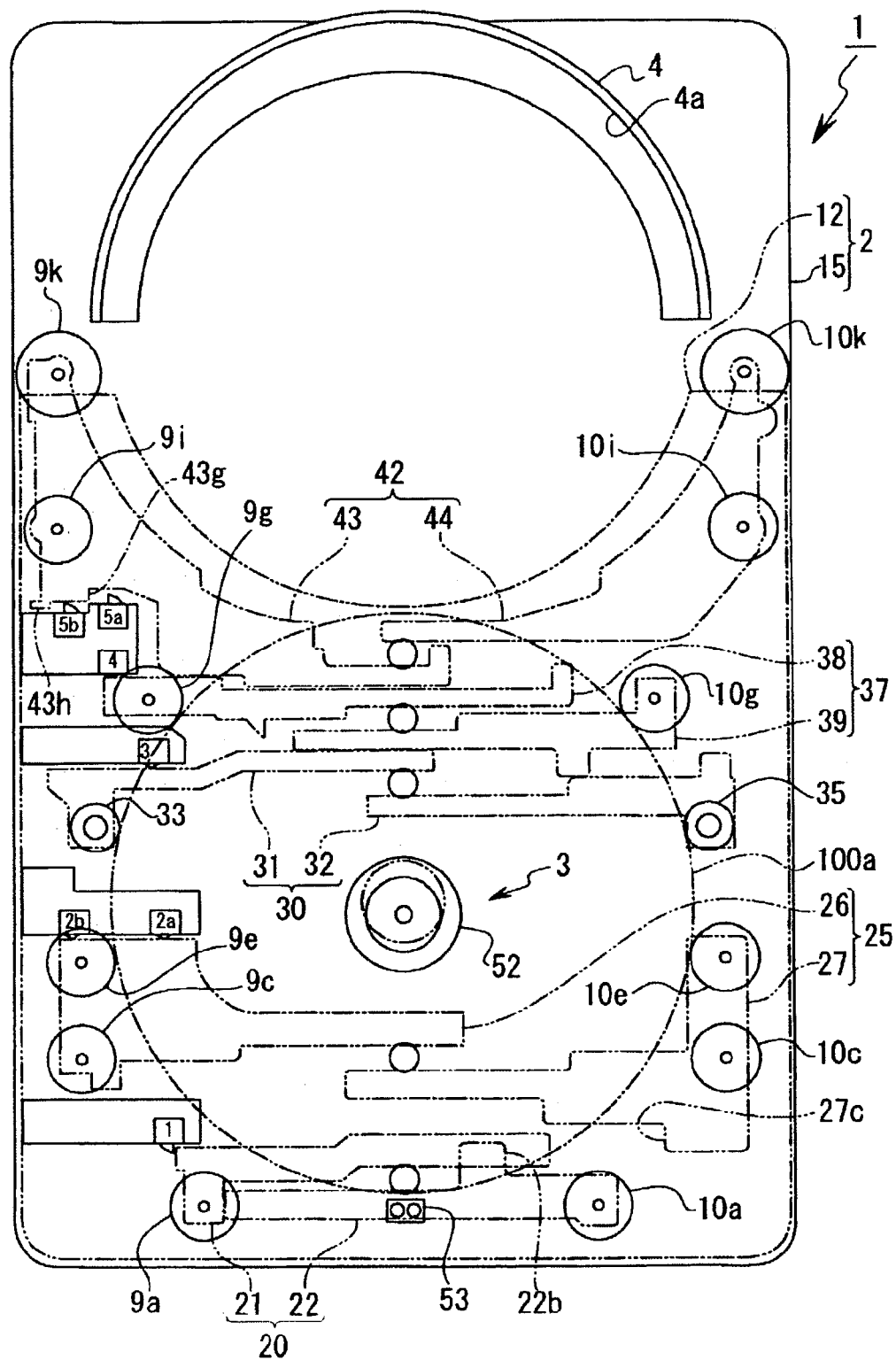

The disc-shaped recording medium 100*a* is pulled past the attachment position toward the storage unit 4, and the driving slider 38 and the driven slider 39 of the fourth slide unit 37 slide away from each other against the spring force applied by the spring member 40 (see FIG. 29).

When the driving slider 38 and the driven slider 39 slide away from each other, SW4 is operated by the driving slider 38 and the state thereof is changed to the 'high' state (see FIG. 29 and AD8 in FIGS. 43 and 44). At this time, SW2*a*, SW2*b*, and SW3 are also in the 'high' state.

The disc-shaped recording medium 100*a* is pulled further in, and the driving slider 38 and the driven slider 39 of the fourth slide unit 37 slide further away from each other against the spring force applied by the spring member 40. On the contrary, the driving slider 26 and the driven slider 27 of the second slide unit 25 slide toward each other due to the spring force applied by the spring member 28 (see FIG. 30).

Figure 30:
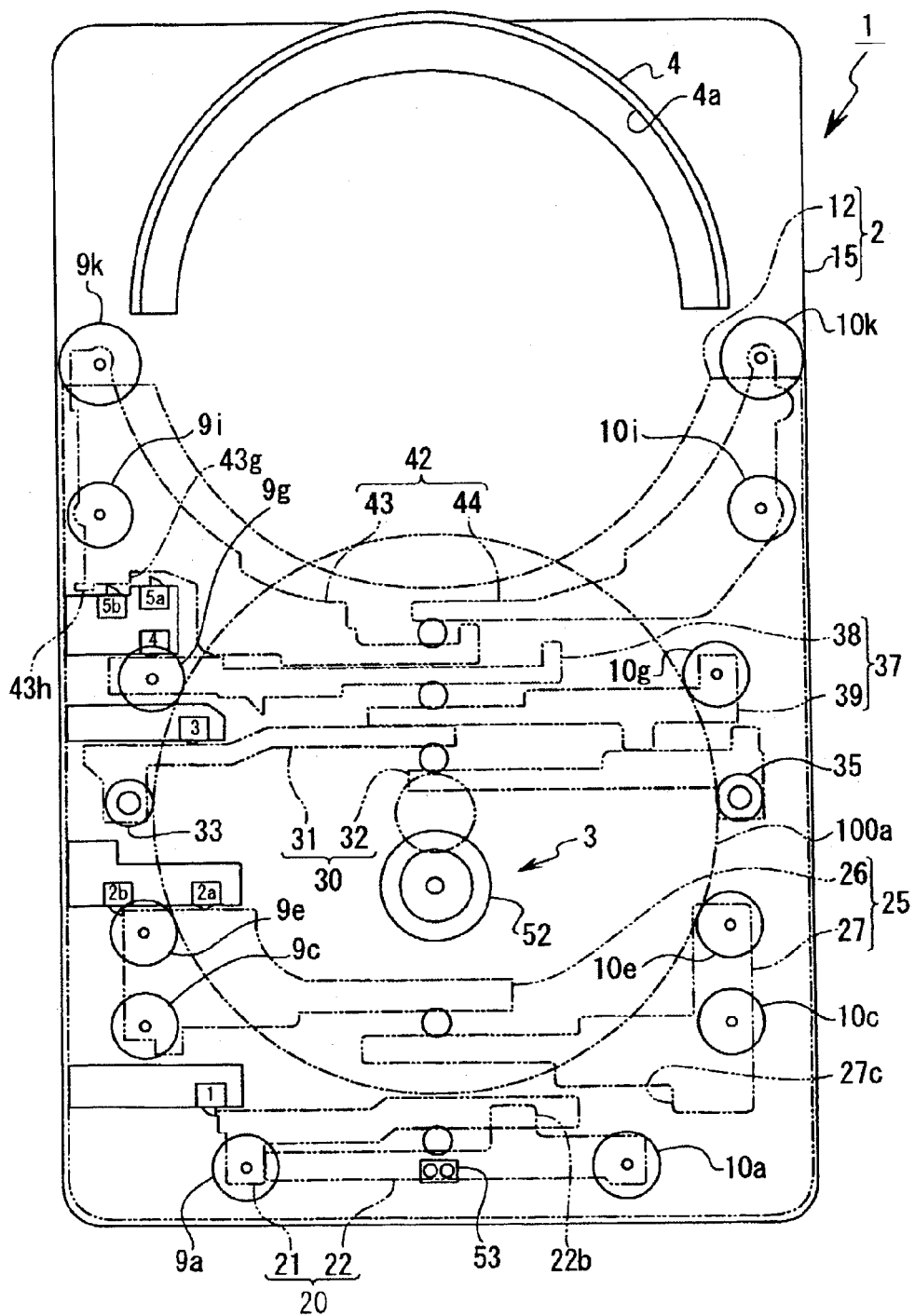

When the driving slider 26 and the driven slider 27 slide toward each other, SW2*b* is released from the driving slider 26 and the state thereof is changed to the 'low' state (see FIG. 30 and AD9 in FIGS. 43 and 44). At this time, SW2*a*, SW3, and SW4 are in the 'high' state.

AD9 is used as an address for starting the deceleration control, and the rotating direction drive motor 54 is changed to forward and the deceleration control of the drive motor 54 is started when the state of SW2*b* is changed to the 'low' state while SW4 is in the 'high' state. Accordingly, the feed rollers 9*a*, 9*c*, 9*e*, 9*g*, 9*i*, and 9*k* are rotated clockwise in a plan view.

When the drive motor 54 is rotated in the forward direction, the disc-shaped recording medium 100*a* is conveyed such that its address changes in the order of AD9, AD8, and AD7 (attachment position). More specifically, when the drive motor 54 is rotated in the forward direction so as to convey the disc-shaped recording medium 100*a*, the states of all of SW2*a*, SW2*b*, SW3, and SW4 are changed to the 'high' state (see AD8 in FIGS. 43 and 44), and then the state of SW4 is changed to the 'low' state while SW2*a*, SW2*b*, and SW3 are in the 'high' state (see AD7 in FIGS. 43 and 44).

When the state of SW4 is changed to the 'low' state while SW2*b* is in the 'high' state, the rotation of the drive motor 54 is stopped so as to stop the disc-shaped recording medium 100*a* at the attachment position (see FIG. 28). Accordingly, the disc-shaped recording medium 100*a* is in a state that it can be supported between the chucking pulley 47 and the disc table 52.

In the above-described case, the disc-shaped recording medium 100*a* is stopped at the attachment position by stopping the rotation of the drive motor 54 when the state of SW4 is changed to the 'low' state while the SW2*b* is in the 'high' state after changing the rotating direction of the drive motor 54. However, the disc-shaped recording medium 100*a* may also be stopped at the attachment position without changing the rotating direction of the drive motor 54 by stopping the rotation of the drive motor 54 when the address is changed from AD6 to AD7 and the state of SW1*a* is changed from the 'high' state to the 'low' state.

When the disc-shaped recording medium 100*a* is conveyed to the attachment position, the peripheral surface of the disc-shaped recording medium 100*a* is in contact with the third feed roller 9*e*, the fourth feed roller 9*g*, the first restraining roller 33, the third feed member 10*e*, the fourth feed member 10*g*, and the second restraining roller 35 (see FIG. 28).

When the rotation of the drive motor 54 is stopped, the mode-setting motor 48 is rotated and the chucking mode is set by the mode-setting drive mechanism 80, and the chucking pulley 47 and the disc table 52 are moved from above and below the disc-shaped recording medium 100*a* so as to support the disc-shaped recording medium 100*a* between them.

The mode-setting motor 48 is continuously rotated, and the mode-setting drive mechanism 80 operates such that the driving slider 26 and the driven slider 27, the first slider 31 and the second slider 32, and the driving slider 38 and the driven slider 39 slide away from each other. Thus, the third feed roller 9*e*, the fourth feed roller 9*g*, the first restraining roller 33, the third feed member 10*e*, the fourth feed member 10*g*, and the second restraining roller 35 move away from the peripheral surface of the disc-shaped recording medium 100*a* (see FIG. 31).

Figure 31:
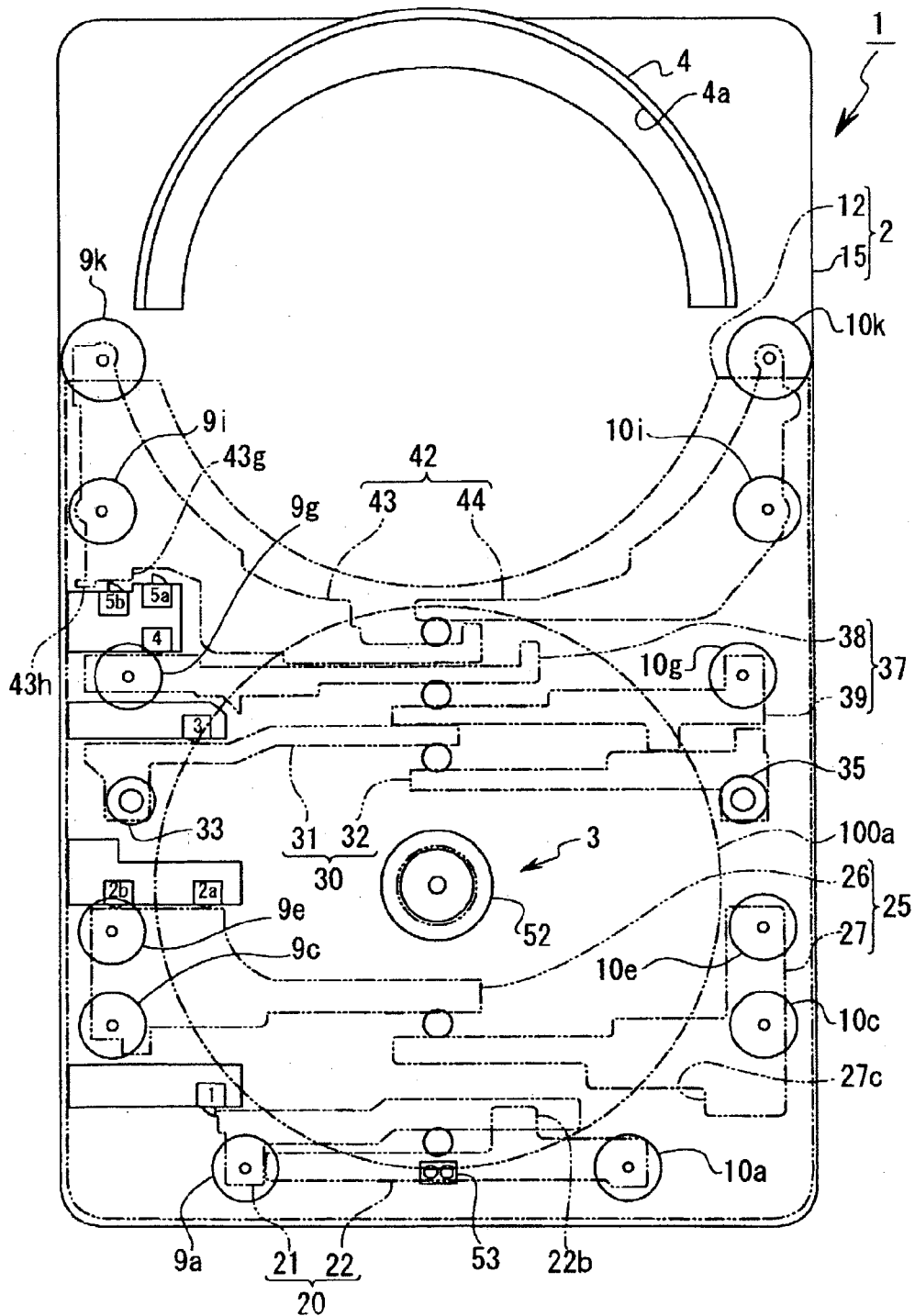

When the driving slider 38 and the driven slider 39 slide away from each other, SW4 is operated by the driving slider 38 and the state thereof is changed to the 'high' state (see FIG. 31 and AD10 in FIGS. 43 and 44). At this time, SW2*a*, SW2*b*, and SW3 are also in the 'high' state.

When the third feed roller 9*e*, the fourth feed roller 9*g*, first restraining roller 33, the third feed member 10*e*, the fourth feed member 10*g*, and the second restraining roller 35 are moved away from the peripheral surface of the disc-shaped recording medium 10*a* as described above, the playback mode is set and the rotation of the mode-setting motor 48 is stopped.

When the playback mode is set, the playback operation of the disc-shaped recording medium 100*a* is performed in which the optical pickup 51 is operated while the disc table 52 rotates along with the rotation of the spindle motor. In the playback operation, a laser beam is emitted from a light-emitting element (not shown) included in the optical pickup 51, passes through the objective lens 51a, and is radiated on and reflected by the disc-shaped recording medium 100a. The reflected beam passes through the objective lens 51a, and is received by a light-receiving element (not shown) included in the optical pickup 51. Accordingly, the information signals recorded on the disc-shaped recording medium 100a are played back.

When the playback operation of the information signals recorded on the disc-shaped recording medium 100a is finished, the mode-setting motor 48 is rotated in the direction opposite to the above-described case and the disc-shaped recording medium 100a is released from the chucking pulley 47 and the disc table 52. The operation mode changes to the chucking mode, and then the front loading mode is set again (see FIG. 28 and AD7 in FIGS. 43 and 44). When the front loading mode is set, the rotation of the mode-setting motor 48 is stopped.

When the front loading mode is set, the drive motor 54 is rotated in the forward direction, and the disc-shaped recording medium 100a is conveyed toward the disc insertion slot 2a. When the disc-shaped recording medium 100a is conveyed toward the disc insertion slot 2a, the address of the disc-shaped recording medium 100a changes in the order of AD7, AD6, AD5, AD4, AD3, and AD2.

When the address of the disc-shaped recording medium 100a is changed to AD2, the disc sensor 53 is in the 'on' state (see AD2 in FIGS. 43 to 45). As described above, the state of the disc sensor 53 is only used for the address detection at AD1 and AD2, and is not used for the address detection at AD3 and the following addresses. Accordingly, the address of AD2 is detected when the disc sensor 53 is in the 'on' state.

When the address of AD2 is detected, the rotation of the drive motor 54 is stopped. At this time, most part of the disc-shaped recording medium 100a projects out from the disc insertion slot 2a. Accordingly, the disc-shaped recording medium 100a can be taken out of the housing 2 by grabbing and pulling it out.

(c) Conveyance Operation Between Playback Unit and Storage Unit (Large Disc-Shaped Recording Medium)

Next, the operation in which the disc-shaped recording medium 100a is conveyed between the playback unit 3 and the storage unit 4 will be described will be described with reference to FIGS. 32 to 36, 43, and 44.

The disc-shaped recording medium 100a is conveyed between the playback unit 3 and the storage unit 4 in the rear loading mode which is set by the mode-setting drive mechanism 80 driven by the mode-setting motor 48.

When the playback operation of the information signals recorded on the disc-shaped recording medium 100a is finished, the mode-setting motor 48 is rotated and the disc-shaped recording medium 100a is released, as described above. The operation mode thus changes to the chucking mode, and then the rear loading mode is set (see FIG. 32).

The states of the components in the rear loading mode when the disc-shaped recording medium 100a is at the attachment position are similar to those in the front loading mode before the disc-shaped recording medium 100a is inserted thorough the disc insertion slot 2a except for the following point. That is, the supporting shaft 65 which supports the sixth feed roller 9k is released from the restraining member, so that the driving slider 43 and the driven slider 44 of the fifth slide unit 42 are at the ends of the moving ranges in the direction in which they move toward each other (see FIG. 32).

Figure 32:
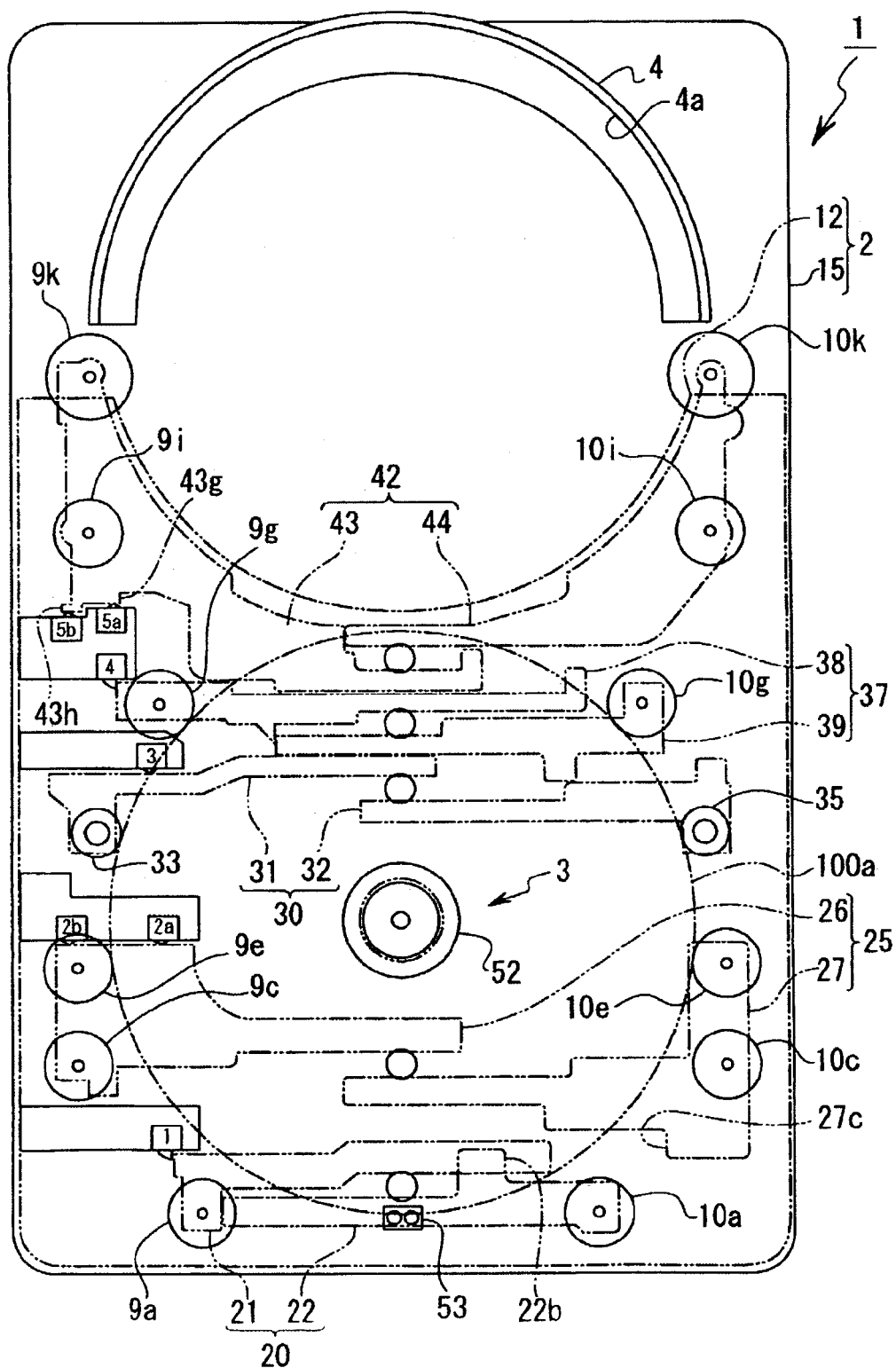

Since the driving slider 43 and the driven slider 44 are at the ends of the moving ranges in the direction in which they move toward each other, SW5a and SW5b are operated by the first switching projection 43g and the second switching projection 43h, respectively, of the driving slider 43, and are in the 'high' state (see FIG. 32 and AD11 in FIGS. 43 and 44). At this time, SW2a and SW2b are operated by the driving slider 26 of the second slide unit 25 and are in the 'high' state, and SW3 is operated by the first slider 31 of the third slide unit 30, and is in the 'high' state. In addition, SW1 and SW4 are in the 'low' state.

When the drive motor 54 is rotated in the reverse direction, the disc-shaped recording medium 100a at the attachment position starts moving toward the storage unit 4.

Figure 33:
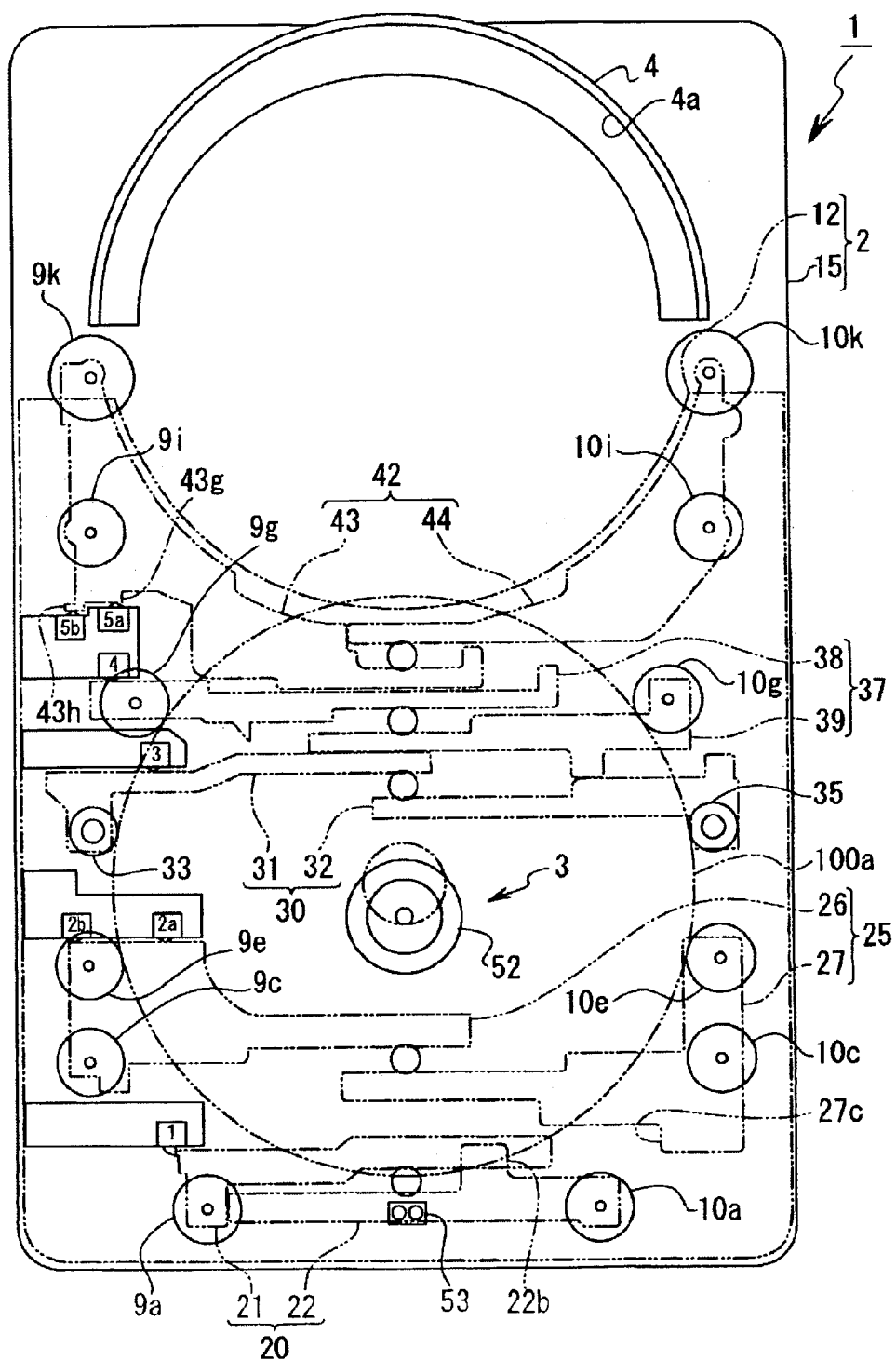

When the disc-shaped recording medium 100a is conveyed toward the storage unit 4, the driving slider 38 and the driven slider 39 of the fourth slide unit 37 slide away from each other against the spring force applied by the spring member 40 (see FIG. 33).

When the driving slider 38 and the driven slider 39 slide away from each other, SW4 is operated by the driving slider 38 and the state thereof is changed to the 'high' state (see FIG. 33 and AD12 in FIGS. 43 and 44). At this time, SW2a, SW2b, SW3, SW5a, and SW5b are also in the 'high' state.

Figure 34:
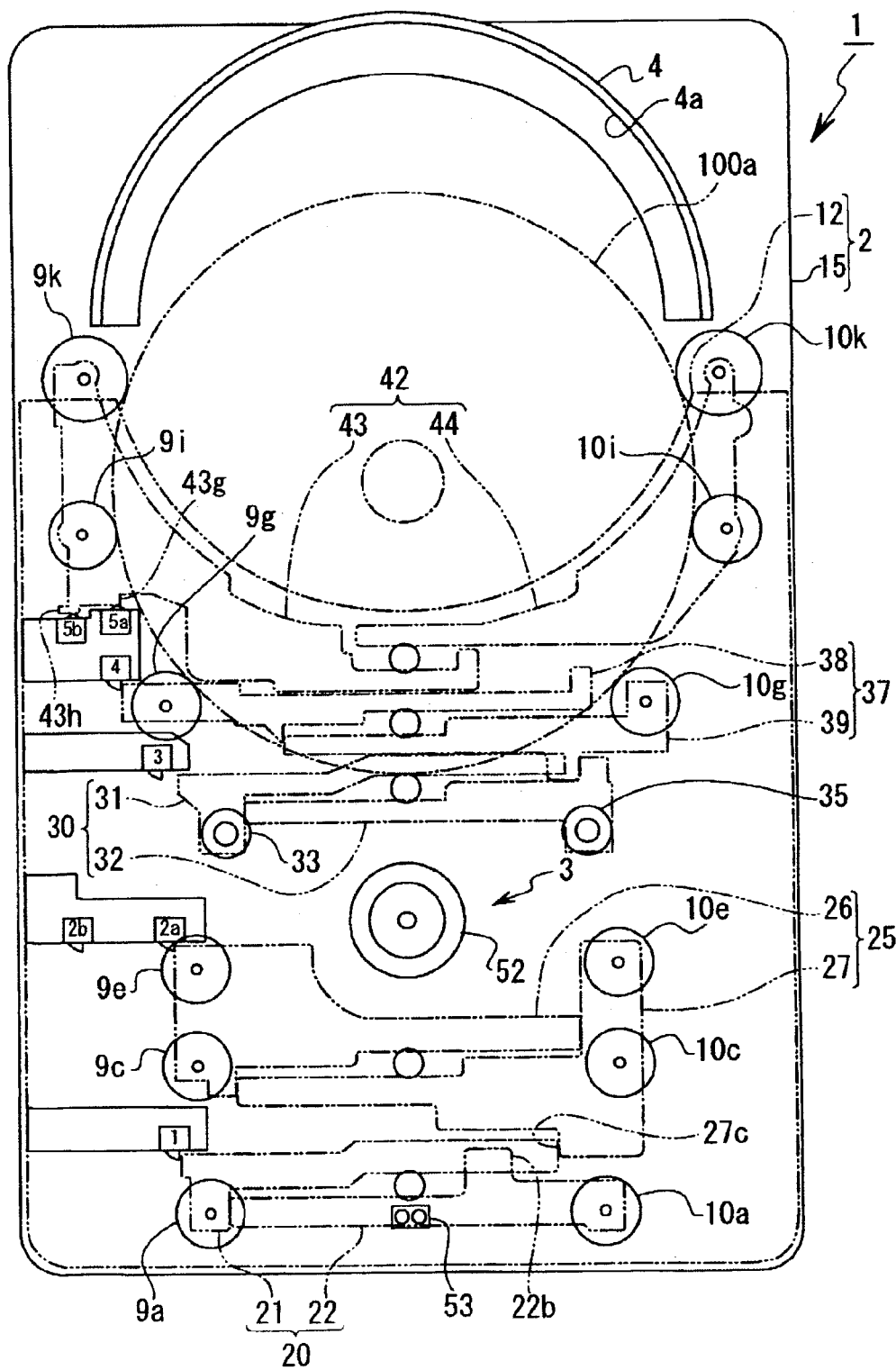

When the disc-shaped recording medium 100a is conveyed further toward the storage unit 4, the driving slider 26 and the driven slider 27 of the second slide unit 25, the first slider 31 and the second slider 32 of the third slide unit 30, the driving slider 38 and the driven slider 39 of the fourth slide unit 37 slide toward each other (see FIG. 34).

When the driving slider 26 and the driven slider 27 slide toward each other, SW2a and SW2b are released from the driving slider 26 and the states thereof are changed to the 'low' state. When the first slider 31 and the second slider 32 slide toward each other, SW3 is released from the first slider 31 and the state thereof is changed to the 'low' state. When the driving slider 38 and the driven slider 39 slide toward each other, SW4 is released from the driving slider 38 and the state thereof is changed to the 'low' state (see FIG. 34 and AD13 in FIGS. 43 and 44).

While the disc-shaped recording medium 100a is conveyed from AD12 to AD13, the states of SW2a, SW2b, SW3, SW4, SW5a, and SW5b change between the 'high' state and the 'low' state depending on the operational states thereof. The states of SW2a, SW2b, SW3, SW4, SW5a, and SW5b during this period are shown in FIG. 44, and detailed explanations thereof are omitted.

The driving slider 43 and the driven slider 44 of the fifth slide unit 42 slide away from each other (see FIG. 34). When the driving slider 43 and the driven slider 44 slide away from each other, SW5b is operated by the driving slider 43, and is in the 'high' state (see FIG. 34 and AD13 in FIGS. 43 and 44). At this time, SW5a may be in either the 'high' state or the 'low' state.

Figure 35:
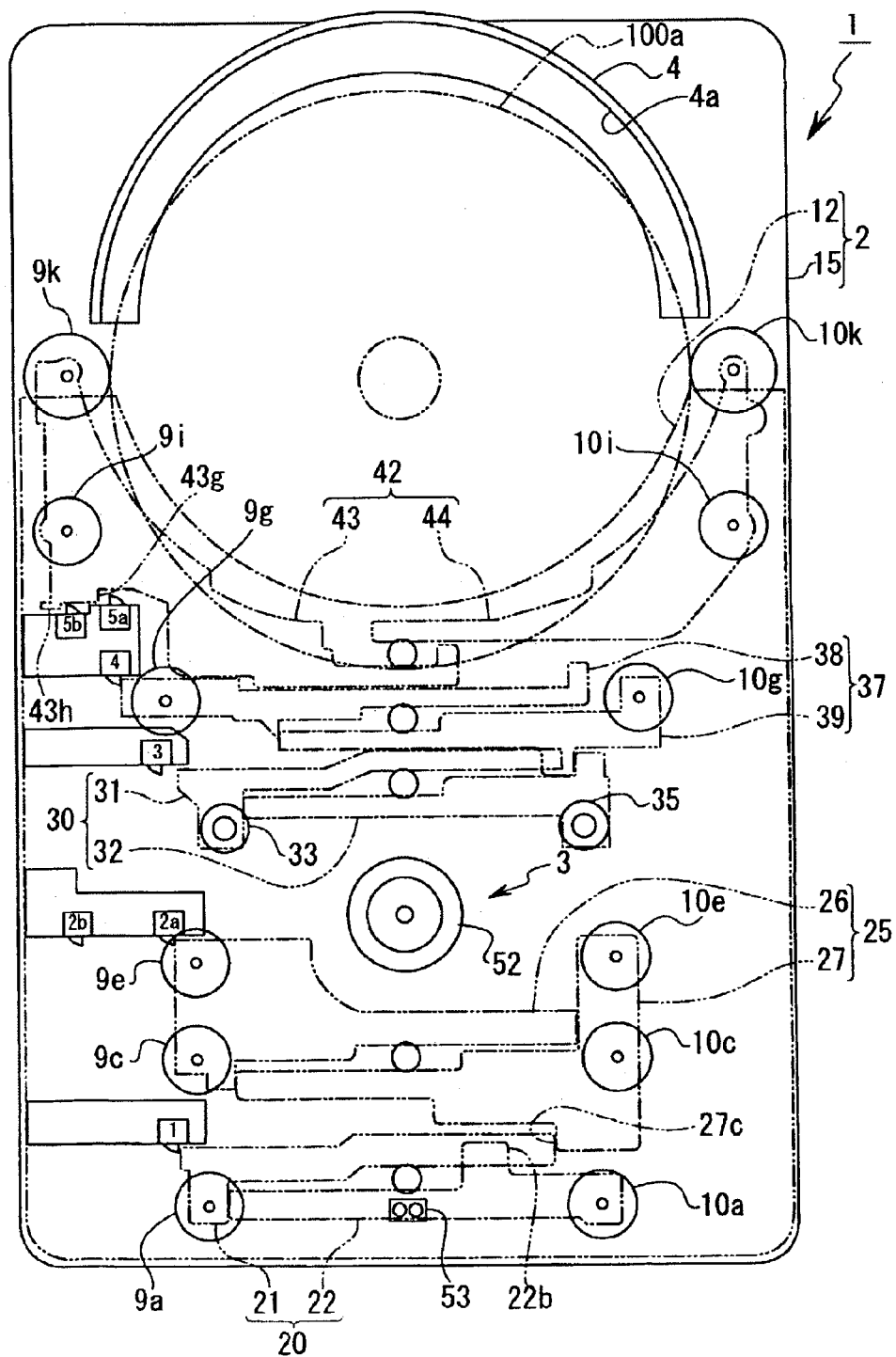

When the disc-shaped recording medium 100a is conveyed further toward the storage unit 4, the driving slider 43 and the driven slider 44 of the fifth slide unit 42 slide further away from each other (see FIG. 35).

When the driving slider 43 and the driven slider 44 slide further away from each other, SW5b is released from the driving slider 43 and the state thereof is changed to the 'low' state (see FIG. 35 and AD14 in FIGS. 43 and 44). At this time, SW5a is not operated by the driving slider 43, and is in the 'low' state.

Figure 36:
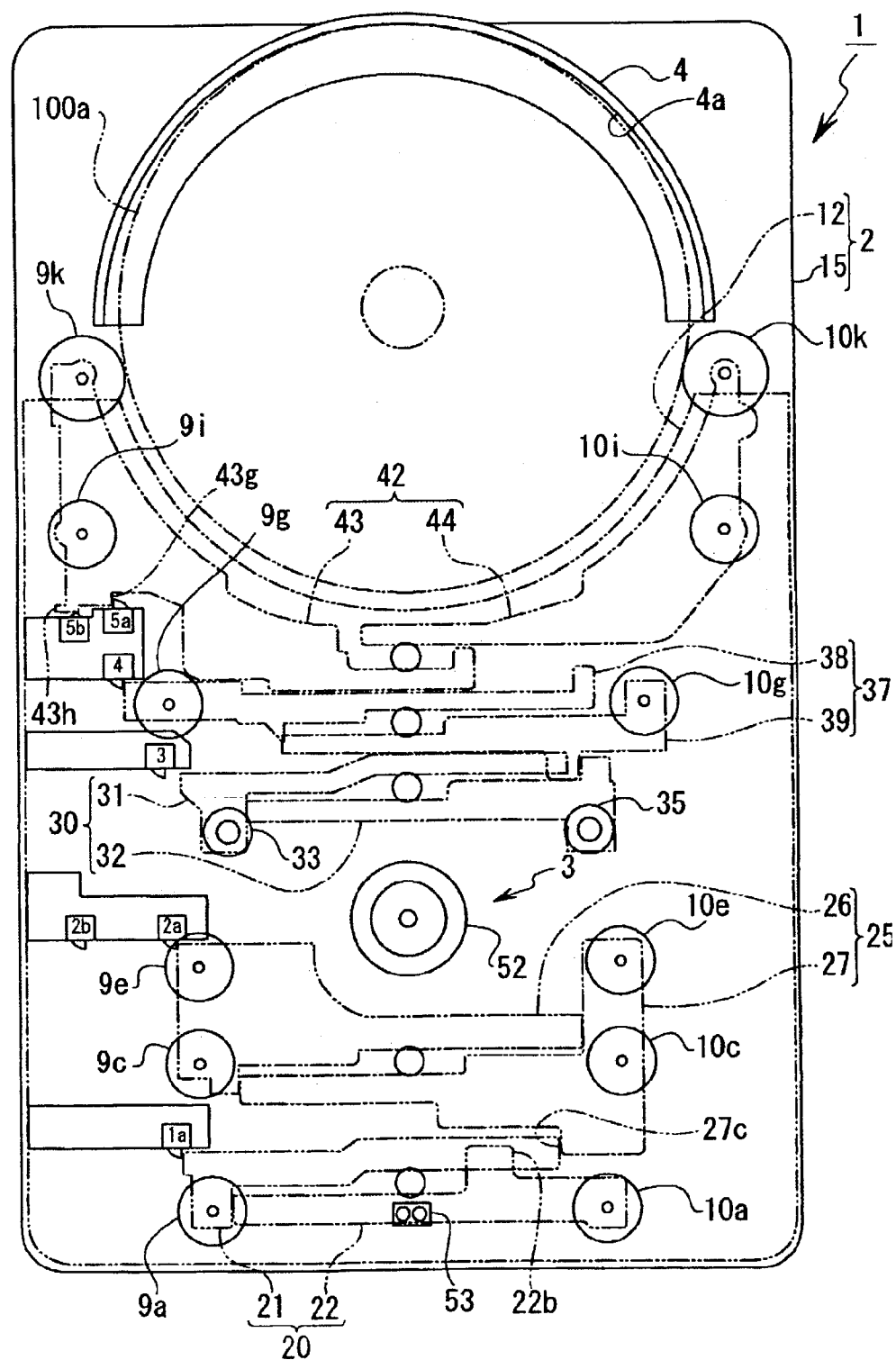
Figure 37:
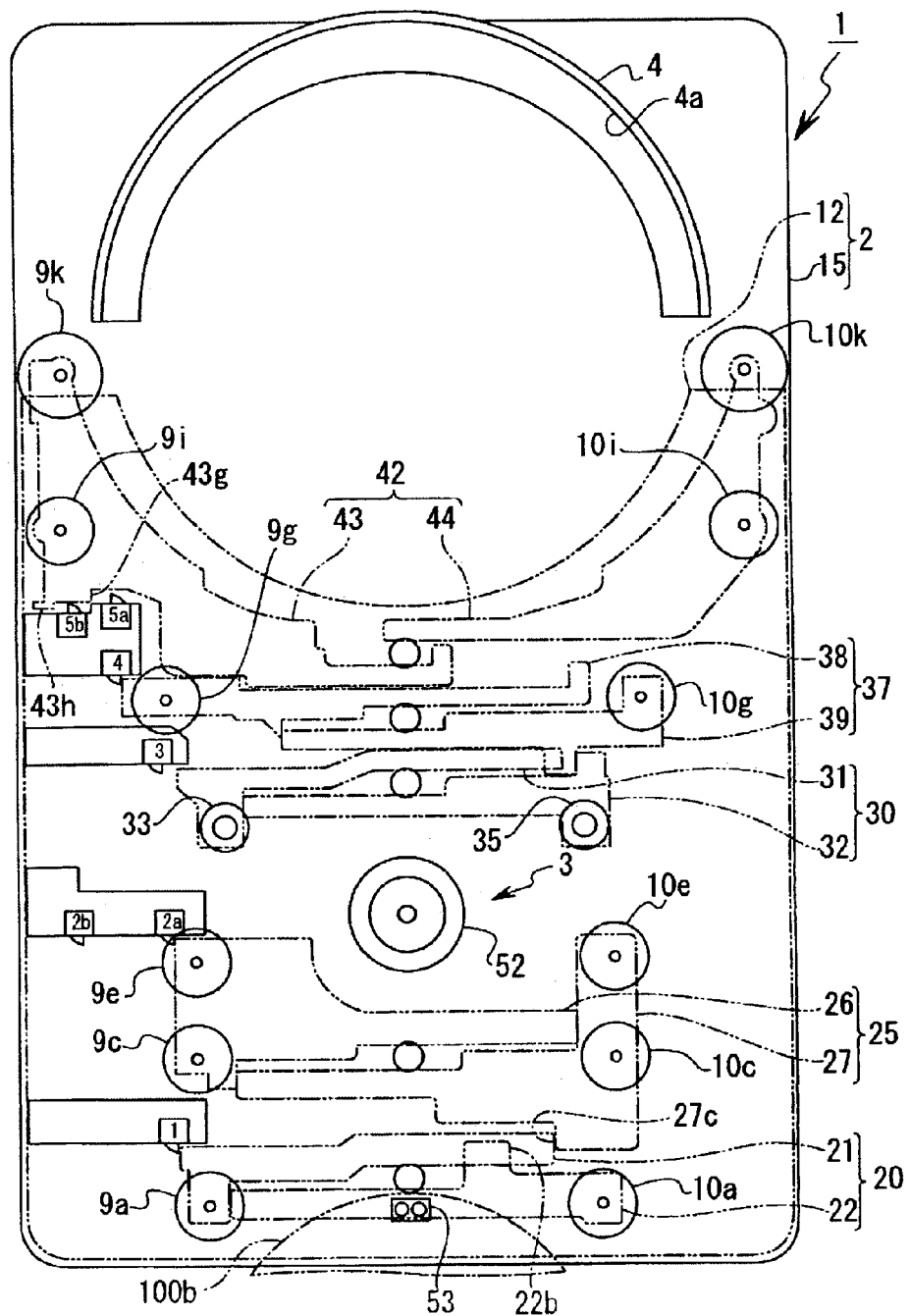

The disc-shaped recording medium 100a is conveyed further toward the storage unit 4, and is stored in one of the disc-receiving members 4a of the storage unit 4 (see FIG. 36). When the disc-shaped recording medium 10a is stored in the disc-receiving member 4a, the driving slider 43 and the driven slider 44 of the fifth slide unit 42 slide toward each other due to the spring force applied by the spring member 45.

When the driving slider 43 and the driven slider 44 slide toward each other, SW5b is operated by the driving slider 43 and the state thereof is changed to the 'high' state (see FIG. 36 and AD15 in FIGS. 43 and 44).

As described above, when the address changes from AD13 to AD15, SW4 is in the 'low' state and SW5b is in the 'high' state at AD13, and the state of SW5b is changed to the 'low' state at AD14 and to the 'high' state at AD15 (see FIGS. 43 and 44). In the disc loading apparatus 1, the final address (AD15) of the disc-shaped recording medium 100a is detected by successively detecting the states of SW4 and SW5b at AD13 and the state of SW5b at AD14 and AD15, and then the rotation of the drive motor 54 is stopped.

In the disc loading apparatus 1, whether SW4, SW5a, and SW5b are in the 'high' state or in the 'low' state cannot be determined at the address immediately before AD13 (see FIGS. 43 and 44). Accordingly, there is a possibility that the states of SW4, SW5a, and SW5b at the address immediately before AD13 will be the same as those at AD15. Therefore, if the rotation of the drive motor 54 is stopped by simply detecting the combination of the states of SW4, SW5a, and SW5b, there is a risk that the rotation of the drive motor 54 is stopped at the address immediately before AD13.

In order to prevent this, in the disc loading apparatus 1, the final address of the disc-shaped recording medium 100a is detected by successively detecting the states of SW4 and SW5b at AD13 and the state of SW5b at AD14 and AD15, as described above, and then the rotation of the drive motor 54 is stopped. By successively detecting the states of SW4 and SW5b at AD13 to AD15, the rotation of the drive motor 54 can be reliably stopped at the final address of the disc-shaped recording medium 100a.

After the disc-shaped recording medium 10a is stored in one of the disc-receiving members 4a of the storage unit 4 and the rotation of the drive motor 54 is stopped, the mode-setting motor 48 is rotated and the elevator mode is set by the mode-setting drive mechanism 80. When the elevator mode is set, the elevator motor 66 is rotated and the storage unit 4 is moved vertically.

When the storage unit 4 is moved vertically to a predetermined position, the rotation of the elevator motor 66 is stopped. When the rotation of the elevator motor 66 is stopped, the mode-setting motor 48 is rotated in the direction opposite to the above-described case and the rear loading mode is set again by the mode-setting drive mechanism 80.

When the rear loading mode is set, the drive motor 54 is rotated in the forward direction, and the disc-shaped recording medium 100a is extracted from the disc-receiving member 4a by the sixth feed roller 9k and the sixth feed member 10k and starts moving toward the playback unit 3. When the disc-shaped recording medium 100a is conveyed toward the playback unit 3, the address of the disc-shaped recording medium 100a changes in the order of AD15, AD14, AD13, and AD12.

When the disc-shaped recording medium 100a reaches AD12, SW2a and SW2b are operated by the driving slider 26 of the second slide unit 25 and are in the 'high' state, SW3 is operated by the first slider 31 of the third slide unit 30 and is in the 'high' state, SW4 is operated by the driving slider 38 of the fourth slide unit 37 and is in the 'high' state, and SW5a and SW5b are operated by the driving slider 43 of the fifth slide unit 42 and are in the 'high' state (see FIG. 33 and AD12 in FIGS. 43 and 44).

AD12 is used as an address for starting the deceleration control, and the deceleration control of the drive motor 54 is started when the state of SW2b is changed to the 'high' state while SW4 is in the 'high' state.

When the disc-shaped recording medium 100a is conveyed further toward the playback unit 3, the driving slider 38 and the driven slider 39 of the fourth slide unit 37 slide toward each other (see FIG. 32).

When the driving slider 38 and the driven slider 39 slide toward each other, SW4 is released from the driving slider 38 and the state thereof is changed to the 'low' state (see FIG. 32 and AD11 in FIGS. 43 and 44). At this time, SW2a, SW2b, SW3, SW5a, and SW5b are in the 'high' state.

In the disc loading apparatus 1, when the state of SW4 is changed to the 'low' state while the state of SW2b is in the 'high' state, the rotation of the drive motor 54 is stopped so as to stop the disc-shaped recording medium 100a at the attachment position (see FIG. 32).

When the rotation of the drive motor 54 is stopped, the mode-setting motor 48 is rotated, as described above, and the operation mode is set to the chucking mode, and then to the playback mode, by the mode-setting drive mechanism 80. Then, the playback operation of the disc-shaped recording medium 100a is performed.

(d) Conveyance Operation Between Disc Insertion Slot and Storage Unit (Large Disc-Shaped Recording Medium)

Next, the operation in which the disc-shaped recording medium 100a is conveyed between the disc insertion slot 2a and the storage unit 4 will be described below.

When the disc-shaped recording medium 100a is inserted through the disc insertion slot 2a, the disc-shaped recording medium 100a is conveyed from AD2 to AD7 in the front loading mode in a manner similar to the above-described conveying operation form the disc insertion slot 2a to the playback unit 3, and is once stopped at the attachment position. Then, the rear loading mode is set and the disc-shaped recording medium 100a is conveyed from AD11 to AD15 in a manner similar to the above-described conveying operation from the playback unit 3 to the storage unit 4, and is stored in one of the disc-receiving members 4a of the storage unit 4.

When the disc-shaped recording medium 100a is extracted from the disc-receiving member 4a of the storage unit 4, the disc-shaped recording medium 100a is conveyed from AD15 to AD11 in the rear loading mode in a manner similar to the above-described conveying operation from the storage unit 4 to the playback unit 3, and is once stopped at the attachment position. Then, the front loading mode is set and the disc-shaped recording medium 100a is conveyed from AD7 to AD2 in a manner similar to the above-described conveying operation from the playback unit 3 to the disc insertion slot 2a.

(e) Conveyance Operation Between Disc Insertion Slot and Playback Unit (Small Disc-Shaped Recording Medium)

Next, the operation in which the small disc-shaped recording medium 100b is conveyed between the disc insertion slot 2a and the playback unit 3 will be described with reference to FIG. 22, FIGS. 37 to 42, and FIGS. 46 to 48.

The states of the components in the front loading mode before the disc-shaped recording medium 100b is inserted through the disc insertion slot 2a are as described above (see FIG. 22). In this state, when the disc-shaped recording medium 100b is inserted through the disc insertion slot 2a, the peripheral surface of the disc-shaped recording medium 100b reaches a position above the disc sensor 53 (see FIG. 37). Accordingly, the state of the disc sensor 53 is changed to the 'on' state, and the insertion of the disc-shaped recording medium 100b through the disc insertion slot 2a is detected (see ad2 in FIGS. 46 to 48).

Although the state of the disc sensor 53 may also be in the 'on' state at ad3 and the following addresses, which will be described below, the state of the disc sensor 53 is not used for the address detection at ad3 and the following addresses.

When the state of the disc sensor 53 is changed to the 'on' state, the drive motor 54 is rotated in the reverse direction and the feed rollers 9a, 9c, 9e, 9g, 9i, and 9k are rotated counterclockwise in a plan view, as described above.

Figure 38:
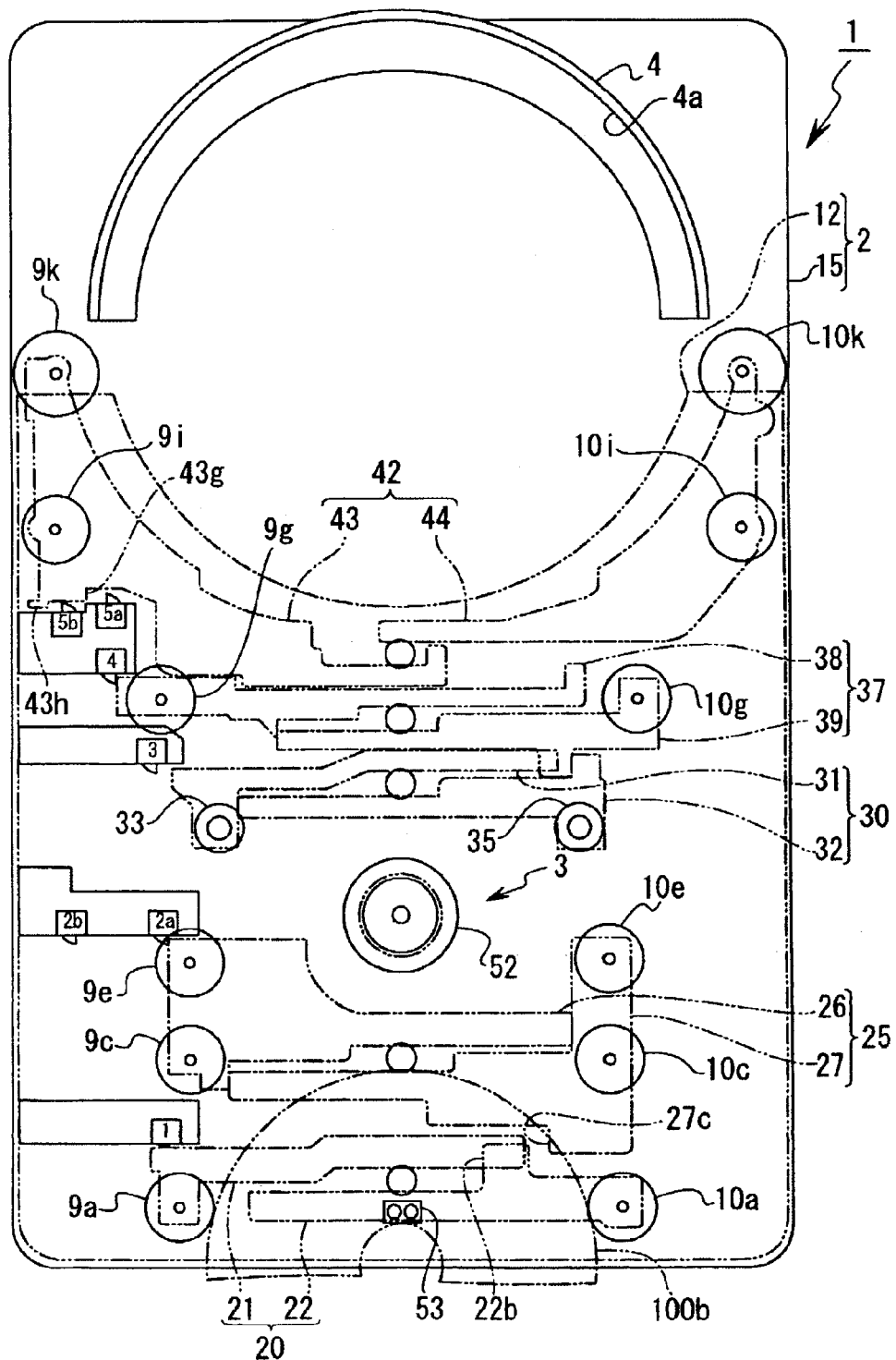

When the disc-shaped recording medium 100b is inserted through the disc insertion slot 2a and the peripheral surface thereof is pushed against the feed roller 9a and the feed member 10a, the disc-shaped recording medium 100b is pulled into the housing 2 due to the rotation of the feed roller 9a (see FIG. 38). While the disc-shaped recording medium 100b is being pulled, the feed roller 9a rolls on the peripheral surface of the disc-shaped recording medium 100b.

When the disc-shaped recording medium 100b is pulled in, the distance between the feed roller 9a and the feed member 10a constantly changes according to the position of the disc-shaped recording medium 110b, and the driving slider 21 and the driven slider 22 of the first slide unit 20 slide away from each other with respect to the supporting chassis 12 against the spring power applied by the spring member 23 (see FIG. 38).

When the driving slider 21 and the driven slider 22 slide away from each other, SW1 is operated by the driving slider 21 and the state thereof is changed to the 'high' state (see FIG. 38 and ad3 in FIGS. 46 to 48).

Figure 39:
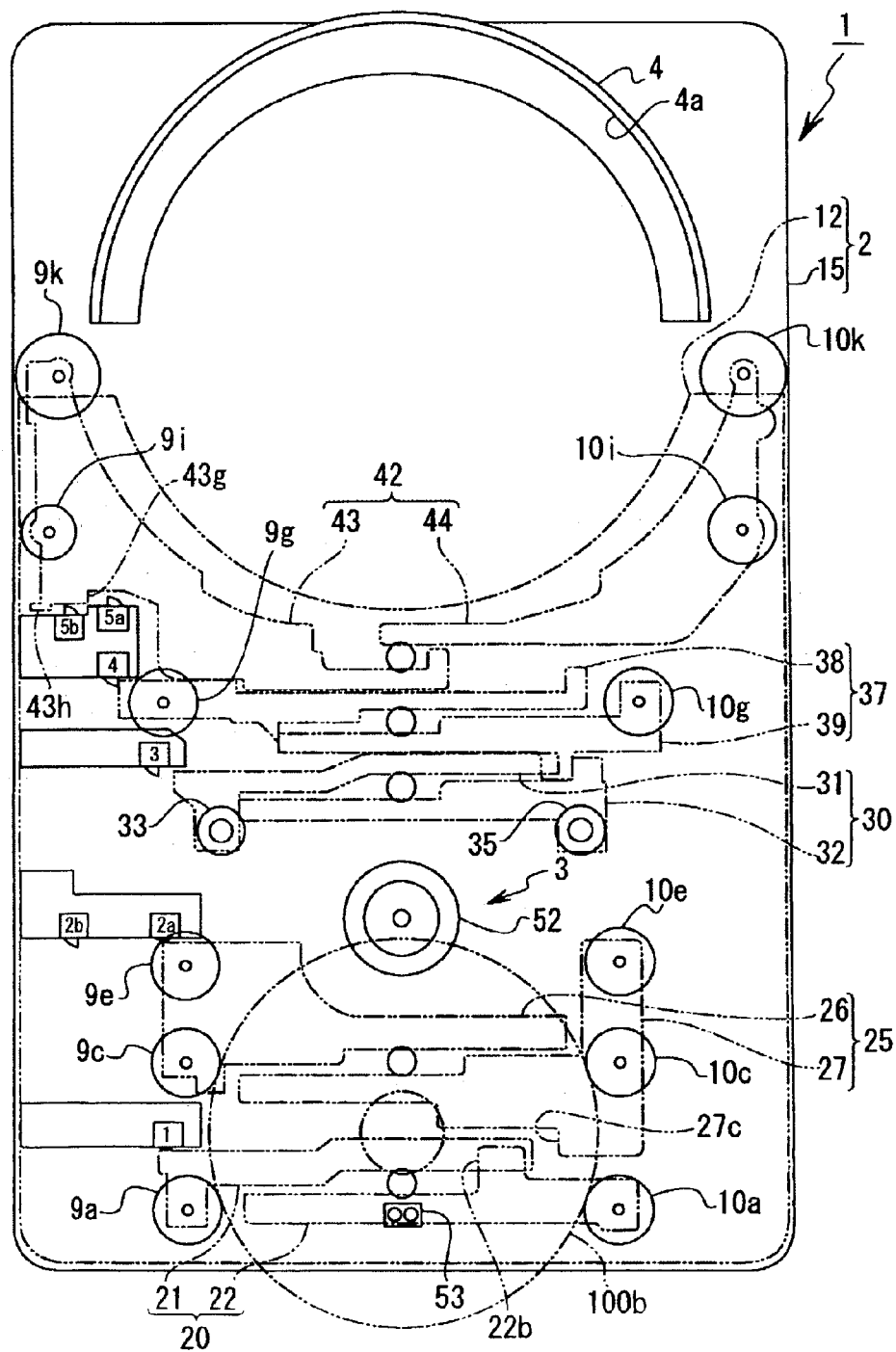

When the disc-shaped recording medium 100b is pulled further in, the disc-shaped recording medium 100b is passed from the first feed roller 9a and the first feed member 10a to the second feed roller 9c and the second feed member 10c, and the driving slider 26 and the driven slider 27 slide away from each other (see FIG. 39). At the time when the disc-shaped recording medium 100b is passed, the peripheral surface of the disc-shaped recording medium 100b comes into contact with the first feed roller 9a, the second feed roller 9c, the first feed member 10a, and the second feed member 10c.

When the driving slider 26 and the driven slider 27 slide away from each other, SW2a is operated by the driving slider 26 and the state thereof is changed to the 'high' state (see FIG. 39 and ad4 in FIGS. 46 to 48). At this time, SW1 is also in the 'high' state.

When the disc-shaped recording medium 100b is pulled further in, the driving slider 26 and the driven slider 27 slide away from each other against the spring force applied by the spring member 28, and the driving slider 21 and the driven slider 22 slide toward each other due to the spring force applied by the spring member 23. Thus, the driving slider 21 and the driven slider 22 reach the ends of the moving ranges in the direction in which they move toward each other (see FIG. 40).

Figure 40:
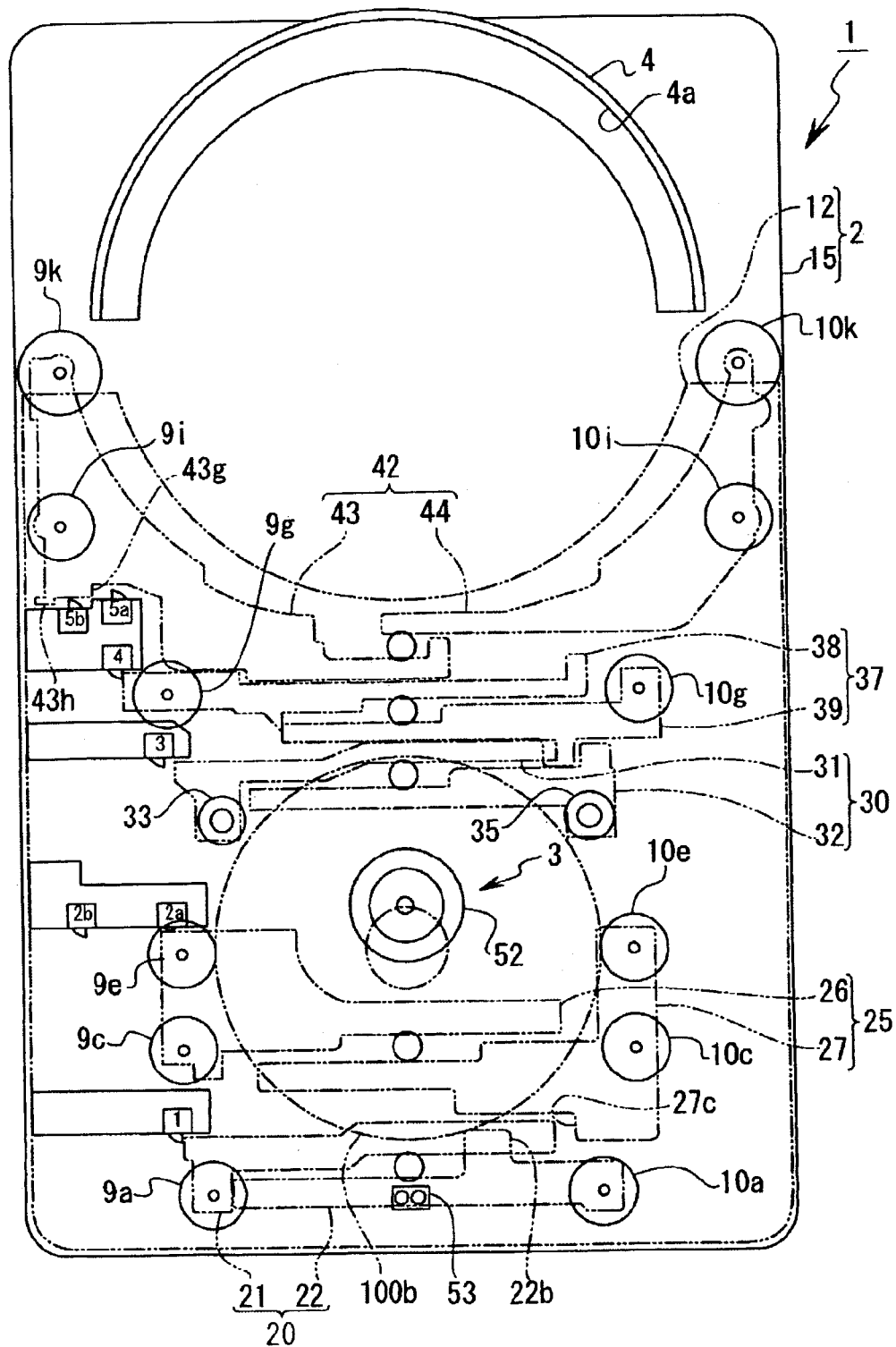

When the driving slider 21 and the driven slider 22 reach the ends of the moving ranges in the direction in which they move toward each other, SW1 is released from the driving slider 21 and the state thereof is changed to the 'low' state (see FIG. 40 and ad5 in FIGS. 46 to 48). At this time, SW2a is in the 'high' state. ad5 is used as an address for starting the deceleration control, and the deceleration control of the drive motor 54 is started when the state of SW1 is changed to the 'low' state while SW2a is in the 'high' state. In addition, when SW1 is in the 'low' state and SW2a is in the 'high' state at the same time, it is determined that the disc-shaped recording medium 100 is the small disc-shaped recording medium 100b (see ad5 in FIG. 48). Accordingly, whether the inserted disc-shaped recording medium 100 is the large disc-shaped recording medium 100a or the small disc-shaped recording medium 100b is not known while the address is ad1 to ad4.

Once it is determined that the inserted disc-shaped recording medium 100 is the small disc-shaped recording medium 100b as described above, the determined size of the disc-shaped recording medium 100 is not changed afterwards. Accordingly, misoperation in which an operation for the large disc-shaped recording medium 100a is accidentally performed for the small disc-shaped recording medium 100b can be prevented.

Figure 41:
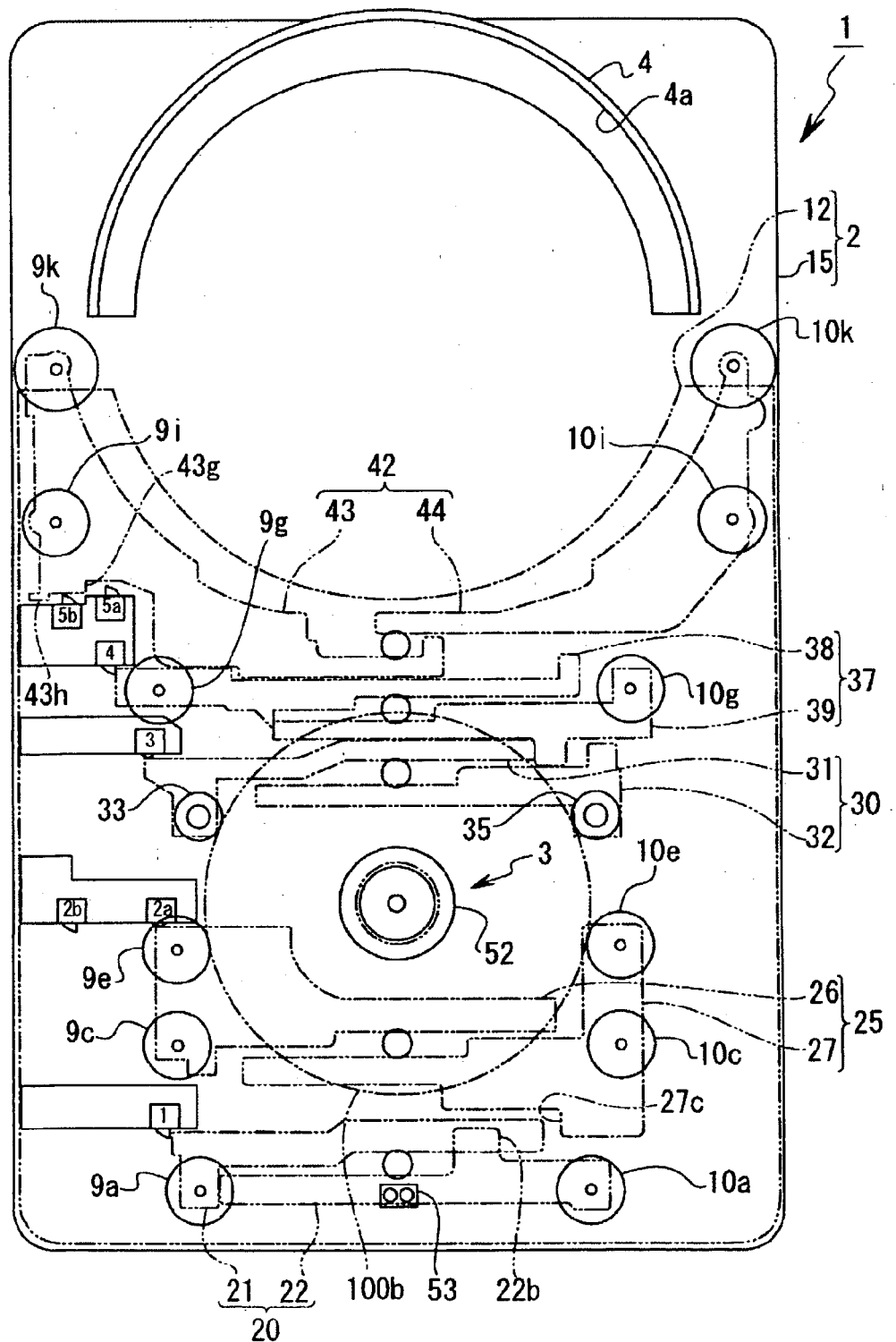

When the disc-shaped recording medium 100b is pulled further in, the peripheral surface of the disc-shaped recording medium 100b pushes the first restraining roller 33 and the second restraining roller 35 which are retained by the first slider 31 and the second slider 32, respectively, of the third slide unit 30 in the rearward direction, and the first slider 31 and the second slider 32 slide away from each other (see FIG. 41). At this time, the peripheral surface of the disc-shaped recording medium 100b comes into contact with the third feed roller 9e, the first restraining roller 33, the third feed member 10e, and the second restraining roller 35. Since the first restraining roller 33 and the second restraining roller 35 slip on the peripheral surface of the disc-shaped recording medium 100b when they come into contact with the peripheral surface of the disc-shaped recording medium 10b, the first restraining roller 33 and the second restraining roller 35 do not serve to convey the disc-shaped recording medium 100b. Accordingly, the disc-shaped recording medium 100b is not conveyed any further toward the storage unit 4 from this position.

When the first slider 31 and the second slider 32 slide away from each other, SW3 is operated by the first slider 31 and the state thereof is changed to the 'high' state (see FIG. 41 and ad6 in FIGS. 46 and 47). At this time, SW2a is also in the 'high' state.

When the state of SW3 is changed to the 'high' state while SW2a is in the 'high' state, the rotation of the drive motor 54 is stopped so as to stop the disc-shaped recording medium 100b at the attachment position (see FIG. 41). Accordingly, the disc-shaped recording medium 100b is in a state that it can be supported between the chucking pulley 47 and the disc table 52.

When the rotation of the drive motor 54 is stopped, the mode-setting motor 48 is rotated and the chucking mode is set by the mode-setting drive mechanism 80, and the chucking pulley 47 and the disc table 52 are moved from above and below the disc-shaped recording medium 100b so as to support the disc-shaped recording medium 100b between them.

The mode-setting motor 48 is continuously rotated, and the mode-setting drive mechanism 80 operates such that the driving slider 26 and the driven slider 27 slide away from each other and the first slider 31 and the second slider 32 slide away from each other. Thus, the third feed roller 9e, the first restraining roller 33, the third feed member 10e, and the second restraining roller 35 move away from the peripheral surface of the disc-shaped recording medium 100b (see FIG. 42). At this time, the driving slider 38 and the driven slider 39 of the fourth slide unit 37 also slide away from each other due to the operation of the mode-setting drive mechanism 80 (see FIG. 42).

Figure 42:
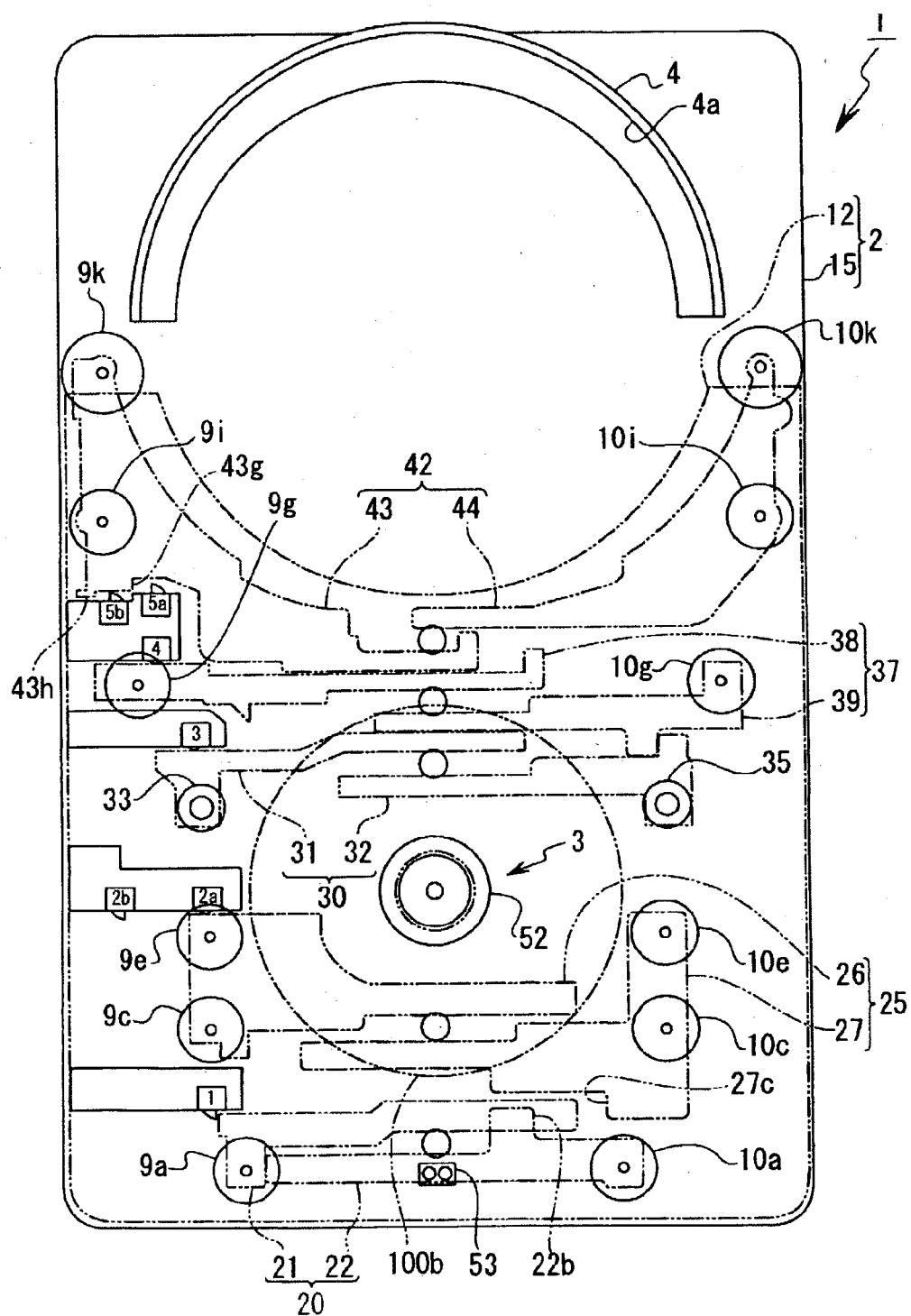

When the driving slider 38 and the driven slider 39 slide away from each other, SW4 is operated by the driving slider 38 and the state thereof is changed to the 'high' state (see FIG. 42 and ad7 in FIGS. 46 and 47). At this time, SW2a and SW3 are also in the 'high' state.

When the third feed roller 9e, the first restraining roller 33, the third feed member 10e, and the second restraining roller 35 are moved away from the peripheral surface of the disc-shaped recording medium 100b as described above, the playback mode is set and the rotation of the mode-setting motor 48 is stopped.

When the playback mode is set, the playback operation of the disc-shaped recording medium 100b is performed in which the optical pickup 51 is operated while the disc table 52 rotates along with the rotation of the spindle motor. In the playback operation, a laser beam is emitted from a light-emitting element (not shown) included in the optical pickup 51, passes through the objective lens 51a, and is radiated on and reflected by the disc-shaped recording medium 100b. The reflected beam passes through the objective lens 51a, and is received by a light-receiving element (not shown) included in the optical pickup 51. Accordingly, the information signals recorded on the disc-shaped recording medium 100b are played back.

When the playback operation of the information signals recorded on the disc-shaped recording medium 100b is finished, the mode-setting motor 48 is rotated in the direction opposite to the above-described case and the disc-shaped recording medium 100b is released from the chucking pulley 47 and the disc table 52. The operation mode changes to the chucking mode, and then the front loading mode is set again (see FIG. 41 and ad6 in FIGS. 46 and 47). When the front loading mode is set, the rotation of the mode-setting motor 48 is stopped.

When the front loading mode is set, the drive motor 54 is rotated in the forward direction, and the disc-shaped recording medium 100b is conveyed toward the disc insertion slot 2a. When the disc-shaped recording medium 100b is conveyed toward the disc insertion slot 2a, the address of the disc-shaped recording medium 100b changes in the order of ad6, ad5, ad4, ad3, and ad2.

When the address of the disc-shaped recording medium 100b is changed to ad2, the disc sensor 53 is in the 'on' state (see ad2 in FIGS. 46 to 48). As described above, the state of the disc sensor 53 is only used for the address detection at ad1 and ad2, and is not used for the address detection at ad3 and the following addresses. Accordingly, the address of ad2 is detected when the disc sensor 53 is in the 'on' state.

When the address of ad2 is detected, the rotation of the drive motor 54 is stopped. At this time, most part of the disc-shaped recording medium 100b projects out from the disc insertion slot 2a. Accordingly, the disc-shaped recording medium 100b can be taken out of the housing 2 by grabbing and pulling it out.

(f) Others

Next, a case is considered in which the operator pushes, for example, the store button or the exchange button and the conveyor drive mechanism 82 is operated in the rear loading mode when the disc-shaped recording medium 100 is not inserted through the disc insertion slot 2a. In this case, SW5a and SW5b are operated by the driving slider 43 of the fifth slide unit 42 and are in the 'high' state while SW1, SW2a, SW2b, SW3, and SW4 are in the 'low' state. Accordingly, when only SW5a and SW5b are in the 'high' state, it is determined that the disc-shaped recording medium 100 is not inserted, and a message indicating this is shown on, for example, a display unit (not shown).

Next, a case is considered in which the operator pushes, for example, the playback button and the playback mode is set by the mode-setting drive mechanism 80 when the disc-shaped recording medium 100 is not inserted through the disc insertion slot 2a. In this case, SW2a is operated by the driving slider 26 of the second slide unit 25 and is in the 'high' state, SW3 is operated by the first slider 31 of the third slide unit 30 and is in the 'high' state, and SW4 is operated by the driving slider 38 of the fourth slide unit 37 and is in the 'high' state, while SW1, SW2b, SW5a, and SW5b are in the 'low' state. Accordingly, when only SW2a, SW3, and SW4 are in the 'high' state, it is determined that the disc-shaped recording medium 100 is not inserted, and a message indicating this is shown on, for example, the display unit (not shown).

(5) Summary

As described above, in the disc loading apparatus 1, the control unit 83 detects the position (address) of the disc-shaped recording medium 100 and controls the conveying operation of disc-shaped recording medium 100 on the basis of the sliding movements of the members of the slide units 20, 25, 30, 37, and 42 in the direction toward and away from the peripheral surface of the disc-shaped recording medium 100.

Accordingly, the conveying operation of the disc-shaped recording medium 100 can be accurately controlled and the operational reliability can be improved.

In addition, in the disc loading apparatus 1, the control unit 83 detects the size of the disc-shaped recording medium 100 on the basis of the sliding movements of the members of the slide units 20, 25, 30, 37, and 42 in the direction toward and away from the peripheral surface of the disc-shaped recording medium 100. Accordingly, the size of the disc-shaped recording medium 100 can be accurately detected and the reliability of size detection can be improved.

In addition, in the disc loading apparatus 1, the address of the disc-shaped recording medium 100 in the conveying direction is detected by using the detection switches 69, 70, 71, 72, 73, 74, and 75 operated on the basis of the sliding movements of the members of the slide units 20, 25, 30, 37, and 42 in the direction toward and away from the peripheral surface of the disc-shaped recording medium 100. Accordingly, the address of the disc-shaped recording medium 100 can be accurately detected and the reliability of address detection can be improved.

In addition, in the disc loading apparatus 1, the feed rollers 9 and the feed members 10, which face each other across the disc-shaped recording medium 100, can move toward and away from the peripheral surface of the disc-shaped recording medium 100 in synchronization with each other. Accordingly, load placed on the disc-shaped recording medium 100 by the feed rollers 9 and the feed members 10 can be balanced and the conveying operation can be easily controlled.

In addition, in the disc loading apparatus 1, the disc-shaped recording medium 100 is conveyed to the target address by starting the deceleration control of the drive motor 54 when the disc-shaped recording medium 100 reaches a certain address. Accordingly, the disc-shaped recording medium 100 can be accurately conveyed to the target address and the operational reliability can be improved.

Although the embodiment of the present invention has been described above in detail, the shape and construction of each component are simply an example for carrying out the present invention, and the technical scope of the present invention is not limited to the above-described embodiment.

What is claimed is:

1. A disc conveying apparatus comprising:
    first conveyor means including a plurality of rollers which are arranged along a conveying path of a disc-shaped recording medium with gaps therebetween, which move in a direction away from the conveying path and rotate individually, and which convey the disc-shaped recording medium by successively rolling on a peripheral surface of the disc-shaped recording medium to pass the disc-shaped recording medium from one to another;
    second conveyor means which faces the first conveyor means across the disc-shaped recording medium being conveyed, which is oriented along the conveying path, and which retains the disc-shaped recording medium between the first conveyor means and the second conveyor means; and
    control means which detects the position of the disc-shaped recording medium and controls the rotation of the rollers on the basis of the movement of at least two of the plurality of rollers in the direction away from the conveying path,
    wherein each of the plurality of rollers move in a direction away from the conveying path individually and rotate individually.

2. A disc conveying apparatus according to claim 1, wherein the second conveyor means includes the same number of rotating members as the number of the rollers, the rotating members being arranged along the conveying path with gaps therebetween, and
    wherein the rollers and the rotating members which face each other across the disc-shaped recording medium being conveyed move away from each other synchronously and convey the disc-shaped recording medium while being in contact with the peripheral surface of the disc-shaped recording medium.

3. A disc conveying apparatus according to claim 1, further comprising detecting means which detects the movement of the rollers in the direction away from the conveying path, wherein the control means controls the rotation of the rollers on the basis of a detection result obtained by the detecting means.

4. A disc conveying apparatus according to claim 1, wherein, in an operation for conveying the disc-shaped recording medium to a target position, the control means stops the movement of the disc-shaped recording medium when the position of the disc-shaped recording medium detected on the basis of the movement of the rollers and the target position are the same.

5. A disc conveying apparatus according to claim 4, wherein, in the operation for conveying the disc-shaped recording medium to the target position, the control means rotates the rollers at a first rotational speed when the disc-shaped recording medium is between a start position and a position near the target position and rotates the rollers at a second rotational speed, which is lower than the first rotational speed, when the disc-shaped recording medium is between the position near the target position and the target position.

6. A disc conveying apparatus according to claim 4, wherein a recording and/or playback operation of the disc-shaped recording medium is performed at the target position.

7. A disc conveying apparatus according to claim 4, wherein the disc-shaped recording medium is stored at the target position.

8. A disc conveying apparatus comprising:
    first conveyor means including a plurality of rollers which are arranged along a conveying path of a disc-shaped recording medium with gaps therebetween, which move in a direction away from the conveying path and rotate individually, and which convey the disc-shaped recording medium by successively rolling on a peripheral surface of the disc-shaped recording medium to pass the disc-shaped recording medium from one to another;
    second conveyor means which faces the first conveyor means across the disc-shaped recording medium being conveyed, which is oriented along the conveying path, and which retains the disc-shaped recording medium between the first conveyor means and the second conveyor means; and
    determination means which determines the diameter of the disc-shaped recording medium on the basis of the movement of at least two of the plurality of rollers in the direction away from the conveying path,
    wherein each of the plurality of rollers move in a direction away from the conveying path individually and rotate individually.

9. A disc conveying apparatus comprising:
    a plurality of rollers arranged along a conveying path of a disc-shaped recording medium with gaps therebetween, the rollers configured to move in a direction away from the conveying path individually and rotate individually, and configured to convey the disc-shaped shaped recording medium by successively rolling on a peripheral surface of the disc-shaped recording medium to pass the disc-shaped recording medium from one to another;
    a conveyor facing the plurality of rollers across the disc-shaped recording medium being conveyed, the conveyor being oriented along the conveying path, and configured to retain the disc-shaped recording medium between the plurality of rollers and the conveyor; and
    a controller configured to determine a position of the disc-shaped recording medium, and configured to control the rotation of the rollers based on a movement of at least two of the plurality of rollers away from the conveying path,
    wherein each of the plurality of rollers move in a direction away from the conveying path individually and rotate individually.

10. A disc conveying apparatus according to claim 9, wherein the conveyor includes a same number of rotating members as a number of the rollers, the rotating members being arranged along the conveying path with gaps therebetween, and
    wherein the rollers and the rotating members which face each other across the disc-shaped recording medium being conveyed move away from each other synchronously and convey the disc-shaped recording medium while being in contact with the peripheral surface of the disc-shaped recording medium.

11. A disc conveying apparatus according to claim 9, further comprising:
    a detector configured to detect the movement of the rollers in the direction away from the conveying path, wherein the controller is configured to control the rotation of the rollers on the basis of a detection result obtained by the detector.

12. A disc conveying apparatus according to claim 9, wherein, in an operation for conveying the disc-shaped recording medium to a target position, the controller stops movement of the disc-shaped recording medium when the position of the disc-shaped recording medium detected on the basis of the movement of the rollers and a target position are the same.

13. A disc conveying apparatus according to claim 12, wherein, in the operation for conveying the disc-shaped recording medium to the target position, the controller rotates the rollers at a first rotational speed when the disc-shaped recording medium is between a start position and a position near the target position and rotates the rollers at a second rotational speed, which is lower than the first rotational speed, when the disc-shaped recording medium is between the position near the target position and the target position.

14. A disc conveying apparatus according to claim 12, wherein a recording and/or playback operation of the disc-shaped recording medium is performed at the target position.

15. A disc conveying apparatus according to claim 12, wherein the disc-shaped recording medium is stored at the target position.

16. A disc conveying apparatus comprising:

a plurality of rollers arranged along a conveying path of a disc-shaped recording medium with gaps therebetween, the rollers configured to move in a direction away from the conveying path and rotate individually, and configured to convey the disc-shaped recording medium by successively rolling on a peripheral surface of the disc-shaped recording medium to pass the disc-shaped recording medium from one to another;

a conveyor facing the plurality of rollers across the disc-shaped recording medium being conveyed, the conveyor being oriented along the conveying path, and configured to retain the disc-shaped recording medium between the rollers and the conveyor; and a determination unit configured to determine a diameter of the disc-shaped recording medium on the basis of movement of at least two of the plurality of rollers in a direction away from the conveying path, wherein each of the plurality of rollers move in a direction away from the conveying path individually and rotate individually.

* * * * *

UNITED STATES PATENT AND TRADEMARK OFFICE
CERTIFICATE OF CORRECTION

PATENT NO. : 7,146,619 B2
APPLICATION NO. : 10/464664
DATED : December 5, 2006
INVENTOR(S) : Hiroyuki Kikkoji It is certified that error appears in the above-identified patent and that said Letters Patent is hereby corrected as shown below:

Column 11, line 58, delete "let" and insert --left--.
Column 16, line 47, delete "101" and insert --10l--.
          (Insertion: Numerical figure "10" and lower case "l")
Column 31, line 50, delete "10a" and insert --100a--.
Column 33, line 20, delete "fore" and insert --force--; and
          line 24, delete "10a" and insert --100a--.
Column 34, line 63, delete "10a" and insert --100a--.
Column 35, line 47, delete "will be described."
Column 37, line 4, delete "10a" and insert --100a--; and
          line 41, delete "10a" and insert --100a--.
Column 38, line 38, delete "form" and insert --from--.
Column 39, line 26, delete "110b" and insert --100b--; and
          line 65, change "state.ad5"
          to --state.
              ad5--.
          (Insertion: After "state.", a new paragraph added and ad5 begins with indentation.)
Column 40, line 33, delete "10b" and insert --100b--.
Column 44, line 33, delete "shaped."

Signed and Sealed this

Twenty-sixth Day of June, 2007

JON W. DUDAS
*Director of the United States Patent and Trademark Office*